(12) United States Patent
Yang

(10) Patent No.: US 11,568,196 B2
(45) Date of Patent: Jan. 31, 2023

(54) MEMORY CARD AND TERMINAL

(71) Applicant: Huawei Technologies Co., Ltd., Shenzhen (CN)

(72) Inventor: Jiangtao Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/963,299

(22) PCT Filed: Feb. 1, 2019

(86) PCT No.: PCT/CN2019/074516
§ 371 (c)(1),
(2) Date: Jul. 20, 2020

(87) PCT Pub. No.: WO2019/149278
PCT Pub. Date: Aug. 8, 2019

(65) Prior Publication Data
US 2021/0117748 A1  Apr. 22, 2021

(30) Foreign Application Priority Data

Feb. 1, 2018  (CN) .......................... 201810103746.3

(51) Int. Cl.
*G06K 19/077* (2006.01)

(52) U.S. Cl.
CPC . *G06K 19/07743* (2013.01); *G06K 19/07732* (2013.01)

(58) Field of Classification Search
CPC ............. G06K 19/07; G06K 19/07743; G06K 19/07732; G06K 7/0034; G06K 7/0052; G06K 7/0013; G06K 19/07733; H04B 1/3816
See application file for complete search history.

(56) References Cited

U.S. PATENT DOCUMENTS

| 5,144,239 A | 9/1992 | Oppelt et al. |
| 5,288,247 A | 2/1994 | Kaufman |
| 5,531,145 A * | 7/1996 | Haghiri-Tehrani ...... B26D 7/01 83/41 |
| 5,969,329 A | 10/1999 | Vallat |
| 6,151,647 A * | 11/2000 | Sarat ................ G06K 19/07733 710/301 |

(Continued)

FOREIGN PATENT DOCUMENTS

| AU | 2018408693 A1 | 9/2020 |
| CN | 1464363 A | 12/2003 |

(Continued)

*Primary Examiner* — Daniel I Walsh
(74) *Attorney, Agent, or Firm* — Conley Rose, P.C.

(57) ABSTRACT

A memory card and a terminal, where the memory card includes a storage device, a controller, and a memory card interface. The storage device and the controller are disposed inside a card body of the memory card. The memory card interface is disposed on the card body of the memory card. The controller is electrically coupled to the storage device and the memory card interface separately. Because a shape of the memory card is the same as that of a nano subscriber identity module (SIM) card, and a size of the memory card is the same as that of the nano SIM card, a nano SD card is provided.

20 Claims, 21 Drawing Sheets

(56) References Cited

U.S. PATENT DOCUMENTS

| | | | | |
|---|---|---|---|---|
| 6,705,520 B1* | 3/2004 | Pitroda | G07G 1/0018 | 235/382.5 |
| 6,752,321 B1* | 6/2004 | Leaming | G06K 19/07 | 235/380 |
| 6,772,956 B1* | 8/2004 | Leaming | G06K 19/07703 | 235/492 |
| 6,840,454 B1* | 1/2005 | Rhelimi | G06K 19/07743 | 235/492 |
| 7,104,848 B1* | 9/2006 | Chou | H01R 27/02 | 439/660 |
| 7,108,560 B1* | 9/2006 | Chou | G06K 19/07732 | 439/660 |
| 8,291,144 B2* | 10/2012 | Pinto | G06F 13/409 | 710/301 |
| 8,453,939 B2* | 6/2013 | Lee | G06K 19/07733 | 235/492 |
| 8,936,199 B2* | 1/2015 | Lepp | G06K 19/07733 | 235/487 |
| 9,390,364 B2* | 7/2016 | Finn | H01Q 1/38 | |
| 9,647,709 B1* | 5/2017 | Li | H04B 1/3877 | |
| 10,037,784 B2* | 7/2018 | Han | H01R 13/6683 | |
| 10,141,774 B2* | 11/2018 | Liu | H02J 7/027 | |
| 10,157,678 B2* | 12/2018 | Han | G11C 16/30 | |
| 10,241,723 B2* | 3/2019 | Lee | G06K 19/07732 | |
| 10,248,902 B1* | 4/2019 | Finn | G06K 19/07722 | |
| 10,374,342 B2* | 8/2019 | Koh | H05K 1/11 | |
| 10,440,825 B2* | 10/2019 | Pueschner | H01R 12/714 | |
| 10,497,450 B2* | 12/2019 | Han | G06K 19/07743 | |
| D930,000 S* | 9/2021 | Yang | D14/436 | |
| 2002/0168900 A1* | 11/2002 | Chen | G06K 7/0073 | 439/630 |
| 2003/0085287 A1* | 5/2003 | Gray | G06K 19/072 | 235/492 |
| 2003/0112611 A1* | 6/2003 | Nishizawa | G06K 19/07733 | 361/763 |
| 2003/0112613 A1* | 6/2003 | Nishizawa | G06K 19/072 | 361/764 |
| 2004/0070952 A1* | 4/2004 | Higuchi | G06K 19/07741 | 361/737 |
| 2004/0089717 A1* | 5/2004 | Harari | G06K 19/067 | 235/441 |
| 2004/0210715 A1* | 10/2004 | Harari | G06K 19/077 | 711/115 |
| 2005/0052924 A1* | 3/2005 | Nishizawa | G06K 19/07732 | 257/E23.176 |
| 2005/0224588 A1* | 10/2005 | Ruping | G06K 7/0008 | 235/441 |
| 2005/0230484 A1* | 10/2005 | Cuellar | G06K 19/07733 | 235/492 |
| 2005/0252978 A1* | 11/2005 | Nishizawa | G06K 19/07732 | 235/492 |
| 2006/0175416 A1 | 8/2006 | Ho | | |
| 2006/0205280 A1* | 9/2006 | Nishizawa | H01L 23/49833 | 257/E23.064 |
| 2007/0113096 A1 | 5/2007 | Zhu | | |
| 2007/0138301 A1* | 6/2007 | Cinkler | G06K 19/07743 | 235/441 |
| 2007/0145133 A1* | 6/2007 | Jolivet | G06K 7/10297 | 235/441 |
| 2007/0210174 A1* | 9/2007 | Deprun | G06K 19/07733 | 235/441 |
| 2008/0006704 A1* | 1/2008 | Kim | G06K 19/07732 | 235/492 |
| 2008/0010562 A1* | 1/2008 | Kim | G06K 19/0723 | 714/55 |
| 2008/0039115 A1* | 2/2008 | Haugli | H04W 4/02 | 455/456.1 |
| 2008/0071940 A1* | 3/2008 | Kim | G06K 19/07 | 710/19 |
| 2008/0231328 A1* | 9/2008 | Leydier | H03K 5/133 | 235/492 |
| 2008/0272197 A1* | 11/2008 | Nishizawa | G06K 19/07732 | 235/492 |
| 2009/0057417 A1* | 3/2009 | Shinohara | G11C 5/14 | 235/492 |
| 2009/0134212 A1* | 5/2009 | Charnley | G11C 5/143 | 235/375 |
| 2009/0172279 A1* | 7/2009 | Yuan | G06K 19/07741 | 711/E12.001 |
| 2009/0327528 A1* | 12/2009 | Mardiks | G06F 13/4068 | 710/14 |
| 2010/0072284 A1* | 3/2010 | Nishizawa | G06K 19/07 | 235/492 |
| 2010/0090805 A1* | 4/2010 | Libotte | G06K 19/072 | 340/10.2 |
| 2010/0115200 A1 | 5/2010 | Papagrigoriou | | |
| 2010/0117800 A1* | 5/2010 | Li | G06K 19/077 | 235/492 |
| 2010/0213262 A1* | 8/2010 | Hoeksel | G06K 19/0701 | 235/492 |
| 2010/0245048 A1* | 9/2010 | Kim | G08C 19/02 | 340/10.1 |
| 2010/0267419 A1* | 10/2010 | Nishizawa | G06K 19/07769 | 455/558 |
| 2013/0175346 A1* | 7/2013 | Jenni | H01R 33/90 | 235/492 |
| 2013/0270349 A1* | 10/2013 | Lepp | G06K 19/07743 | 235/492 |
| 2013/0294602 A1* | 11/2013 | Huxham | H04W 12/06 | 380/255 |
| 2013/0319733 A1* | 12/2013 | Woodford | H05K 1/0266 | 174/250 |
| 2014/0082247 A1* | 3/2014 | Buttner | G06K 19/07733 | 710/301 |
| 2014/0099805 A1* | 4/2014 | Kutchery | G06K 13/08 | 439/76.1 |
| 2014/0117097 A1* | 5/2014 | Bosquet | G06K 19/07743 | 235/492 |
| 2014/0149613 A1* | 5/2014 | Coureau | G06K 19/07733 | 710/74 |
| 2014/0169090 A1 | 6/2014 | Ma et al. | | |
| 2014/0199875 A1* | 7/2014 | Choi | G06K 13/085 | 439/889 |
| 2014/0200047 A1* | 7/2014 | Chen | H04B 1/406 | 455/558 |
| 2014/0214687 A1* | 7/2014 | Huxham | G06Q 20/3226 | 705/70 |
| 2014/0217614 A1* | 8/2014 | Lin | H01L 23/48 | 438/106 |
| 2014/0223063 A1* | 8/2014 | Liu | G06F 13/409 | 710/301 |
| 2014/0273646 A1* | 9/2014 | Yun | H01R 12/714 | 439/629 |
| 2014/0307401 A1* | 10/2014 | Wu | H04B 1/3816 | 211/41.12 |
| 2014/0315399 A1* | 10/2014 | Bosquet | H01R 12/7005 | 439/76.1 |
| 2015/0076237 A1* | 3/2015 | Florek | G06K 19/07745 | 235/492 |
| 2015/0079847 A1* | 3/2015 | Liu | G06K 13/0831 | 439/630 |
| 2015/0200482 A1* | 7/2015 | Kim | G06K 7/0021 | 439/65 |
| 2015/0241495 A1* | 8/2015 | Kimata | G01R 31/002 | 324/613 |
| 2015/0318650 A1* | 11/2015 | Qian | H04B 1/3816 | 439/620.15 |
| 2016/0049742 A1* | 2/2016 | Han | G11C 16/30 | 365/185.18 |
| 2016/0226543 A1* | 8/2016 | Lu | H04B 1/3816 | |
| 2016/0307090 A1* | 10/2016 | Ho | G06K 19/07743 | |
| 2017/0099265 A1 | 4/2017 | Huxham et al. | | |
| 2017/0125932 A1* | 5/2017 | Wei | H01R 13/514 | |
| 2017/0179659 A1* | 6/2017 | Motohashi | H04B 1/3816 | |
| 2017/0196088 A1* | 7/2017 | Ho | H05K 1/144 | |
| 2017/0250481 A1* | 8/2017 | Zhu | H01R 25/00 | |
| 2017/0270398 A1* | 9/2017 | Mathieu | G06K 19/07754 | |

(56) References Cited

U.S. PATENT DOCUMENTS

| | | | |
|---|---|---|---|
| 2017/0277990 A1 | 9/2017 | Tokunaga et al. | |
| 2017/0324177 A1* | 11/2017 | Lempiainen | H01R 12/73 |
| 2017/0359897 A1* | 12/2017 | Pueschner | G06K 19/07747 |
| 2018/0189002 A1* | 7/2018 | Seo | H01L 27/11526 |
| 2018/0316377 A1* | 11/2018 | Yang | G06K 7/00 |
| 2019/0182954 A1* | 6/2019 | Sirajudeen | G06F 13/4282 |
| 2020/0034321 A1* | 1/2020 | Ono | G06F 13/38 |
| 2020/0042853 A1* | 2/2020 | Seo | H04M 17/026 |
| 2020/0090020 A1* | 3/2020 | Fujimoto | G06K 19/07732 |
| 2020/0210800 A1* | 7/2020 | Pinto | G06K 19/07732 |
| 2020/0264802 A1* | 8/2020 | Burke | G06F 3/0679 |
| 2020/0264990 A1* | 8/2020 | Burke | H01R 12/712 |
| 2020/0311509 A1* | 10/2020 | Benkley, III | G06K 21/32 |
| 2020/0387709 A1* | 12/2020 | Baykaner | G06F 3/012 |
| 2020/0403341 A1* | 12/2020 | Zhang | G06K 7/0026 |
| 2020/0411478 A1* | 12/2020 | Chen | H01L 23/3121 |
| 2021/0049331 A1* | 2/2021 | Yang | G06K 7/0013 |
| 2021/0117748 A1* | 4/2021 | Yang | G06K 19/07732 |
| 2021/0191501 A1* | 6/2021 | Lee | G06F 1/3275 |
| 2021/0390272 A1* | 12/2021 | Yang | G06K 19/07732 |
| 2022/0051068 A1* | 2/2022 | Li | G06K 19/07743 |
| 2022/0067475 A1* | 3/2022 | Deng | G06K 19/07733 |

FOREIGN PATENT DOCUMENTS

| | | |
|---|---|---|
| CN | 1795457 A | 6/2006 |
| CN | 101702202 A | 5/2010 |
| CN | 201556226 U | 8/2010 |
| CN | 102112975 A | 6/2011 |
| CN | 202134034 U | 2/2012 |
| CN | 103001079 A | 3/2013 |
| CN | 103164737 A | 6/2013 |
| CN | 103870870 A | 6/2014 |
| CN | 204012075 U | 12/2014 |
| CN | 204331782 U | 5/2015 |
| CN | 204835128 U | 12/2015 |
| CN | 105701532 A | 6/2016 |
| CN | 106127285 A | 11/2016 |
| CN | 106453730 A | 2/2017 |
| CN | 206039592 U | 3/2017 |
| CN | 206178926 U | 5/2017 |
| CN | 107229962 A | 10/2017 |
| CN | 206931104 U | 1/2018 |
| EP | 1306740 A2 | 5/2003 |
| JP | 2006523889 A | 10/2006 |
| JP | 2014517410 A | 7/2014 |
| JP | 2016134378 A | 7/2016 |
| KR | 20160061279 A | 5/2016 |
| RU | 2150745 C1 | 6/2000 |
| RU | 2307394 C1 | 9/2007 |
| RU | 2445676 C2 | 3/2012 |
| WO | 2009156977 A1 | 12/2009 |

* cited by examiner

MEMORY CARD AND TERMINAL

CROSS-REFERENCE TO RELATED APPLICATIONS

This application is a U.S. National Stage of International Patent Application No. PCT/CN2019/074516 filed on Feb. 1, 2019, which claims priority to Chinese Patent Application No. 201810103746.3 filed on Feb. 1, 2018. Both of the aforementioned applications are hereby incorporated by reference in their entireties.

TECHNICAL FIELD

This application relates to communications technologies, and in particular, to a memory card and a terminal.

BACKGROUND

With development of terminal technologies, terminals have become important communication tools in people's life and work. At present, a subscriber identity module (subscriber identity module, SIM) card and a secure digital memory (secure digital memory SD) card are disposed on a terminal. Further, the terminal may perform communication by using the SIM card, and the terminal may store data in the SD card.

In the prior art, dual nano SIM cards are configured on a terminal. Specifically, the terminal provides two nano SIM card holders, and the two nano SIM cards may be separately inserted into the nano nano SIM card holders, so that the terminal implements communication by using the dual nano nano SIM cards.

However, when a user uses the terminal, the user usually configures only one nano SIM card on the terminal and uses only the one nano SIM card. Therefore, no nano SIM card is inserted into the other card holder on the terminal, wasting space of the terminal. In addition, an SD card provided in the prior art is a Micro-SD card, and shapes and interface definitions of the existing Micro-SD card and the nano SIM card are completely incompatible. Therefore, a Micro-SD card holder compatible with the existing Micro-SD card is further disposed on the terminal. Because a terminal design is increasingly compact, optimization of design space becomes a difficult issue in the industry.

SUMMARY

This application provides a memory card and a terminal, to resolve a problem that terminal space is wasted because one nano nano SIM card holder on a terminal providing two nano SIM card holders is not used, and that an existing Micro-SD card is completely incompatible with a nano SIM card.

According to a first aspect, this application provides a memory card, including: a storage unit, a control unit, and a memory card interface, where the storage unit and the control unit are disposed inside a card body of the memory card, the memory card interface is disposed on the card body of the memory card, the control unit is electrically connected to the storage unit and the memory card interface separately, a shape of the memory card is the same as that of a nano subscriber identity module SIM card, and a size of the memory card is the same as that of the nano SIM card; and the memory card interface includes at least a first metal contact of the memory card, a second metal contact of the memory card, a third metal contact of the memory card, a fourth metal contact of the memory card, and a fifth metal contact of the memory card, where the first metal contact of the memory card is configured to transmit a power supply signal, the second metal contact of the memory card is configured to transmit data, the third metal contact of the memory card is configured to transmit a control signal, the fourth metal contact of the memory card is configured to transmit a clock signal, and the fifth metal contact of the memory card is configured to transmit a ground signal.

With reference to the first aspect, in a first implementation of the first aspect, all the first metal contact of the memory card, the second metal contact of the memory card, the third metal contact of the memory card, the fourth metal contact of the memory card, and the fifth metal contact of the memory card are located on a same side surface of the card body of the memory card.

With reference to the first aspect or the first implementation of the first aspect, in a second implementation of the first aspect, a first metal contact of the nano SIM card, a second metal contact of the nano SIM card, a third metal contact of the nano SIM card, a fourth metal contact of the nano SIM card, a fifth metal contact of the nano SIM card, and a sixth metal contact of the nano SIM card are disposed on a card body of the nano SIM card; the memory card interface further includes a sixth metal contact of the memory card, a seventh metal contact of the memory card, and an eighth metal contact of the memory card, where the sixth metal contact of the memory card is configured to transmit data, the seventh metal contact of the memory card is configured to transmit data, and the eighth metal contact of the memory card is configured to transmit data;

a region, on the card body of the memory card, in which the fourth metal contact of the memory card is located is corresponding to a region, on the card body of the nano SIM card, in which the first metal contact of the nano SIM card is located:

a region, on the card body of the memory card, in which the second metal contact of the memory card is located is corresponding to a region, on the card body of the nano SIM card, in which the second metal contact of the nano SIM card is located;

the seventh metal contact of the memory card is adjacent to and isolated from the first metal contact of the memory card, a region, on the card body of the memory card, in which the seventh metal contact of the memory card and the first metal contact of the memory card are located is corresponding to a region, on the card body of the nano SIM card, in which the third metal contact of the nano SIM card is located, and the seventh metal contact of the memory card is adjacent to the second metal contact of the memory card;

a region, on the card body of the memory card, in which the sixth metal contact of the memory card is located is corresponding to a region, on the card body of the nano SIM card, in which the fourth metal contact of the nano SIM card is located;

a region, on the card body of the memory card, in which the third metal contact of the memory card is located is corresponding to a region, on the card body of the nano SIM card, in which the fifth metal contact of the nano SIM card is located; and the eighth metal contact of the memory card is adjacent to and isolated from the fifth metal contact of the memory card, a region, on the card body of the memory card, in which the eighth metal contact of the memory card and the fifth metal contact of the memory card are located is corresponding to a region, on the card body of the nano SIM card, in which the sixth metal contact of the nano SIM card is located, and the eighth metal contact of the memory card is adjacent to the third metal contact of the memory card.

With reference to the first aspect or the first implementation of the first aspect, in a third implementation of the first aspect, a first metal contact of the nano SIMnano SIM card, a second metal contact of the nano SIMnano SIM card, a third metal contact of the nano SIMnano SIM card, a fourth metal contact of the nano SIM nano SIMcard, a fifth metal contact of the nano SIMnano SIM card, and a sixth metal contact of the nano SIMnano SIM card are disposed on a card body of the nano SIMnano SIM card;

the memory card interface further includes a sixth metal contact of the memory card, a seventh metal contact of the memory card, and an eighth metal contact of the memory card, where the sixth metal contact of the memory card is configured to transmit data, the seventh metal contact of the memory card is configured to transmit data, and the eighth metal contact of the memory card is configured to transmit data;

the seventh metal contact of the memory card is adjacent to and isolated from the fourth metal contact of the memory card, a region, on the card body of the memory card, in which the seventh metal contact of the memory card and the fourth metal contact of the memory card are located is corresponding to a region, on the card body of the nano SIMnano SIM card, in which the first metal contact of the nano SIMnano SIM card is located;

a region, on the card body of the memory card, in which the second metal contact of the memory card is located is corresponding to a region, on the card body of the nano SIMnano SIM card, in which the second metal contact of the nano SIMnano SIM card is located, and the fourth metal contact of the memory card is adjacent to the second metal contact of the memory card;

a region, on the card body of the memory card, in which the first metal contact of the memory card is located is corresponding to a region, on the card body of the nano SIMnano SIM card, in which the third metal contact of the nano SIMnano SIM card is located:

the eighth metal contact of the memory card is adjacent to and isolated from the sixth metal contact of the memory card, a region, on the card body of the memory card, in which the eighth metal contact of the memory card and the sixth metal contact of the memory card are located is corresponding to a region, on the card body of the nano SMnano SIM card, in which the fourth metal contact of the nano SMnano SIM card is located:

a region, on the card body of the memory card, in which the third metal contact of the memory card is located is corresponding to a region, on the card body of the nano SIMnano SIM card, in which the fifth metal contact of the nano SMnano SIM card is located, and the sixth metal contact of the memory card is adjacent to the third metal contact of the memory card; and a region, on the card body of the memory card, in which the fifth metal contact of the memory card is located is corresponding to a region, on the card body of the nano-SIM card, in which the sixth metal contact of the nano SIM card is located.

With reference to the first aspect or the first implementation of the first aspect, in a fourth implementation of the first aspect, a first metal contact of the nano SIM card, a second metal contact of the nano SIM card, a third metal contact of the nano SIM card, a fourth metal contact of the nano SIM card, a fifth metal contact of the nano SIM card, and a sixth metal contact of the nano SIM card are disposed on a card body of the nano SIM card;

the memory card interface further includes a sixth metal contact of the memory card, a seventh metal contact of the memory card, and an eighth metal contact of the memory card, where the sixth metal contact of the memory card is configured to transmit data, the seventh metal contact of the memory card is configured to transmit data, and the eighth metal contact of the memory card is configured to transmit data:

a region, on the card body of the memory card, in which the fourth metal contact of the memory card is located is corresponding to a region, on the card body of the nano SIM card, in which the first metal contact of the nano SIM card is located;

the second metal contact of the memory card is adjacent to and isolated from the seventh metal contact of the memory card, a region, on the card body of the memory card, in which the second metal contact of the memory card and the seventh metal contact of the memory card are located is corresponding to a region, on the card body of the nano SIM card, in which the second metal contact of the nano SIM card is located, and the second metal contact of the memory card is adjacent to the fourth metal contact of the memory card;

a region, on the card body of the memory card, in which the first metal contact of the memory card is located is corresponding to a region, on the card body of the nano SIM card, in which the third metal contact of the nano SIM card is located, and the seventh metal contact of the memory card is adjacent to the first metal contact of the memory card;

a region, on the card body of the memory card, in which the sixth metal contact of the memory card is located is corresponding to a region, on the card body of the nano SIM card, in which the fourth metal contact of the nano SIM card is located;

the third metal contact of the memory card is adjacent to and isolated from the eighth metal contact of the memory card, a region, on the card body of the memory card, in which the third metal contact of the memory card and the eighth metal contact of the memory card are located is corresponding to a region, on the card body of the nano SIM card, in which the fifth metal contact of the nano SIM card is located, and the third metal contact of the memory card is adjacent to the sixth metal contact of the memory card; and a region, on the card body of the memory card, in which the fifth metal contact of the memory card is located is corresponding to a region, on the card body of the nano SIM card, in which the sixth metal contact of the nano SIM card is located, and the eighth metal contact of the memory card is adjacent to the fifth metal contact of the memory card.

With reference to the first aspect or the first implementation of the first aspect, in a fifth implementation of the first aspect, a first metal contact of the nano SIM card, a second metal contact of the nano SIM card, a third metal contact of the nano SIM card, a fourth metal contact of the nano SIM card, a fifth metal contact of the nano SIM card, and a sixth metal contact of the nano SIM card are disposed on a card body of the nano SIM card;

the memory card interface further includes a sixth metal contact of the memory card, a seventh metal contact of the memory card, and an eighth metal contact of the memory card, where the sixth metal contact of the memory card is configured to transmit data, the seventh metal contact of the memory card is configured to transmit data, and the eighth metal contact of the memory card is configured to transmit data;

a region, on the card body of the memory card, in which the fourth metal contact of the memory card is located is corresponding to a region, on the card body of the nano SIM card, in which the first metal contact of the nano SIM card is located;

a region, on the card body of the memory card, in which the second metal contact of the memory card is located is corresponding to a region, on the card body of the nano SIM card, in which the second metal contact of the nano SIM card is located;

the seventh metal contact of the memory card is adjacent to and isolated from the first metal contact of the memory card, a region, on the card body of the memory card, in which the seventh metal contact of the memory card and the first metal contact of the memory card are located is corresponding to a region, on the card body of the nano SIM card, in which the third metal contact of the nano SIM card is located, the first metal contact of the memory card is adjacent to the second metal contact of the memory card, and an area of the first metal contact of the memory card is greater than that of the seventh metal contact of the memory card;

a region, on the card body of the memory card, in which the sixth metal contact of the memory card is located is corresponding to a region, on the card body of the nano SIM card, in which the fourth metal contact of the nano SIM card is located:

a region, on the card body of the memory card, in which the third metal contact of the memory card is located is corresponding to a region, on the card body of the nano SIM card, in which the fifth metal contact of the nano SIM card is located; and the eighth metal contact of the memory card is adjacent to and isolated from the fifth metal contact of the memory card, a region, on the card body of the memory card, in which the eighth metal contact of the memory card and the fifth metal contact of the memory card are located is corresponding to a region, on the card body of the nano SIM card, in which the sixth metal contact of the nano SIM card is located, the fifth metal contact of the memory card is adjacent to the third metal contact of the memory card, and an area of the fifth metal contact of the memory card is greater than that of the eighth metal contact of the memory card.

With reference to the first aspect or the first implementation of the first aspect, in a sixth implementation of the first aspect, a first metal contact of the nano SIM card, a second metal contact of the nano SIM card, a third metal contact of the nano SIM card, a fourth metal contact of the nano SIM card, a fifth metal contact of the nano SIM card, and a sixth metal contact of the nano SIM card are disposed on a card body of the nano SIM card;

the memory card interface further includes a sixth metal contact of the memory card, a seventh metal contact of the memory card, and an eighth metal contact of the memory card, where the sixth metal contact of the memory card is configured to transmit data, the seventh metal contact of the memory card is configured to transmit data, and the eighth metal contact of the memory card is configured to transmit data;

a region, on the card body of the memory card, in which the fourth metal contact of the memory card is located is corresponding to a region, on the card body of the nano SIM card, in which the first metal contact of the nano SIM card is located;

a region, on the card body of the memory card, in which the second metal contact of the memory card is located is corresponding to a region, on the card body of the nano SIM card, in which the second metal contact of the nano SIM card is located;

a region, on the card body of the memory card, in which the first metal contact of the memory card is located is corresponding to a region, on the card body of the nano SIM card, in which the third metal contact of the nano SIM card is located;

a region, on the card body of the memory card, in which the sixth metal contact of the memory card is located is corresponding to a region, on the card body of the nano SIM card, in which the fourth metal contact of the nano SIM card is located;

a region, on the card body of the memory card, in which the third metal contact of the memory card is located is corresponding to a region, on the card body of the nano SIM card, in which the fifth metal contact of the nano SIM card is located;

a region, on the card body of the memory card, in which the fifth metal contact of the memory card is located is corresponding to a region, on the card body of the nano SIM card, in which the sixth metal contact of the nano SIM card is located;

the seventh metal contact of the memory card is located between the fourth metal contact of the memory card and the sixth metal contact of the memory card, the seventh metal contact of the memory card is isolated from the fourth metal contact of the memory card and the sixth metal contact of the memory card, and a center point of the seventh metal contact of the memory card is located in a connection line between a center point of the fourth metal contact of the memory card and a center point of the sixth metal contact of the memory card; and the eighth metal contact of the memory card is located between the first metal contact of the memory card and the fifth metal contact of the memory card, the eighth metal contact of the memory card is isolated from the first metal contact of the memory card and the fifth metal contact of the memory card, and a center point of the eighth metal contact of the memory card is located in a connection line between a center point of the first metal contact of the memory card and a center point of the fifth metal contact of the memory card.

With reference to the first aspect or the first implementation of the first aspect, in a seventh implementation of the first aspect, a first metal contact of the nano SIM card, a second metal contact of the nano SIM card, a third metal contact of the nano SIM card, a fourth metal contact of the nano SIM card, a fifth metal contact of the nano SIM card, and a sixth metal contact of the nano SIM card are disposed on a card body of the nano SIM card;

the memory card interface further includes a sixth metal contact of the memory card, a seventh metal contact of the memory card, and an eighth metal contact of the memory card, where the sixth metal contact of the memory card is configured to transmit data, the seventh metal contact of the memory card is configured to transmit data, and the eighth metal contact of the memory card is configured to transmit data;

a region, on the card body of the memory card, in which the sixth metal contact of the memory card is located is corresponding to a region, on the card body of the nano SIM card, in which the first metal contact of the nano SIM card is located;

a region, on the card body of the memory card, in which the third metal contact of the memory card is located is corresponding to a region, on the card body of the nano SIM card, in which the second metal contact of the nano SIM card is located;

the seventh metal contact of the memory card is adjacent to and isolated from the first metal contact of the memory card, a region, on the card body of the memory card, in which the seventh metal contact of the memory card and the first metal contact of the memory card are located is corresponding to a region, on the card body of the nano SIM card, in which the third metal contact of the nano SIM card is located, and the seventh metal contact of the memory card is adjacent to the third metal contact of the memory card;

a region, on the card body of the memory card, in which the fourth metal contact of the memory card is located is corresponding to a region, on the card body of the nano SIM card, in which the fourth metal contact of the nano SIM card is located;

a region, on the card body of the memory card, in which the second metal contact of the memory card is located is corresponding to a region, on the card body of the nano SIM card, in which the fifth metal contact of the nano SIM card is located; and the eighth metal contact of the memory card is adjacent to and isolated from the fifth metal contact of the memory card, a region, on the card body of the memory card, in which the eighth metal contact of the memory card and the fifth metal contact of the memory card are located is corresponding to a region, on the card body of the nano SIM card, in which the sixth metal contact of the nano SIM card is located, and the eighth metal contact of the memory card is adjacent to the second metal contact of the memory card.

With reference to the first aspect or the first implementation of the first aspect, in an eighth implementation of the first aspect, a first metal contact of the nano SIM card, a second metal contact of the nano SIM card, a third metal contact of the nano SIM card, a fourth metal contact of the nano SIM card, a fifth metal contact of the nano SIM card, and a sixth metal contact of the nano SIM card are disposed on a card body of the nano SIM card;

the memory card interface further includes a sixth metal contact of the memory card, a seventh metal contact of the memory card, and an eighth metal contact of the memory card, where the sixth metal contact of the memory card is configured to transmit data, the seventh metal contact of the memory card is configured to transmit data, and the eighth metal contact of the memory card is configured to transmit data;

the seventh metal contact of the memory card is adjacent to and isolated from the fourth metal contact of the memory card, a region, on the card body of the memory card, in which the seventh metal contact of the memory card and the fourth metal contact of the memory card are located is corresponding to a region, on the card body of the nano SIM card, in which the first metal contact of the nano SIM card is located;

a region, on the card body of the memory card, in which the third metal contact of the memory card is located is corresponding to a region, on the card body of the nano SIM card, in which the second metal contact of the nano SIM card is located, and a clock signal of the memory card is adjacent to the third metal contact of the memory card;

a region, on the card body of the memory card, in which the fifth metal contact of the memory card is located is corresponding to a region, on the card body of the nano SIM card, in which the third metal contact of the nano SIM card is located;

the eighth metal contact of the memory card is adjacent to and isolated from the sixth metal contact of the memory card, a region, on the card body of the memory card, in which the eighth metal contact of the memory card and the sixth metal contact of the memory card are located is corresponding to a region, on the card body of the nano SIM card, in which the fourth metal contact of the nano SIM card is located;

a region, on the card body of the memory card, in which the second metal contact of the memory card is located is corresponding to a region, on the card body of the nano SIM card, in which the fifth metal contact of the nano SIM card is located, and the sixth metal contact of the memory card is adjacent to the second metal contact of the memory card; and a region, on the card body of the memory card, in which the first metal contact of the memory card is located is corresponding to a region, on the card body of the nano SIM card, in which the sixth metal contact of the nano SIM card is located.

According to a second aspect, this application provides a terminal. The memory card according to any one of the first aspect or the implementations of the first aspect is disposed on the terminal.

In the foregoing aspects, the memory card including the storage unit, the control unit, and the memory card interface is provided. The storage unit and the control unit are disposed inside the card body of the memory card. The memory card interface is disposed on the card body of the memory card. The control unit is electrically connected to the storage unit and the memory card interface separately. Because the shape of the memory card is the same as that of the nano subscriber identity module SIM card, and the size of the memory card is the same as that of the nano SIM card, a nano SD card is provided, so that the memory card provided in the embodiments can be inserted into a nano SIM card holder. Further, the memory card and the nano SIM card can share a same nano SIM card holder.

DESCRIPTION OF EMBODIMENTS

Figure 1:
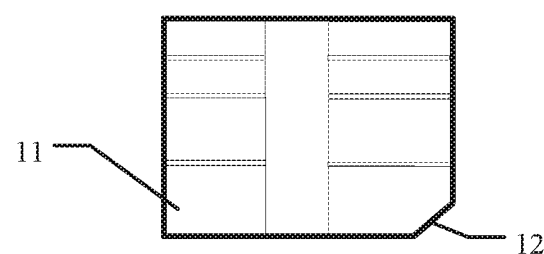
FIG. 1 is a schematic structural diagram of a memory card according to an embodiment of this application.

The embodiments of this application are applied to a communications apparatus. The following explains and describes some terms in this application, to facilitate understanding of a person skilled in the art. It should be noted that when the solutions in the embodiments of this application are applied to a current communications apparatus or a communications apparatus that may emerge in the future, names of a memory card and a terminal may change, but this does not affect implementation of the solutions in the embodiments of this application.

First, technical terms mentioned in this application are explained:

(1) Universal serial bus (universal serial bus. USB): The universal serial bus is a serial port bus standard for a connection between a computer system and an external device, is also a technical specification for input/output interfaces, and is widely applied to information communication products such as a personal computer and a mobile device.

(2) Institute of electrical and electronics engineers (institute of electrical and electronics engineers, IEEE) 1394 standard: The IEEE 1394 standard is a serial standard.

(3) Terminal: The terminal may include various handheld devices with a communication function, an in-vehicle device, a wearable device, a smart home device, a computing device or another processing device connected to a wireless modem, and terminals in various forms, for example, a mobile station (mobile station, MS), a terminal (terminal), user equipment (user equipment, UE), and a soft terminal, such as a water meter, a power meter, and a sensor.

It should be noted that for nouns or terms mentioned in the embodiments of this application, reference may be made to each other, and details are not described again.

It should be noted that in the embodiments of this application when a memory card in a same shape and size as those of a nano SIM card is used to implement a storage function, a type of the memory card is not limited to the SD card in the foregoing examples. In the embodiments of this application, the memory card may be alternatively a memory card based on an interface protocol such as universal serial bus (universal serial bus, USB), peripheral component interconnect express (peripheral component interconnect express, PCIE), universal flash storage (universal flash storage, UFS), multimedia card (multimedia card, MMC), or embedded multimedia card (embedded multimedia card. EMMC).

The following describes a technical solution in an example with reference to an accompanying drawing in the example. In the prior art, a Micro-SD card or a nano SIM card may be configured on a current terminal. A size of the Micro-SD card is 11 millimeters (mm)×15 millimeters. A size of the nano SIM card is 8.8 millimeters×12.3 millimeters. The size of the Micro-SD card is greater than that of the nano SIM card by 56 mm². Therefore, a size of a Micro-SD card holder is greater than that of a nano SIM card holder by 130 mm². It can be learned that the Micro-SD card cannot be inserted into the nano SIM card holder. However, when the terminal provides two nano SIM card holders, a user usually configures only one nano SIM card on the terminal and uses only the one nano SIM card. Therefore, no nano SIM card is inserted into the other nano SIM card holder on the terminal, wasting space of the terminal. In addition, because the Micro-SD card cannot be inserted into the nano SIM card holder, the terminal configured with the dual nano SIM card holders cannot store data.

A pin in the embodiments of this application is a metal contact. To be specific, the pin may be a contact with a contact area and a conducting function. The pin in the embodiments of this application may be referred to as a connection terminal. A specific name of the pin is not specifically limited.

In the embodiments of this application, that A and B "are corresponding" may also be referred to as that there is a mapping between A and B. This indicates that A and B are corresponding/mapped to a same spring of a nano SIM card holder. For example, a region, on a card body of a memory card, in which a clock signal pin of the memory card is located is corresponding to a region, on a card body of a nano SIM card, in which a clock signal pin of the nano SIM card is located. Herein, "corresponding" may also be referred to as that the clock signal pin of the memory card is mapped to the clock signal pin of the nano SIM card. To be specific, the clock signal pin of the memory card and the clock signal pin of the nano SIM card are corresponding/mapped to a same spring of a nano SIM card holder.

In the embodiments of this application, a "power supply pin" of a memory card is a "first metal contact of the memory card", a "data transmission pin" of the memory card is a "second metal contact of the memory card", a "control signal pin" of the memory card is a "third metal contact of the memory card", a "clock signal pin" of the memory card is a "fourth metal contact of the memory card", a "ground signal pin" of the memory card is a "fifth metal contact of the memory card", a "first data transmission pin" of the memory card is the "second metal contact", a "second data transmission pin" of the memory card is a "sixth metal contact", a "third data transmission pin" of the memory card is a "seventh metal contact", and a "fourth data transmission pin" of the memory card is an "eighth metal contact".

In the embodiments of this application, a "clock signal pin" of a nano SIM card is a "first metal contact of the nano SIM card", a "reset signal pin" of the nano SIM card is a "second metal contact of the nano SIM card", a "power supply pin" of the nano SIM card is a "third metal contact of the nano SIM card", a "data transmission pin" of the nano SIM card is a "fourth metal contact of the nano SIM card", a "programming voltage/input signal pin" of the nano SIM card is a "fifth metal contact of the nano SIM card", and a "ground signal pin" of the nano SIM card is a "sixth metal contact of the nano SIM card".

FIG. 1 is a schematic structural diagram of a memory card according to an embodiment of this application. As shown in FIG. 1, the memory card includes: a storage unit, a control unit, and a memory card interface. The storage unit and the control unit are disposed inside a card body of the memory card. The memory card interface is disposed on the card body of the memory card. The control unit is electrically connected to the storage unit and the memory card interface separately. A shape of the memory card is the same as that of a nano SIM card, and a size of the memory card is the same as that of the nano SIM card.

The memory card interface includes at least a power supply pin, a data transmission pin, a control signal pin, a clock signal pin, and a ground signal pin.

In an optional implementation, all the power supply pin, the data transmission pin, the control signal pin, the clock signal pin, and the ground signal pin are located on a same side surface of the card body of the memory card.

In this embodiment, specifically, the memory card includes the storage unit, the control unit, and the memory card interface. In addition, the memory card further includes an interface drive circuit. The storage unit, the control unit, and the interface drive circuit are disposed inside the card body of the memory card, and the memory card interface is disposed on a surface of the card body of the memory card.

In addition, the control unit is electrically connected to the storage unit and the memory card interface separately. Specifically, the interface drive circuit is electrically connected to the memory card interface and the control unit. Further, the interface drive circuit electrically connects the memory card interface and the control unit, and electrically connects the control unit and the storage unit.

The memory card interface includes at least one power supply pin, four data transmission pins, one control signal pin, one clock signal pin, and one ground signal pin. All the power supply pin, the data transmission pins, the control signal pin, the clock signal pin, and the ground signal pin are disposed on a same surface of the card body of the memory card. As shown in FIG. 1, each of the foregoing pins is a denotation 11 in FIG. 1. Optionally, the power supply pin of the memory card, the data transmission pins of the memory card, the control signal pin of the memory card, the clock signal pin of the memory card, and the ground signal pin of the memory card are flat contacts attached to a surface of the card body of the memory card.

In an optional implementation, at least one wire is disposed on the card body of the memory card. The at least one wire is located between the pins in the memory card interface. The at least one wire is configured to connect the storage unit and the control unit. The at least one wire is further configured to connect the control unit and the memory card interface.

Locations of the pins of the memory card interface on the card body of the memory card are not limited. Length values and height values of the pins of the memory card interface are not limited. Shapes of the pins (or contacts, or connection terminals) mentioned in this embodiment may be regular rectangles, or may be irregular shapes. The shapes of the pins (or the contacts, or the connection terminals) are not limited in this embodiment. Distance values between edges of the pins of the memory card interface and side edges of the memory card are not limited. A specific height value and length value of the memory card are not limited.

For example, based on an angle of view of FIG. 1, a length direction of the memory card is from left to right, and a width direction of the memory card is from bottom to top. A length of the memory card is 12.30 millimeters, with a tolerance of 0.10 millimeters. A width of the memory card is 8.80 millimeters, with a tolerance of 0.10 millimeters.

A shape of the memory card provided in this embodiment of this application is the same as that of a nano SIM card. For example, the shape of the nano SIM card is a rectangle, four corners of the rectangle are round corners, and a locating notch is provided in one of the four corners of the rectangle. Further, the shape of the memory card provided in this embodiment of this application is also a rectangle, four corners of the rectangle are round corners, a chamfer is provided in one of the four corners of the rectangle, and further, a locating notch 12 is provided in the corner. In addition, a size of the memory card provided in this embodiment of this application is the same as that of the nano SIM card. Specifically, the length of the memory card is the same as that of the nano SIM card, the width of the memory card is the same as that of the nano SIM card, and a size of the locating notch on the memory card is also the same as that of the locating notch on the nano SIM card. Therefore, the memory card provided in this embodiment of this application can be inserted into a nano SIM card holder. Further, the memory card and the nano SIM card can share a same nano SIM card holder.

The memory card provided in this embodiment of this application may be cut, and can basically adapt to a card-cutting case and anon-card-cutting case. For example, based on the angle of view of FIG. 1, an X direction of the memory card is from top to bottom, and Y direction of the memory card is from left to right. Table 1 shows fitting between the nano SIM card and a nano SIM card holder of a terminal, and fitting between the memory card in this embodiment and the nano SIM card holder of the terminal.

TABLE 1

Analysis on a fitting tolerance between the memory card in this application and the nano SIM card holder of the terminal

|  | Tolerance (millimeter) |
| --- | --- |
| Description of a size tolerance chain in the X direction | |
| Surface mount technology (surface mount technology, SMT) precision of the card holder | 0.05 |
| Printed circuit board (printed circuit board, PCB) locating precision | 0.1 |
| Location offset of the card relative to the card holder | 0.1 |
| Location accuracy of a spring contact | 0.05 |
| Theoretical maximum offset of the spring contact | |
| Worst case (Worst Case) | 0.3 |
| Root-sum-squares (root-sum-squares, RSS) | 0.16 |
| (Worst Case + RSS)/2 | 0.23 |
| Description of a size tolerance chain in the Y direction | |
| SMT precision of a nano SD card holder | 0.05 |
| PCB locating precision | 0.1 |
| Width tolerance of an enclosure of a middle frame | 0.1 |
| Thickness tolerance of a door place of a card tray | 0.05 |
| Location offset of the card relative to the card holder | 0.1 |
| Location accuracy of a spring contact | 0.05 |
| Theoretical maximum offset of the spring contact | |
| Worst Case | 0.45 |
| RSS | 0.19 |
| (Worst Case + RSS)/2 | 0.33 |

It can be learned from Table 1 that a tolerance generated during fitting between the memory card in this embodiment and the nano SIM card holder of the terminal is the same as that generated during fitting between the nano SIM card and the nano SIM card holder of the terminal. Therefore, the memory card in this embodiment can well fit into the nano SIM card holder.

In this embodiment, the memory card including the storage unit, the control unit, and the memory card interface is provided. The storage unit and the control unit are disposed inside the card body of the memory card. The memory card interface is disposed on the card body of the memory card. The control unit is electrically connected to the storage unit and the memory card interface separately. Because the shape of the memory card is the same as that of the nano subscriber identity module SIM card, and the size of the memory card is the same as that of the nano SIM card, a nano SD card is provided. As shown in FIG. 1, a locating notch 12 is provided on the nano SD card. Therefore, the memory card provided in this embodiment may be inserted into the nano SIM card holder. Further, the memory card and the nano SIM card can share a same nano SIM card holder.

Figure 2:
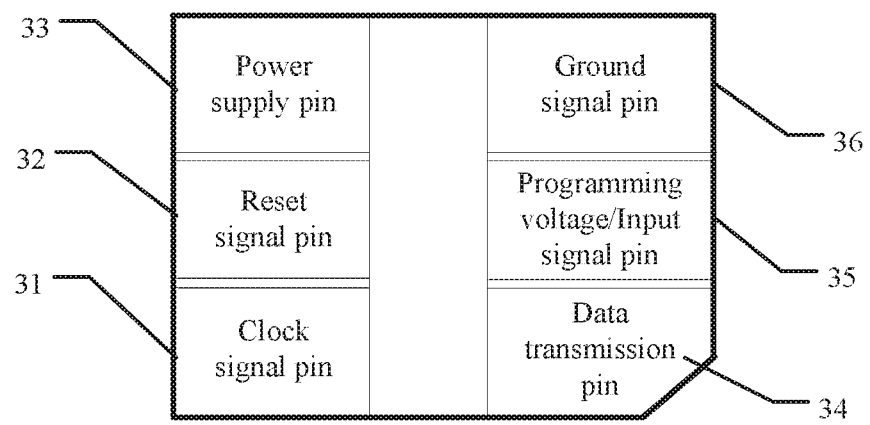
FIG. 2 is a schematic structural diagram of a nano SIM card in the prior art.

FIG. 2 is a schematic structural diagram of a nano SIM card in the prior art. As shown in FIG. 2, a clock signal pin 31, a reset signal pin 32, a power supply pin 33, a data transmission pin 34, a programming voltage/input signal pin 35, and a ground signal pin 36 are disposed on a card body of the nano SIM card. In the following embodiments, during pin splitting, a shape and a size of a pin obtained through splitting are not limited, and a shape and a size of another pin are not limited either. For example, edges of pins of a memory card may have chamfers, or may not have chamfers. In the following embodiments, when the pin is split, a shape and a size of the memory card are not limited either. For example, a locating notch may be provided in a corner of the memory card.

Figure 3:
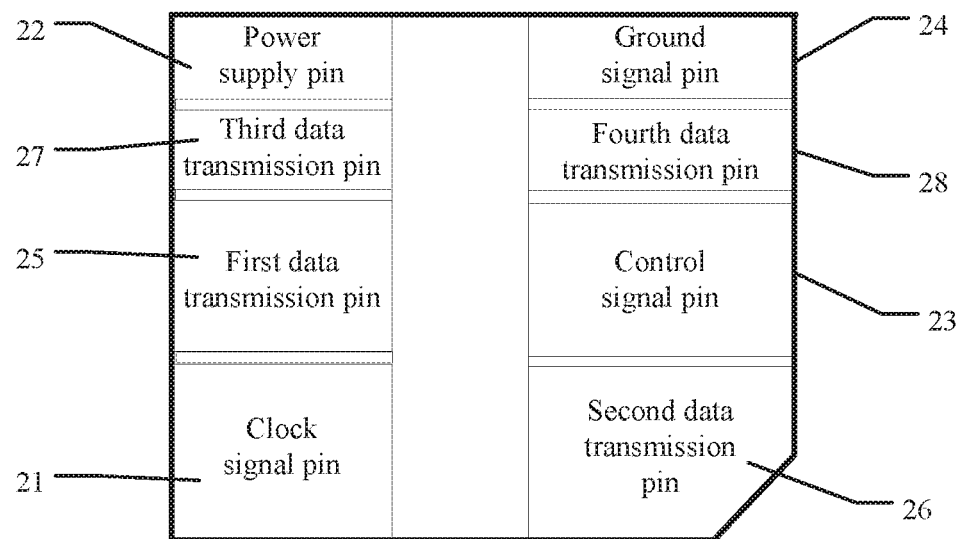
FIG. 3 is a schematic structural diagram 1 of another memory card according to an embodiment of this application.

FIG. 3 is a schematic structural diagram 1 of another memory card according to an embodiment of this application. Based on the memory card provided in the embodiment shown in FIG. 1, as shown in FIG. 3, the memory card includes four data transmission pins. The four data transmission pins are a first data transmission pin 25, a second data transmission pin 26, a third data transmission pin 27, and a fourth data transmission pin 28.

A region, on the card body of the memory card, in which the clock signal pin 21 of the memory card is located is corresponding to a region, on the card body of the nano SIM card, in which the clock signal pin 31 of the nano SIM card is located.

A region, on the card body of the memory card, in which the first data transmission pin 25 of the memory card is located is corresponding to a region, on the card body of the nano SIM card, in which the reset signal pin 32 of the nano SIM card is located.

The third data transmission pin 27 of the memory card is adjacent to and isolated from the power supply pin 22 of the memory card. A region, on the card body of the memory card, in which the third data transmission pin 27 and the power supply pin 22 of the memory card are located is corresponding to a region, on the card body of the nano SIM card, in which the power supply pin 33 of the nano SIM card is located. The third data transmission pin 27 is adjacent to the first data transmission pin 25 of the memory card.

A region, on the card body of the memory card, in which the second data transmission pin 26 of the memory card is located is corresponding to a region, on the card body of the nano SIM card, in which the data transmission pin 34 of the nano SIM card is located.

A region, on the card body of the memory card, in which the control signal pin 23 of the memory card is located is corresponding to a region, on the card body of the nano SIM card, in which the programming voltage/input signal pin 35 of the nano SIM card is located.

The fourth data transmission pin 28 of the memory card is adjacent to and isolated from the ground signal pin 24 of the memory card. A region, on the card body of the memory card, in which the fourth data transmission pin 28 and the ground signal pin 24 of the memory card are located is corresponding to a region, on the card body of the nano SIM card, in which the ground signal pin 36 of the nano SIM card is located. The fourth data transmission pin 28 is adjacent to the control signal pin 23 of the memory card.

In this embodiment, specifically, as shown in FIG. 2, one clock signal (clock signal, CLK) pin 31, one reset signal (reset signal, RST) pin 32, one power supply (power supply, VCC) pin 33, one data line (data line, DAT) pin 34, one programming voltage/input signal (programming voltage/input signal. VPP) pin 35, and one ground signal (power supply ground, GND) pin 36 are disposed on the card body of the existing nano SIM card. For example, center points of the CLK pin 31, the RST pin 32, and the VCC pin 33 are located in a same straight line; center points of the DAT pin 34, the VPP pin 35, and the GND pin 36 are located in a same straight line; and the two lines are parallel.

As shown in FIG. 3, a memory card interface of the memory card provided in this embodiment of this application includes at least the clock signal pin 21, the power supply pin 22, the control signal (command/response, CMD) pin 23, the ground signal pin 24, the first data transmission pin 25, the second data transmission pin 26, the third data transmission pin 27, and the fourth data transmission pin 28.

As shown in FIG. 3, in this embodiment, the region, on the card body of the memory card, in which the clock signal pin 21 of the memory card is located is corresponding to the region, on the card body of the nano SIM card, in which the clock signal pin 31 of the nano SIM card is located. Herein, "corresponding" may also be referred to as that the clock signal pin 21 of the memory card is mapped to the clock signal pin 31 of the nano SIM card. To be specific, the clock signal pin 21 of the memory card and the clock signal pin 31 of the nano SIM card are corresponding/mapped to a same spring of a nano SIM card holder. The region, on the card body of the memory card, in which the first data transmission pin 25 of the memory card is located is corresponding to the region, on the card body of the nano SIM card, in which the reset signal pin 32 of the nano SIM card is located. Herein, "corresponding" may also be referred to as that the first data transmission pin 25 of the memory card is mapped to the reset signal pin 32 of the nano SIM card. To be specific, the first data transmission pin 25 of the memory card and the reset signal pin 32 of the nano SIM card are corresponding/mapped to a same spring of the nano SIM card holder. Further, the clock signal pin 21 of the memory card is adjacent to and isolated from the first data transmission pin 25 of the memory card. In addition, the third data transmission pin 27 of the memory card is adjacent to and isolated from the power supply pin 22 of the memory card. The region, on the card body of the memory card, in which the third data transmission pin 27 and the power supply pin 22 of the memory card are located is corresponding to the region, on the card body of the nano SIM card, in which the power supply pin 33 of the nano SIM card is located. The third data transmission pin 27 is adjacent to and isolated from the first data transmission pin 25 of the memory card. Herein, "corresponding" may also be referred to as that the third data transmission pin 27 and the power supply pin 22 of the memory card are mapped to the power supply pin 33 of the nano SIM card. To be specific, the two pins, that is, the third data transmission pin 27 and the power supply pin 22 of the memory card, and the power supply pin 33 of the nano SIM card are corresponding/mapped to a same spring of the nano SIM card holder. Further, a region, on the card body of the memory card, in which four pins, that is, the clock signal pin 21 of the memory card, the first data transmission pin 25 of the memory card, the third data transmission pin 27 of the memory card, and the power supply pin 22 of the memory card, are located is corresponding to a region, on the card body of the nano SIM card, in which the clock signal pin 31, the reset signal pin 32, and the power supply pin 33 of the nano SIM card are located, thereby ensuring that the memory card provided in this embodiment and the nano SIM card can share a same nano SIM card holder. It can be learned that the third data transmission pin 27 of the memory card and the power supply pin 22 of the memory card are obtained by splitting the region of the power supply pin 33 of the nano SIM card into two pins. Shapes and sizes of the third data transmission pin 27 of the memory card and the power supply pin 22 of the memory card are not limited. In addition, shapes and sizes of the clock signal pin 21 of the memory card and the first data transmission pin 25 of the memory card are not limited.

The region, on the card body of the memory card, in which the second data transmission pin 26 of the memory card is located is corresponding to the region, on the card body of the nano SIM card, in which the data transmission pin 34 of the nano SIM card is located. The region, on the card body of the memory card, in which the control signal pin 23 of the memory card is located is corresponding to the region, on the card body of the nano SIM card, in which the programming voltage/input signal pin 35 of the nano SIM card is located. Further, the second data transmission pin 26 of the memory card is adjacent to and isolated from the control signal pin 23 of the memory card. In addition, the fourth data transmission pin 28 of the memory card is adjacent to and isolated from the ground signal pin 24 of the memory card. The region, on the card body of the memory card, in which the fourth data transmission pin 28 and the ground signal pin 24 of the memory card are located is corresponding to the region, on the card body of the nano SIM card, in which the ground signal pin 36 of the nano SIM card is located. The fourth data transmission pin 28 is adjacent to and isolated from the control signal pin 23 of the memory card. Further, a region, on the card body of the memory card, in which four pins, that is, the second data transmission pin 26 of the memory card, the control signal pin 23 of the memory card, the fourth data transmission pin 28 of the memory card, and the ground signal pin 24 of the memory card, are located is corresponding to a region, on the card body of the nano SIM card, in which the data transmission pin 34, the programming voltage/input signal pin 35, and the ground signal pin 36 of the nano SIM card are located, thereby ensuring that the memory card provided in this embodiment and the nano SIM card can share a same nano SIM card holder. It can be learned that the fourth data transmission pin 28 of the memory card and the ground signal pin 24 of the memory card are obtained by splitting the region of the ground signal pin 36 of the nano SIM card into two pins. Shapes and sizes of the fourth data transmission pin 28 of the memory card and the ground signal pin 24 of the memory card are not limited. In addition, shapes and sizes of the second data transmission pin 26 of the memory card and the control signal pin 23 of the memory card are not limited.

Figure 3A:
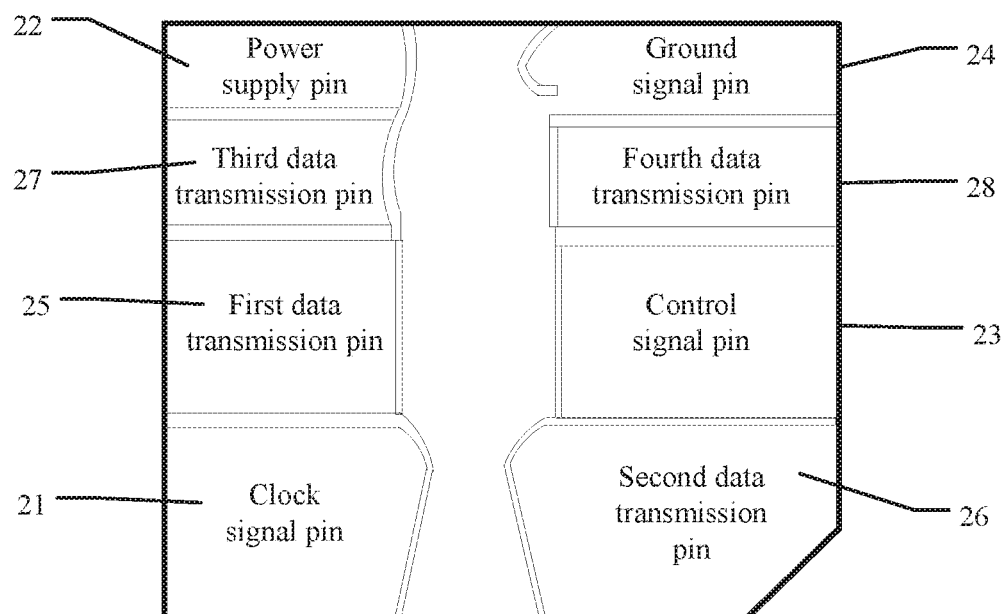
FIG. 3a is a schematic structural diagram 2 of another memory card according to an embodiment of this application.
Figure 3B:
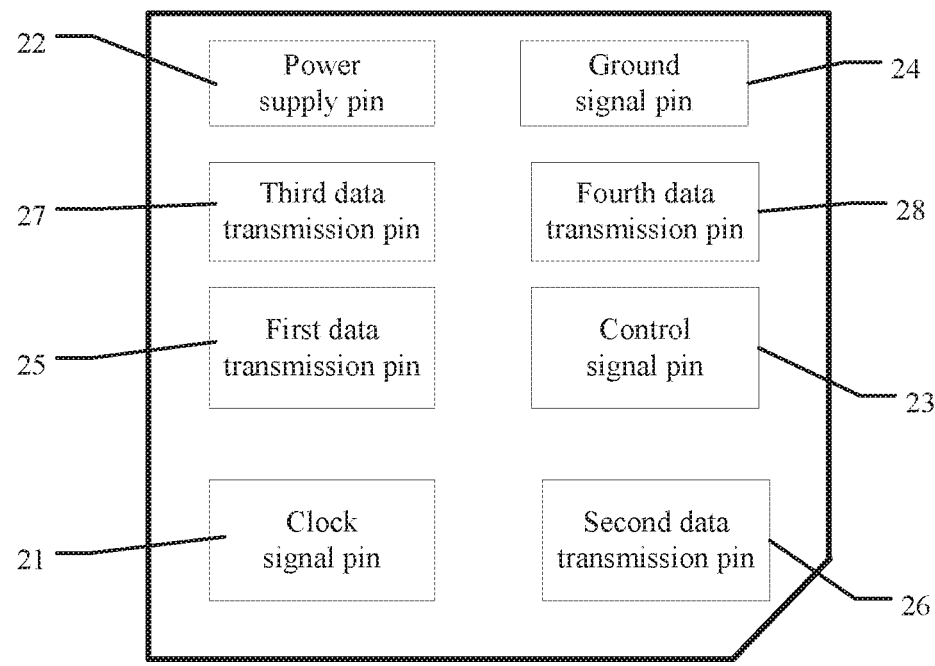
FIG. 3b is a schematic structural diagram 3 of another memory card according to an embodiment of this application.

In addition, FIG. 3a is a schematic structural diagram 2 of another memory card according to an embodiment of this application. As shown in FIG. 3a, shapes of the pins (or contacts, or connection terminals) of the memory card are not limited. The pins (or the contacts, or the connection terminals) may be in irregular shapes. It can be learned from FIG. 3a that there is no spacing between the pins (or the contacts, or the connection terminals) of the memory card. Further, a wire of the memory card may be inside the card body of the memory card. The wire is configured to connect the storage unit and the control unit. The wire is further configured to connect the control unit and the memory card interface. FIG. 3b is a schematic structural diagram 3 of another memory card according to an embodiment of this application. As shown in FIG. 3b, there may be spacings between the pins (or contacts, or connection terminals) of the memory card, and there may also be spacings between the pins (or the contacts, or the connection terminals) and edges of the memory card. It can be learned that the pins of the memory card do not fully cover a surface of the card body of the memory card. All these spacings are regions on the surface of the card body of the memory card. Further, these regions may be configured to dispose a wire. To be specific, the wire is routed in the spacings between the pins (or the contacts, or the connection terminals) and the spacings between the pins (or the contacts, or the connection terminals) and the edges of the memory card. In addition, the wire is configured to connect the storage unit and the control unit. The wire is further configured to connect the control unit and the memory card interface.

Figure 3C:
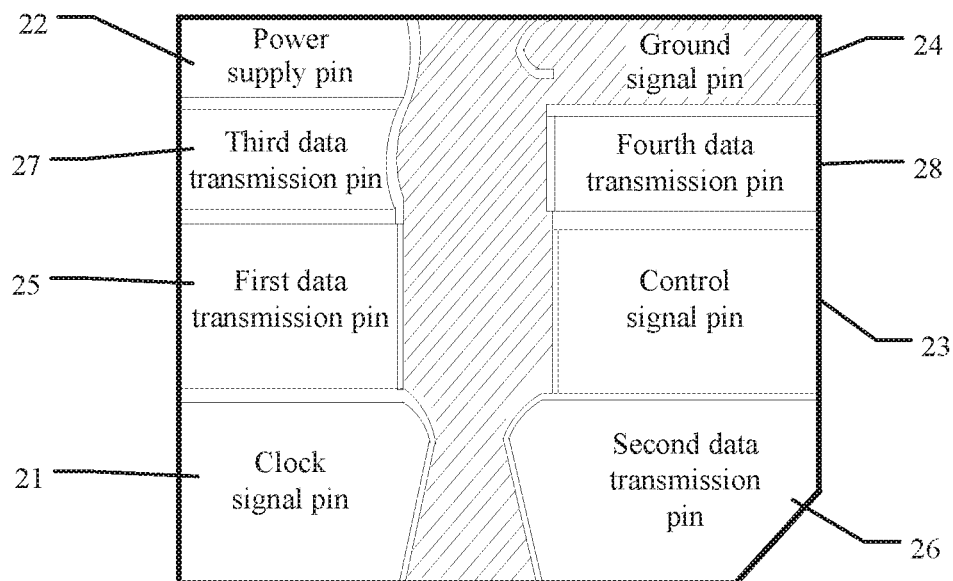
FIG. 3c is a schematic structural diagram 4 of another memory card according to an embodiment of this application.

In addition, FIG. 3c is a schematic structural diagram 4 of another memory card according to an embodiment of this application. As shown in FIG. 3c, in the case of FIG. 3a, the ground signal pin 24 of the memory card is in a shape shown in FIG. 3a. Refer to a region filled by slashes in FIG. 3c. The region filled by the slashes in FIG. 3c indicates the ground signal pin 24 of the memory card.

For shapes and spacings of pins (or contacts, or connection terminals) in the following embodiments, refer to the descriptions of the shapes and spacings of the pins (or the contacts, or the connection terminals) in this embodiment.

In accompanying drawings of the following embodiments, the clock signal pin 21 of the memory card is denoted as CLK, the power supply pin 22 of the memory card is denoted as VCC, the control signal pin 23 of the memory card is denoted as CMD, the ground signal pin 24 of the memory card is denoted as GND, the first data transmission pin 25 of the memory card is denoted as D0, the second data transmission pin 26 of the memory card is denoted as D1, the third data transmission pin 27 of the memory card is denoted as D2, and the fourth data transmission pin 28 of the memory card is denoted as D3.

Figure 4:
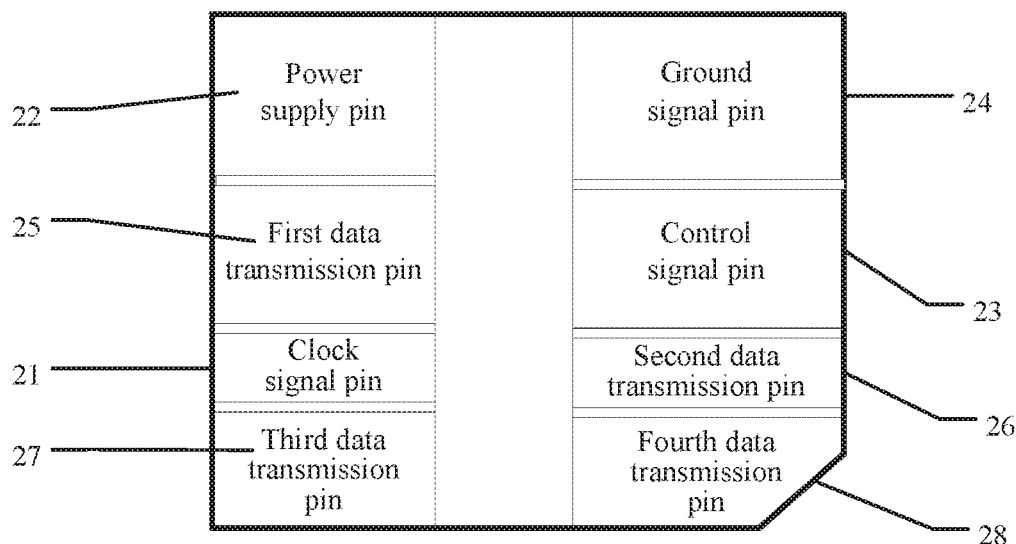
FIG. 4 is a schematic structural diagram 1 of still another memory card according to an embodiment of this application.

FIG. 4 is a schematic structural diagram 1 of still another memory card according to an embodiment of this application. Based on the memory card provided in the embodiment shown in FIG. 1, as shown in FIG. 4, the memory card includes four data transmission pins. The four data transmission pins are a first data transmission pin 25, a second data transmission pin 26, a third data transmission pin 27, and a fourth data transmission pin 28.

The third data transmission pin 27 of the memory card is adjacent to and isolated from the clock signal pin 21 of the memory card. A region, on the card body of the memory card, in which the third data transmission pin 27 and the clock signal pin 21 of the memory card are located is corresponding to a region, on the card body of the nano SIM card, in which the clock signal pin 31 of the nano SIM card is located.

A region, on the card body of the memory card, in which the first data transmission pin 25 of the memory card is located is corresponding to a region, on the card body of the nano SIM card, in which the reset signal pin 32 of the nano SIM card is located. The clock signal pin 21 of the memory card is adjacent to the first data transmission pin 25.

A region, on the card body of the memory card, in which the power supply pin 22 of the memory card is located is corresponding to a region, on the card body of the nano SIM card, in which the power supply pin 33 of the nano SIM card is located.

The fourth data transmission pin 28 of the memory card is adjacent to and isolated from the second data transmission pin 26 of the memory card. A region, on the card body of the memory card, in which the fourth data transmission pin 28 and the second data transmission pin 26 are located is corresponding to a region, on the card body of the nano SIM card, in which the data transmission pin 34 of the nano SIM card is located.

A region, on the card body of the memory card, in which the control signal pin 23 of the memory card is located is corresponding to a region, on the card body of the nano SIM card, in which the programming voltage/input signal pin 35 of the nano SIM card is located. The second data transmission pin 26 is adjacent to the control signal pin 23 of the memory card.

A region, on the card body of the memory card, in which the ground signal pin 24 of the memory card is located is corresponding to a region, on the card body of the nano SIM card, in which the ground signal pin 36 of the nano SIM card is located.

In this embodiment, specifically, it can be learned from the foregoing pin layout that a region, on the card body of the memory card, in which four pins, that is, the third data transmission pin 27 of the memory card, the clock signal pin 21 of the memory card, the first data transmission pin 25 of the memory card, and the power supply pin 22 of the memory card, are located is corresponding to a region, on the card body of the nano SIM card, in which the clock signal pin 31, the reset signal pin 32, and the power supply pin 33 of the nano SIM card are located. It can be learned that the third data transmission pin 27 of the memory card and the clock signal pin 21 of the memory card are obtained by splitting the region of the clock signal pin 31 of the nano SIM card into two pins. Shapes and sizes of the third data transmission pin 27 of the memory card and the clock signal pin 21 of the memory card are not limited. In addition, shapes and sizes of the first data transmission pin 25 of the memory card and the power supply pin 22 of the memory card are not limited.

A region, on the card body of the memory card, in which four pins, that is, the fourth data transmission pin 28 of the memory card, the second data transmission pin 26 of the memory card, the control signal pin 23 of the memory card, and the ground signal pin 24 of the memory card, are located is corresponding to a region, on the card body of the nano SIM card, in which the data transmission pin 34, the programming voltage/input signal pin 35, and the ground signal pin 36 of the nano SIM card are located, thereby ensuring that the memory card provided in this embodiment and the nano SIM card can share a same nano SIM card holder. For example, the region, on the card body of the memory card, in which the foregoing four pins are located is the same as the region, on the card body of the nano SIM card, in which the data transmission pin 34, the programming voltage/input signal pin 35, and the ground signal pin 36 of the nano SIM card are located. It can be learned that the fourth data transmission pin 28 of the memory card and the second data transmission pin 26 of the memory card are obtained by splitting the region of the data transmission pin 34 of the nano SIM card into two pins. Shapes and sizes of the fourth data transmission pin 28 of the memory card and the second data transmission pin 26 of the memory card are not limited. In addition, shapes and sizes of the control signal pin 23 of the memory card and the ground signal pin 24 of the memory card are not limited.

Figure 4A:
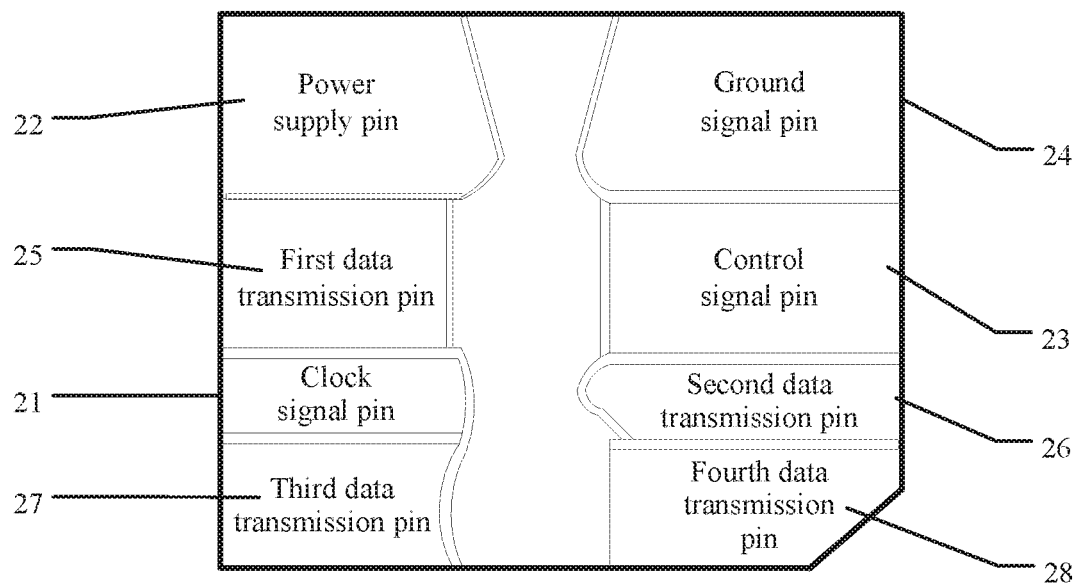
FIG. 4a is a schematic structural diagram 2 of still another memory card according to an embodiment of this application.

In addition, FIG. 4a is a schematic structural diagram 2 of still another memory card according to an embodiment of this application. As shown in FIG. 4a, shapes of the pins (or contacts, or connection terminals) of the memory card are not limited. The pins (or the contacts, or the connection terminals) may be in irregular shapes. In addition, in this embodiment, there may be spacings between the pins (or the contacts, or the connection terminals) of the memory card, and therefore a wire of the memory card may be disposed on a surface of these spacings; or there may be no spacing, and therefore a wire of the memory card may be inside the card body of the memory card.

In this embodiment, "corresponding" may also be referred to as a mapping relationship. For example, that the region, on the card body of the memory card, in which the first data transmission pin 25 of the memory card is located is corresponding to the region, on the card body of the nano SIM card, in which the reset signal pin 32 of the nano SIM card is located means that the first data transmission pin 25 of the memory card is mapped to the reset signal pin 32 of the nano SIM card. To be specific, the first data transmission pin 25 of the memory card and the reset signal pin 32 of the nano SIM card are corresponding/mapped to a same spring of a nano SIM card holder.

Figure 5:
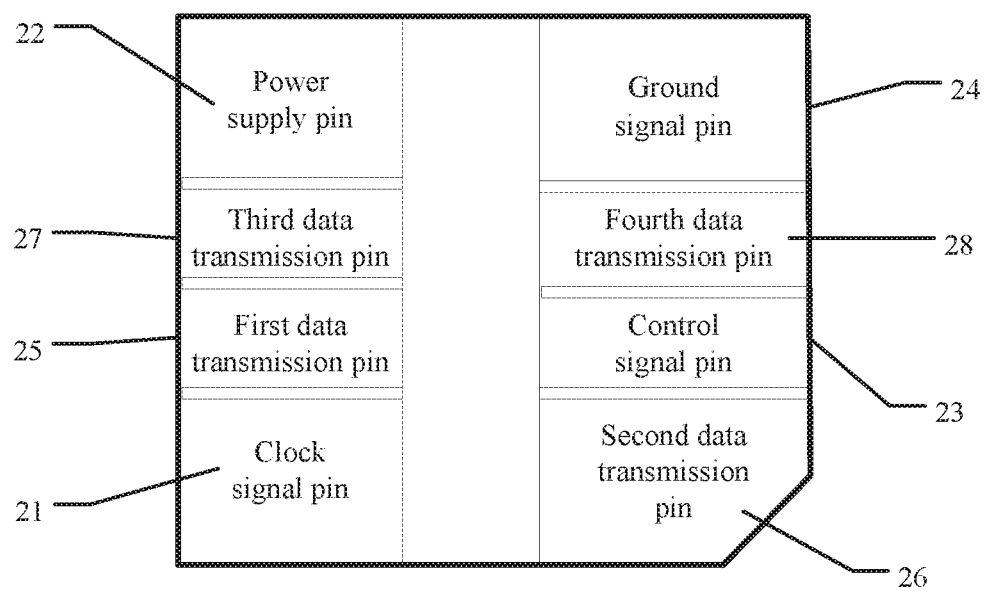
FIG. 5 is a schematic structural diagram of yet another memory card according to an embodiment of this application.

FIG. 5 is a schematic structural diagram of yet another memory card according to an embodiment of this application. Based on the memory card provided in the embodiment shown in FIG. 1, as shown in FIG. 5, the memory card includes four data transmission pins. The four data transmission pins are a first data transmission pin 25, a second data transmission pin 26, a third data transmission pin 27, and a fourth data transmission pin 28.

A region, on the card body of the memory card, in which the clock signal pin 21 of the memory card is located is corresponding to a region, on the card body of the nano SIM card, in which the clock signal pin 31 of the nano SIM card is located.

The first data transmission pin 25 of the memory card is adjacent to and isolated from the third data transmission pin 27 of the memory card. A region, on the card body of the memory card, in which the first data transmission pin 25 and the third data transmission pin 27 are located is corresponding to a region, on the card body of the nano SIM card, in which the reset signal pin 32 of the nano SIM card is located. The first data transmission pin 25 is adjacent to the clock signal pin 21 of the memory card.

A region, on the card body of the memory card, in which the power supply pin 22 of the memory card is located is corresponding to a region, on the card body of the nano SIM card, in which the power supply pin 33 of the nano SIM card is located. The third data transmission pin 27 is adjacent to the power supply pin 22 of the memory card.

A region, on the card body of the memory card, in which the second data transmission pin 26 of the memory card is located is corresponding to a region, on the card body of the nano SIM card, in which the data transmission pin 34 of the nano SIM card is located.

The control signal pin 23 of the memory card is adjacent to and isolated from the fourth data transmission pin 28 of the memory card. A region, on the card body of the memory card, in which the control signal pin 23 of the memory card and the fourth data transmission pin 28 are located is corresponding to a region, on the card body of the nano SIM card, in which the programming voltage/input signal pin 35 of the nano SIM card is located. The control signal pin 23 of the memory card is adjacent to the second data transmission pin 26 of the memory card.

A region, on the card body of the memory card, in which the ground signal pin 24 of the memory card is located is corresponding to a region, on the card body of the nano SIM card, in which the ground signal pin 36 of the nano SIM card is located. The fourth data transmission pin 28 is adjacent to the ground signal pin 24 of the memory card.

In this embodiment, specifically, it can be learned from the foregoing pin layout that a region, on the card body of the memory card, in which four pins, that is, the clock signal pin 21 of the memory card, the first data transmission pin 25 of the memory card, the third data transmission pin 27 of the memory card, and the power supply pin 22 of the memory card, are located is corresponding to a region, on the card body of the nano SIM card, in which the clock signal pin 31, the reset signal pin 32, and the power supply pin 33 of the nano SIM card are located. It can be learned that the first data transmission pin 25 of the memory card and the third data transmission pin 27 of the memory card are obtained by splitting the region of the reset signal pin 32 of the nano SIM card into two pins. Shapes and sizes of the first data transmission pin 25 of the memory card and the third data transmission pin 27 of the memory card are not limited. In addition, shapes and sizes of the clock signal pin 21 of the memory card and the power supply pin 22 of the memory card are not limited.

A region, on the card body of the memory card, in which four pins, that is, the second data transmission pin 26 of the memory card, the control signal pin 23 of the memory card, the fourth data transmission pin 28 of the memory card, and the ground signal pin 24 of the memory card, are located is corresponding to a region, on the card body of the nano SIM card, in which the data transmission pin 34, the programming voltage/input signal pin 35, and the ground signal pin 36 of the nano SIM card are located. It can be learned that the control signal pin 23 of the memory card and the fourth data transmission pin 28 of the memory card are obtained by splitting the region of the programming voltage/input signal pin 35 of the nano SIM card into two pins. Shapes and sizes of the control signal pin 23 of the memory card and the fourth data transmission pin 28 of the memory card are not limited. In addition, shapes and sizes of the second data transmission pin 26 of the memory card and the ground signal pin 24 of the memory card are not limited.

In addition, in this embodiment, there may be spacings between the pins (or the contacts, or the connection terminals) of the memory card, and therefore a wire of the memory card may be disposed on a surface of these spacings; or there may be no spacing, and therefore a wire of the memory card may be inside the card body of the memory card.

In this embodiment, "corresponding" may also be referred to as a mapping relationship. For example, that the region, on the card body of the memory card, in which the clock signal pin 21 of the memory card is located is corresponding to the region, on the card body of the nano SIM card, in which the clock signal pin 31 of the nano SIM card is located means that the clock signal pin 21 of the memory card is mapped to the clock signal pin 31 of the nano SIM card. To be specific, the clock signal pin 21 of the memory card and the clock signal pin 31 of the nano SIM card are corresponding/mapped to a same spring of a nano SIM card holder.

Figure 6:
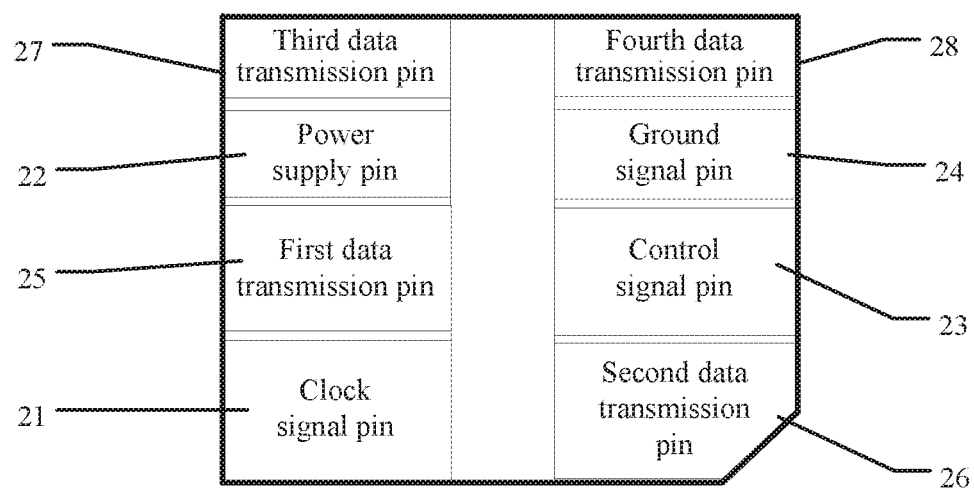
FIG. 6 is a schematic structural diagram of still yet another memory card according to an embodiment of this application.

FIG. 6 is a schematic structural diagram of still yet another memory card according to an embodiment of this application. Based on the memory card provided in the embodiment shown in FIG. 1, as shown in FIG. 6, the memory card includes four data transmission pins. The four data transmission pins are a first data transmission pin 25, a second data transmission pin 26, a third data transmission pin 27, and a fourth data transmission pin 28.

A region, on the card body of the memory card, in which the clock signal pin 21 of the memory card is located is corresponding to a region, on the card body of the nano SIM card, in which the clock signal pin 31 of the nano SIM card is located.

A region, on the card body of the memory card, in which the first data transmission pin 25 of the memory card is located is corresponding to a region, on the card body of the nano SIM card, in which the reset signal pin 32 of the nano SIM card is located.

The third data transmission pin 27 of the memory card is adjacent to and isolated from the power supply pin 22 of the memory card. A region, on the card body of the memory card, in which the third data transmission pin 27 and the power supply pin 22 of the memory card are located is corresponding to a region, on the card body of the nano SIM card, in which the power supply pin 33 of the nano SIM card is located. The power supply pin 22 of the memory card is adjacent to the first data transmission pin 25 of the memory card. An area of the power supply pin 22 of the memory card is greater than that of the third data transmission pin 27 of the memory card.

A region, on the card body of the memory card, in which the second data transmission pin 26 of the memory card is located is corresponding to a region, on the card body of the nano SIM card, in which the data transmission pin 34 of the nano SIM card is located.

A region, on the card body of the memory card, in which the control signal pin 23 of the memory card is located is corresponding to a region, on the card body of the nano SIM card, in which the programming voltage/input signal pin 35 of the nano SIM card is located.

The fourth data transmission pin 28 of the memory card is adjacent to and isolated from the ground signal pin 24 of the memory card. A region, on the card body of the memory card, in which the fourth data transmission pin 28 and the ground signal pin 24 of the memory card are located is corresponding to a region, on the card body of the nano SIM card, in which the ground signal pin 36 of the nano SIM card is located. The ground signal pin 24 of the memory card is adjacent to the control signal pin 23 of the memory card. An area of the ground signal pin 24 of the memory card is greater than that of the fourth data transmission pin 28 of the memory card.

In this embodiment, specifically, it can be learned from the foregoing pin layout that a region, on the card body of the memory card, in which four pins, that is, the clock signal pin 21 of the memory card, the first data transmission pin 25 of the memory card, the power supply pin 22 of the memory card, and the third data transmission pin 27 of the memory card, are located is corresponding to a region, on the card body of the nano SIM card, in which the clock signal pin 31, the reset signal pin 32, and the power supply pin 33 of the nano SIM card are located. It can be learned that the power supply pin 22 of the memory card and the third data transmission pin 27 of the memory card are obtained by splitting the region of the power supply pin 33 of the nano SIM card into two pins. The power supply pin 22 of the memory card is adjacent to the first data transmission pin 25 of the memory card. Shapes and sizes of the power supply pin 22 of the memory card and the third data transmission pin 27 of the memory card are not limited. In addition, shapes and sizes of the clock signal pin 21 of the memory card and the first data transmission pin 25 of the memory card are not limited.

A region, on the card body of the memory card, in which four pins, that is, the second data transmission pin 26 of the memory card, the control signal pin 23 of the memory card, the ground signal pin 24 of the memory card, and the fourth data transmission pin 28 of the memory card, are located is corresponding to a region, on the card body of the nano SIM card, in which the data transmission pin 34, the programming voltage/input signal pin 35, and the ground signal pin 36 of the nano SIM card are located. It can be learned that the ground signal pin 24 of the memory card and the fourth data transmission pin 28 of the memory card are obtained by splitting the region of the ground signal pin 36 of the nano SIM card into two pins. In this embodiment, the ground signal pin 24 of the memory card is adjacent to the control signal pin 23 of the memory card. Shapes and sizes of the ground signal pin 24 of the memory card and the fourth data transmission pin 28 of the memory card are not limited. In addition, shapes and sizes of the second data transmission pin 26 of the memory card and the control signal pin 23 of the memory card are not limited.

Further, an area of the power supply pin 22 of the memory card is greater than that of the third data transmission pin 27 of the memory card, and an area of the ground signal pin 24 of the memory card is greater than that of the fourth data transmission pin 28 of the memory card. Therefore, the third data transmission pin 27 of the memory card and the fourth data transmission pin 28 of the memory card that are newly added are placed on an outer side of the card as far as possible. In addition, a location, on the card body of the memory card, of a center point of the power supply pin 22 of the memory card is corresponding to a location, on the card body of the nano SIM card, of the power supply pin 33 of the nano SIM card as much as possible; and a location, on the card body of the memory card, of a center point of the ground signal pin 24 of the memory card is corresponding to a location, on the card body of the nano SIM card, of the ground signal pin 36 of the nano SIM card as much as possible. Therefore, a tolerance margin of the nano SD card can be increased.

For example, based on an angle of view of FIG. 6, from right to left, the third data transmission pin 27 of the memory card has a first edge and a second edge, and the memory card has a first side edge and a second side edge. A length of a distance from the first edge of the third data transmission pin 27 of the memory card to the first side edge of the memory card is 1 millimeter, with a tolerance of 0.1 millimeters. A length of a distance from the second edge of the third data transmission pin 27 of the memory card to the first side edge of the memory card is 4.9 millimeters, with a tolerance of 0.1 millimeters. A length of a distance from the first edge of the third data transmission pin 27 of the memory card to the second side edge of the memory card is 11.3 millimeters, with a tolerance of 0.1 millimeters. A length of a distance from the second edge of the third data transmission pin 27 of the memory card to the second side edge of the memory card is 7.55 millimeters, with a tolerance of 0.1 millimeters.

Based on the angle of view of FIG. 6, from right to left, the fourth data transmission pin 28 of the memory card has a first edge and a second edge. A length of a distance from the first edge of the fourth data transmission pin 28 of the memory card to the first side edge of the memory card is 7.55 millimeters, with a tolerance of 0.1 millimeters. A length of a distance from the second edge of the fourth data transmission pin 28 of the memory card to the first side edge of the memory card is 11.3 millimeters, with a tolerance of 0.1 millimeters. A length of a distance from the first edge of the fourth data transmission pin 28 of the memory card to the second side edge of the memory card is 4.9 millimeters, with a tolerance of 0.1 millimeters. A length of a distance from the second edge of the fourth data transmission pin 28 of the memory card to the second side edge of the memory card is 1 millimeter, with a tolerance of 0.1 millimeters. For lengths of distances from a first edge and a second edge of another pin in FIG. 6 to the first side edge of the memory card and the second side edge of the memory card respectively, refer to the foregoing data.

Based on the angle of view of FIG. 6, from top to bottom, the memory card has a third side edge and a fourth side edge, the fourth data transmission pin 28 of the memory card has a third edge and a fourth edge, the ground signal pin 24 of the memory card has a third edge and a fourth edge, the control signal pin 23 of the memory card has a third edge and a fourth edge, and the second data transmission pin 26 of the memory card has a third edge and a fourth edge. A maximum length of a distance from the third edge of the fourth data transmission pin 28 of the memory card to the third side edge of the memory card is 0.2 millimeters, and a maximum length of a distance from the fourth edge of the fourth data transmission pin 28 of the memory card to the third side edge of the memory card is 1.05 millimeters. A maximum length of a distance from the third edge of the ground signal pin 24 of the memory card to the third side edge of the memory card is 1.4 millimeters, and a maximum length of a distance from the fourth edge of the ground signal pin 24 of the memory card to the third side edge of the memory card is 2.6 millimeters, with a tolerance of 0.1 millimeters. A maximum length of a distance from the third edge of the control signal pin 23 of the memory card to the third side edge of the memory card is 3.35 millimeters, with a tolerance of 0.1 millimeters; and a maximum length of a distance from the fourth edge of the control signal pin 23 of the memory card to the third side edge of the memory card is 5.25 millimeters, with a tolerance of 0.1 millimeters. A maximum length of a distance from the third edge of the second data transmission pin 26 of the memory card to the third side edge of the memory card is 6.05 millimeters, with a tolerance of 0.1 millimeters; and a maximum length of a distance from the fourth edge of the second data transmission pin 26 of the memory card to the third side edge of the memory card is 7.95 millimeters, with a tolerance of 0.1 millimeters. A distance between the third side edge of the memory card and the fourth side edge of the memory card is 8.8 millimeters, with a tolerance of 0.1 millimeters.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card.

In this embodiment, "corresponding" may also be referred to as a mapping relationship. For example, that the region, on the card body of the memory card, in which the first data transmission pin 25 of the memory card is located is corresponding to the region, on the card body of the nano SIM card, in which the reset signal pin 32 of the nano SIM card is located means that the first data transmission pin 25 of the memory card is mapped to the reset signal pin 32 of the nano SIM card. To be specific, the first data transmission pin 25 of the memory card and the reset signal pin 32 of the nano SIM card are corresponding/mapped to a same spring of a nano SIM card holder.

Figure 7:
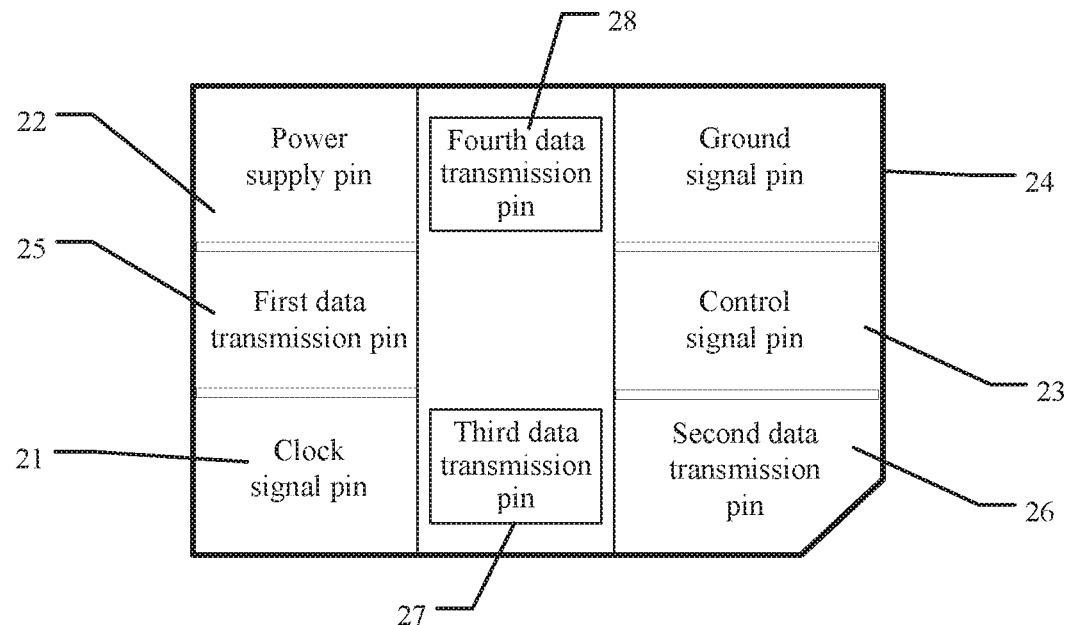
FIG. 7 is a schematic structural diagram of a further memory card according to an embodiment of this application.

FIG. 7 is a schematic structural diagram of a further memory card according to an embodiment of this application. Based on the memory card provided in the embodiment shown in FIG. 1, as shown in FIG. 7, the memory card includes four data transmission pins. The four data transmission pins are a first data transmission pin 25, a second data transmission pin 26, a third data transmission pin 27, and a fourth data transmission pin 28.

A region, on the card body of the memory card, in which the clock signal pin 21 of the memory card is located is corresponding to a region, on the card body of the nano SIM card, in which the clock signal pin 31 of the nano SIM card is located.

A region, on the card body of the memory card, in which the first data transmission pin 25 of the memory card is located is corresponding to a region, on the card body of the nano SIM card, in which the reset signal pin 32 of the nano SIM card is located.

A region, on the card body of the memory card, in which the power supply pin 22 of the memory card is located is corresponding to a region, on the card body of the nano SIM card, in which the power supply pin 33 of the nano SIM card is located.

A region, on the card body of the memory card, in which the second data transmission pin 26 of the memory card is located is corresponding to a region, on the card body of the nano SIM card, in which the data transmission pin 34 of the nano SIM card is located.

A region, on the card body of the memory card, in which the control signal pin 23 of the memory card is located is corresponding to a region, on the card body of the nano SIM card, in which the programming voltage/input signal pin 35 of the nano SIM card is located.

A region, on the card body of the memory card, in which the ground signal pin 24 of the memory card is located is corresponding to a region, on the card body of the nano SIM card, in which the ground signal pin 36 of the nano SIM card is located.

The third data transmission pin 27 of the memory card is located between the clock signal pin 21 of the memory card and the second data transmission pin 26 of the memory card. The third data transmission pin 27 is isolated from the clock signal pin 21 of the memory card and the second data transmission pin 26 of the memory card. A center point of the third data transmission pin 27 is located in a connection line between a center point of the clock signal pin 21 of the memory card and a center point of the second data transmission pin 26.

The fourth data transmission pin 28 of the memory card is located between the power supply pin 22 of the memory card and the ground signal pin 24 of the memory card. The fourth data transmission pin 28 is isolated from the power supply pin 22 of the memory card and the ground signal pin 24 of the memory card. A center point of the fourth data transmission pin 28 is located in a connection line between a center point of the power supply pin 22 of the memory card and a center point of the ground signal pin 24 of the memory card.

In this embodiment, specifically, it can be learned from the foregoing pin layout that a region, on the card body of the memory card, in which three pins, that is, the clock signal pin 21 of the memory card, the first data transmission pin 25 of the memory card, and the power supply pin 22 of the memory card, are located is corresponding to a region, on the card body of the nano SIM card, in which the clock signal pin 31, the reset signal pin 32, and the power supply pin 33 of the nano SIM card are located.

A region, on the card body of the memory card, in which three pins, that is, the second data transmission pin 26 of the memory card, the control signal pin 23 of the memory card, and the ground signal pin 24 of the memory card, are located is corresponding to a region, on the card body of the nano SIM card, in which the data transmission pin 34, the programming voltage/input signal pin 35, and the ground signal pin 36 of the nano SIM card are located.

The third data transmission pin 27 of the memory card is disposed between the clock signal pin 21 of the memory card and the second data transmission pin 26 of the memory card. Optionally, a center point of the third data transmission pin 27 of the memory card is located in a connection line between a center point of the clock signal pin 21 of the memory card and a center point of the second data transmission pin 26 of the memory card. The fourth data transmission pin 28 of the memory card is disposed between the power supply pin 22 of the memory card and the ground signal pin 24 of the memory card. Optionally, a center point of the fourth data transmission pin 28 of the memory card is located in a connection line between a center point of the power supply pin 22 of the memory card and a center point of the ground signal pin 24 of the memory card.

For example, based on an angle of view of FIG. 7, from left to right, the clock signal pin 21 of the memory card has a first edge and a second edge, the memory card has a first side edge and a second side edge, the third data transmission pin 27 of the memory card has a first edge and a second edge, and the second data transmission pin 26 of the memory card has a first edge and a second edge. A maximum length of a distance from the first edge of the clock signal pin 21 of the memory card to the first side edge of the memory card is 1.00 millimeter, and a minimum length of a distance from the second edge of the clock signal pin 21 of the memory card to the first side edge of the memory card is 3.00 millimeters. A maximum length of a distance from the first edge of the third data transmission pin 27 of the memory card to the first side edge of the memory card is 4.81 millimeters, and a minimum length of a distance from the second edge of the third data transmission pin 27 of the memory card to the first side edge of the memory card is 6.81 millimeters. A maximum length of a distance from the first edge of the second data transmission pin 26 of the memory card to the first side edge of the memory card is 8.62 millimeters, and a minimum length of a distance from the second edge of the second data transmission pin 26 of the memory card to the first side edge of the memory card is 10.02 millimeters. A distance value between the first side edge of the memory card and the second side edge of the memory card is 12.30 millimeters, with a tolerance of 0.1 millimeters. A length of a distance from the second data transmission pin 26 of the memory card to the second side edge of the memory card is 1.65 millimeters, with a tolerance of 0.1 millimeters. An angle of a locating notch of the memory card is a 45-degree angle. For lengths of distances from a first edge and a second edge of another pin in FIG. 7 to the first side edge of the memory card and the second side edge of the memory card respectively, refer to the foregoing data.

Based on the angle of view of FIG. 7, from top to bottom, the memory card has a third side edge and a fourth side edge, the second data transmission pin 26 of the memory card has a third edge and a fourth edge, the control signal pin 23 of the memory card has a third edge and a fourth edge, the ground signal pin 24 of the memory card has a third edge and a fourth edge, the fourth data transmission pin 28 of the memory card has a third edge and a fourth edge, and the third data transmission pin 27 of the memory card has a third edge and a fourth edge. A maximum length of a distance from the third edge of the fourth data transmission pin 28 of the memory card to the third side edge of the memory card is 0.81 millimeters, and a minimum length of a distance from the fourth edge of the fourth data transmission pin 28 of the memory card to the third side edge of the memory card is 2.51 millimeters. A maximum length of a distance from the third edge of the third data transmission pin 27 of the memory card to the third side edge of the memory card is 6.29 millimeters, and a minimum length of a distance from the fourth edge of the third data transmission pin 27 of the memory card to the third side edge of the memory card is 7.99 millimeters. A maximum length of a distance from the third edge of the ground signal pin 24 of the memory card to the third side edge of the memory card is 1.01 millimeters, and a minimum length of a distance from the fourth edge of the ground signal pin 24 of the memory card to the third side edge of the memory card is 2.71 millimeters. A maximum length of a distance from the third edge of the control signal pin 23 of the memory card to the third side edge of the memory card is 3.55 millimeters, and a minimum length of a distance from the fourth edge of the control signal pin 23 of the memory card to the third side edge of the memory card is 5.25 millimeters. A maximum length of a distance from the third edge of the second data transmission pin 26 of the memory card to the third side edge of the memory card is 6.09 millimeters, and a minimum length of a distance from the fourth edge of the second data transmission pin 26 of the memory card to the third side edge of the memory card is 7.79 millimeters. A distance value between the third side edge of the memory card and the fourth side edge of the memory card is 8.80 millimeters, with a tolerance of 0.1 millimeters.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card.

In this embodiment, "corresponding" may also be referred to as a mapping relationship. For example, that the region, on the card body of the memory card, in which the power supply pin 22 of the memory card is located is corresponding to the region, on the card body of the nano SIM card, in which the power supply pin 33 of the nano SIM card is located means that the power supply pin 22 of the memory card is mapped to the power supply pin 33 of the nano SIM card. To be specific, the power supply pin 22 of the memory card and the power supply pin 33 of the nano SIM card are corresponding/mapped to a same spring of a nano SIM card holder.

Figure 8:
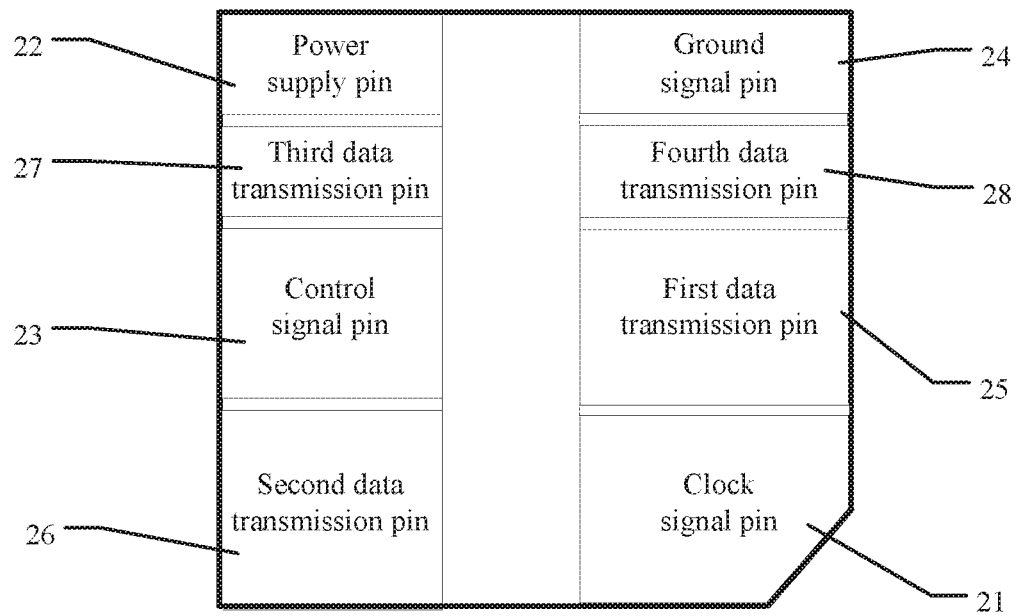
FIG. 8 is a schematic structural diagram of a still further memory card according to an embodiment of this application.

FIG. 8 is a schematic structural diagram of a still further memory card according to an embodiment of this application. Based on the memory card provided in the embodiment shown in FIG. 1, as shown in FIG. 8, the memory card includes four data transmission pins. The four data transmission pins are a first data transmission pin 25, a second data transmission pin 26, a third data transmission pin 27, and a fourth data transmission pin 28.

A region, on the card body of the memory card, in which the second data transmission pin 26 of the memory card is located is corresponding to a region, on the card body of the nano SIM card, in which the clock signal pin 31 of the nano SIM card is located.

A region, on the card body of the memory card, in which the control signal pin 23 of the memory card is located is corresponding to a region, on the card body of the nano SIM card, in which the reset signal pin 32 of the nano SIM card is located.

The third data transmission pin 27 of the memory card is adjacent to and isolated from the power supply pin 22 of the memory card. A region, on the card body of the memory card, in which the third data transmission pin 27 and the power supply pin 22 of the memory card are located is corresponding to a region, on the card body of the nano SIM card, in which the power supply pin 33 of the nano SIM card is located. The third data transmission pin 27 is adjacent to the control signal pin 23 of the memory card.

A region, on the card body of the memory card, in which the clock signal pin 21 of the memory card is located is corresponding to a region, on the card body of the nano SIM card, in which the data transmission pin 34 of the nano SIM card is located.

A region, on the card body of the memory card, in which the first data transmission pin 25 of the memory card is located is corresponding to a region, on the card body of the nano SIM card, in which the programming voltage/input signal pin 35 of the nano SIM card is located.

The fourth data transmission pin 28 of the memory card is adjacent to and isolated from the ground signal pin 24 of the memory card. A region, on the card body of the memory card, in which the fourth data transmission pin 28 and the ground signal pin 24 of the memory card are located is corresponding to a region, on the card body of the nano SIM card, in which the ground signal pin 36 of the nano SIM card is located. The fourth data transmission pin 28 is adjacent to the first data transmission pin 25 of the memory card.

In this embodiment, specifically, a region, on the card body of the memory card, in which four pins, that is, the second data transmission pin 26 of the memory card, the control signal pin 23 of the memory card, the third data transmission pin 27 of the memory card, and the power supply pin 22 of the memory card, are located is corresponding to a region, on the card body of the nano SIM card, in which the clock signal pin 31, the reset signal pin 32, and the power supply pin 33 of the nano SIM card are located. It can be learned that the third data transmission pin 27 of the memory card and the power supply pin 22 of the memory card are obtained by splitting the region of the power supply pin 33 of the nano SIM card into two pins. Shapes and sizes of the third data transmission pin 27 of the memory card and the power supply pin 22 of the memory card are not limited. In addition, shapes and sizes of the second data transmission pin 26 of the memory card and the control signal pin 23 of the memory card are not limited.

Further, a region, on the card body of the memory card, in which four pins, that is, the clock signal pin 21 of the memory card, the first data transmission pin 25 of the memory card, the fourth data transmission pin 28 of the memory card, and the ground signal pin 24 of the memory card, are located is corresponding to a region, on the card body of the nano SIM card, in which the data transmission pin 34, the programming voltage/input signal pin 35, and the ground signal pin 36 of the nano SIM card are located. It can be learned that the fourth data transmission pin 28 of the memory card and the ground signal pin 24 of the memory card are obtained by splitting the region of the ground signal pin 36 of the nano SIM card into two pins. Shapes and sizes of the fourth data transmission pin 28 of the memory card and the ground signal pin 24 of the memory card are not limited. In addition, shapes and sizes of the clock signal pin 21 of the memory card and the first data transmission pin 25 of the memory card are not limited.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card.

In this embodiment, "corresponding" may also be referred to as a mapping relationship. For example, that the region, on the card body of the memory card, in which the second data transmission pin 26 of the memory card is located is corresponding to the region, on the card body of the nano SIM card, in which the clock signal pin 31 of the nano SIM card is located means that the second data transmission pin 26 of the memory card is mapped to the clock signal pin 31 of the nano SIM card. To be specific, the second data transmission pin 26 of the memory card and the clock signal pin 31 of the nano SIM card are corresponding/mapped to a same spring of a nano SIM card holder.

Figure 9:
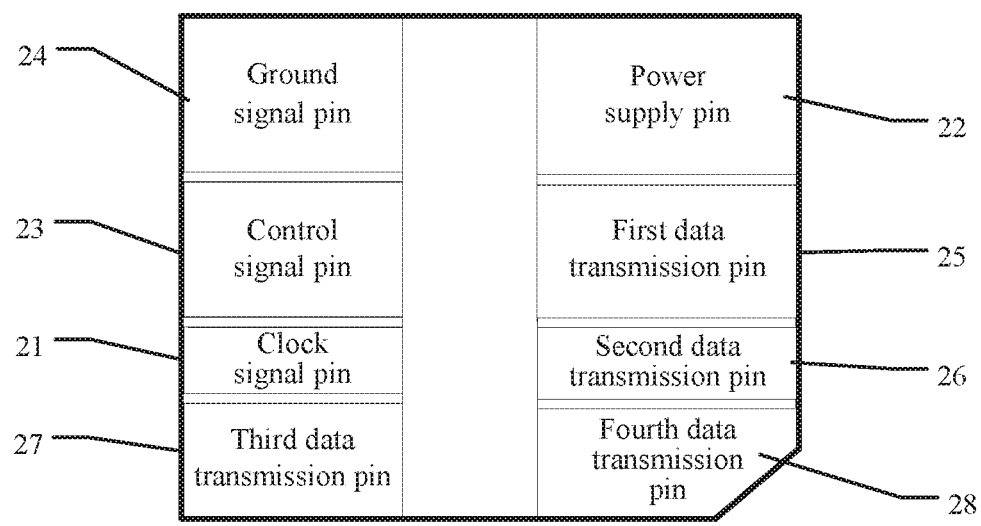
FIG. 9 is a schematic structural diagram of a yet further memory card according to an embodiment of this application.

FIG. 9 is a schematic structural diagram of a yet further memory card according to an embodiment of this application. Based on the memory card provided in the embodiment shown in FIG. 1, as shown in FIG. 9, the memory card includes four data transmission pins. The four data transmission pins are a first data transmission pin 25, a second data transmission pin 26, a third data transmission pin 27, and a fourth data transmission pin 28.

The third data transmission pin 27 of the memory card is adjacent to and isolated from the clock signal pin 21 of the memory card. A region, on the card body of the memory card, in which the third data transmission pin 27 and the clock signal pin 21 of the memory card are located is corresponding to a region, on the card body of the nano SIM card, in which the clock signal pin 31 of the nano SIM card is located.

A region, on the card body of the memory card, in which the control signal pin 23 of the memory card is located is corresponding to a region, on the card body of the nano SIM card, in which the reset signal pin 32 of the nano SIM card is located. A clock signal pin of the memory card is adjacent to the control signal pin 23 of the memory card.

A region, on the card body of the memory card, in which the ground signal pin 24 of the memory card is located is corresponding to a region, on the card body of the nano SIM card, in which the power supply pin 33 of the nano SIM card is located.

The fourth data transmission pin 28 of the memory card is adjacent to and isolated from the second data transmission pin 26 of the memory card. A region, on the card body of the memory card, in which the fourth data transmission pin 28 and the second data transmission pin 26 are located is corresponding to a region, on the card body of the nano SIM card, in which the data transmission pin 34 of the nano SIM card is located.

A region, on the card body of the memory card, in which the first data transmission pin 25 of the memory card is located is corresponding to a region, on the card body of the nano SIM card, in which the programming voltage/input signal pin 35 of the nano SIM card is located. The second data transmission pin 26 is adjacent to the first data transmission pin 25.

A region, on the card body of the memory card, in which the power supply pin 22 of the memory card is located is corresponding to a region, on the card body of the nano SIM card, in which the ground signal pin 36 of the nano SIM card is located.

In this embodiment, specifically, it can be learned from the foregoing pin layout that a region, on the card body of the memory card, in which four pins, that is, the third data transmission pin 27 of the memory card, the clock signal pin 21 of the memory card, the control signal pin 23 of the memory card, and the ground signal pin 24 of the memory card, are located is corresponding to a region, on the card body of the nano SIM card, in which the clock signal pin 31, the reset signal pin 32, and the power supply pin 33 of the nano SIM card are located. It can be learned that the third data transmission pin 27 of the memory card and the clock signal pin 21 of the memory card are obtained by splitting the region of the clock signal pin 31 of the nano SIM card into two pins. Shapes and sizes of the third data transmission pin 27 of the memory card and the clock signal pin 21 of the memory card are not limited. In addition, shapes and sizes of the control signal pin 23 of the memory card and the ground signal pin 24 of the memory card are not limited.

A region, on the card body of the memory card, in which four pins, that is, the fourth data transmission pin 28 of the memory card, the second data transmission pin 26 of the memory card, the first data transmission pin 25 of the memory card, and the power supply pin 22 of the memory card, are located is corresponding to a region, on the card body of the nano SIM card, in which the data transmission pin 34, the programming voltage/input signal pin 35, and the ground signal pin 36 of the nano SIM card are located. It can be learned that the fourth data transmission pin 28 of the memory card and the second data transmission pin 26 of the memory card are obtained by splitting the region of the data transmission pin 34 of the nano SIM card into two pins. Shapes and sizes of the fourth data transmission pin 28 of the memory card and the second data transmission pin 26 of the memory card are not limited. In addition, shapes and sizes of the first data transmission pin 25 of the memory card and the power supply pin 22 of the memory card are not limited.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card.

In this embodiment. "corresponding" may also be referred to as a mapping relationship. For example, that the region, on the card body of the memory card, in which the ground signal pin 24 of the memory card is located is corresponding to the region, on the card body of the nano SIM card, in which the power supply pin 33 of the nano SIM card is located means that the ground signal pin 24 of the memory card is mapped to the power supply pin 33 of the nano SIM card. To be specific, the ground signal pin 24 of the memory card and the power supply pin 3 of the nano SIM card are corresponding/mapped to a same spring of a nano SIM card holder.

Figure 10:
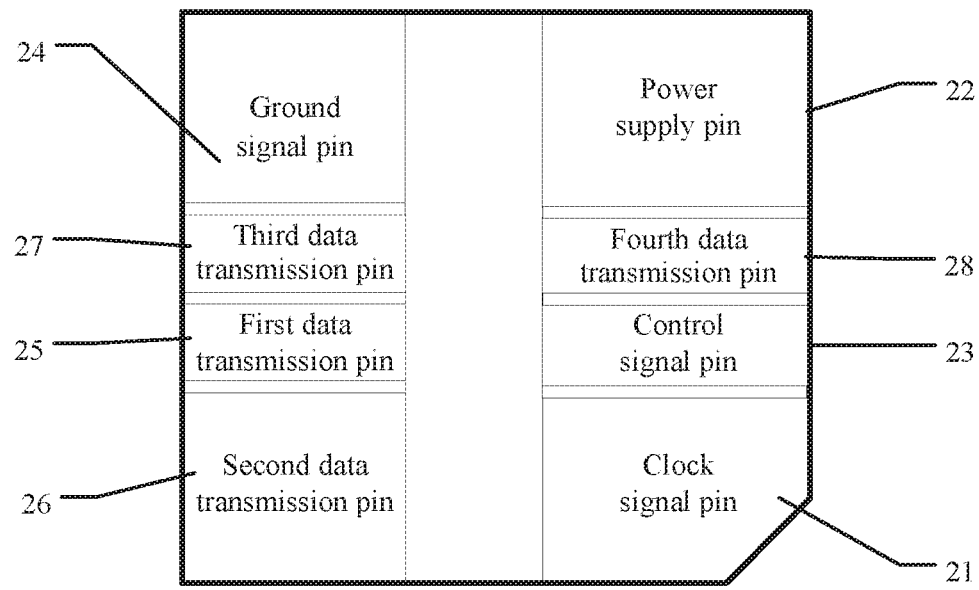
FIG. 10 is a schematic structural diagram of a still yet further memory card according to an embodiment of this application.

FIG. 10 is a schematic structural diagram of a still yet further memory card according to an embodiment of this application. Based on the memory card provided in the embodiment shown in FIG. 1, as shown in FIG. 10, the memory card includes four data transmission pins. The four data transmission pins are a first data transmission pin 25, a second data transmission pin 26, a third data transmission pin 27, and a fourth data transmission pin 28.

A region, on the card body of the memory card, in which the second data transmission pin 26 of the memory card is located is corresponding to a region, on the card body of the nano SIM card, in which the clock signal pin 31 of the nano SIM card is located.

The first data transmission pin 25 of the memory card is adjacent to and isolated from the third data transmission pin 27 of the memory card. A region, on the card body of the memory card, in which the first data transmission pin 25 and the third data transmission pin 27 are located is corresponding to a region, on the card body of the nano SIM card, in which the reset signal pin 32 of the nano SIM card is located. The first data transmission pin 25 is adjacent to the second data transmission pin 26 of the memory card.

A region, on the card body of the memory card, in which the ground signal pin 24 of the memory card is located is corresponding to a region, on the card body of the nano SIM card, in which the power supply pin 33 of the nano SIM card is located.

A region, on the card body of the memory card, in which the clock signal pin 21 of the memory card is located is corresponding to a region, on the card body of the nano SIM card, in which the data transmission pin 34 of the nano SIM card is located.

The control signal pin 23 of the memory card is adjacent to and isolated from the fourth data transmission pin 28 of the memory card. A region, on the card body of the memory card, in which the control signal pin 23 of the memory card and the fourth data transmission pin 28 are located is corresponding to a region, on the card body of the nano SIM card, in which the programming voltage/input signal pin 35 of the nano SIM card is located. The control signal pin 23 of the memory card is adjacent to the clock signal pin 21 of the memory card.

A region, on the card body of the memory card, in which the power supply pin 22 of the memory card is located is corresponding to a region, on the card body of the nano SIM card, in which the ground signal pin 36 of the nano SIM card is located.

In this embodiment, specifically, it can be learned from the foregoing pin layout that a region, on the card body of the memory card, in which four pins, that is, the second data transmission pin 26 of the memory card, the first data transmission pin 25 of the memory card, the third data transmission pin 27 of the memory card, and the ground signal pin 24 of the memory card, are located is corresponding to a region, on the card body of the nano SIM card, in which the clock signal pin 31, the reset signal pin 32, and the power supply pin 33 of the nano SIM card are located. It can be learned that the first data transmission pin 25 of the memory card and the third data transmission pin 27 of the memory card are obtained by splitting the region of the reset signal pin 32 of the nano SIM card into two pins. Shapes and sizes of the first data transmission pin 25 of the memory card and the third data transmission pin 27 of the memory card are not limited. In addition, shapes and sizes of the second data transmission pin 26 of the memory card and the ground signal pin 24 of the memory card are not limited.

A region, on the card body of the memory card, in which four pins, that is, the clock signal pin 21 of the memory card, the control signal pin 23 of the memory card, the fourth data transmission pin 28 of the memory card, and the power supply pin 22 of the memory card, are located is corresponding to a region, on the card body of the nano SIM card, in which the data transmission pin 34, the programming voltage/input signal pin 35, and the ground signal pin 36 of the nano SIM card are located. It can be learned that the control signal pin 23 of the memory card and the fourth data transmission pin 28 of the memory card are obtained by splitting the region of the programming voltage/input signal pin 35 of the nano SIM card into two pins. Shapes and sizes of the control signal pin 23 of the memory card and the fourth data transmission pin 28 of the memory card are not limited. In addition, shapes and sizes of the clock signal pin 21 of the memory card and the power supply pin 22 of the memory card are not limited.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 11:
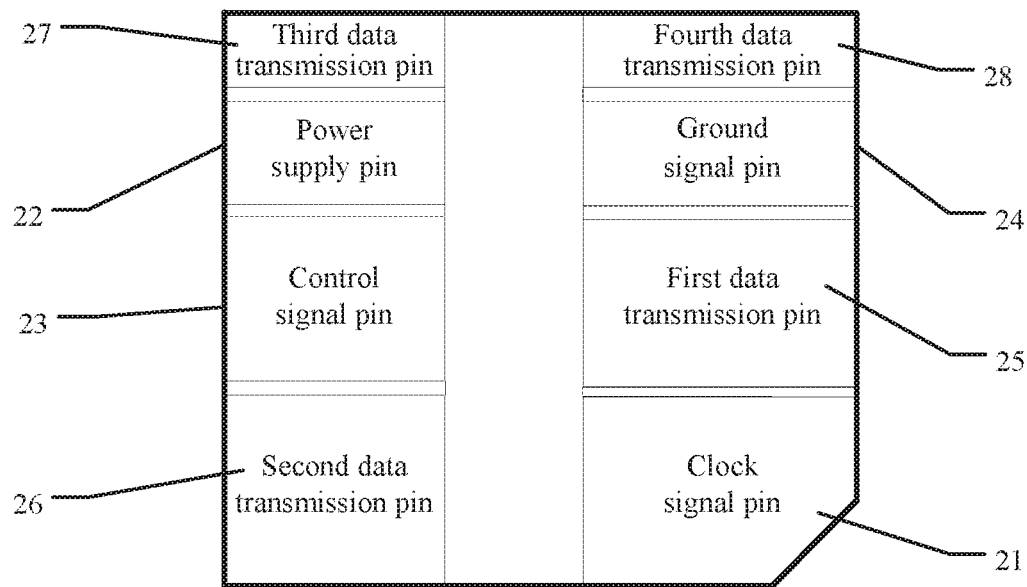
FIG. 11 is a schematic structural diagram of even yet another memory card according to an embodiment of this application.

FIG. 11 is a schematic structural diagram of even yet another memory card according to an embodiment of this application. Based on the memory card provided in the embodiment shown in FIG. 1, as shown in FIG. 11, the memory card includes four data transmission pins. The four data transmission pins are a first data transmission pin 25, a second data transmission pin 26, a third data transmission pin 27, and a fourth data transmission pin 28.

A region, on the card body of the memory card, in which the second data transmission pin 26 of the memory card is located is corresponding to a region, on the card body of the nano SIM card, in which the clock signal pin 31 of the nano SIM card is located.

A region, on the card body of the memory card, in which the control signal pin 23 of the memory card is located is corresponding to a region, on the card body of the nano SIM card, in which the reset signal pin 32 of the nano SIM card is located.

The third data transmission pin 27 of the memory card is adjacent to and isolated from the power supply pin 22 of the memory card. A region, on the card body of the memory card, in which the third data transmission pin 27 and the power supply pin 22 of the memory card are located is corresponding to a region, on the card body of the nano SIM card, in which the power supply pin 33 of the nano SIM card is located. The power supply pin 22 of the memory card is adjacent to the control signal pin 23 of the memory card. An area of the power supply pin 22 of the memory card is greater than that of the third data transmission pin 27 of the memory card.

A region, on the card body of the memory card, in which the clock signal pin 21 of the memory card is located is corresponding to a region, on the card body of the nano SIM card, in which the data transmission pin 34 of the nano SIM card is located.

A region, on the card body of the memory card, in which the first data transmission pin of the memory card is located is corresponding to a region, on the card body of the nano SIM card, in which the programming voltage/input signal pin 35 of the nano SIM card is located.

The fourth data transmission pin 28 of the memory card is adjacent to and isolated from the ground signal pin 24 of the memory card. A region, on the card body of the memory card, in which the fourth data transmission pin 28 and the ground signal pin 24 of the memory card are located is corresponding to a region, on the card body of the nano SIM card, in which the ground signal pin 36 of the nano SIM card is located. The ground signal pin 24 of the memory card is adjacent to the first data transmission pin of the memory card. An area of the ground signal pin 24 of the memory card is greater than that of the fourth data transmission pin 28 of the memory card.

In this embodiment, specifically, it can be learned from the foregoing pin layout that a region, on the card body of the memory card, in which four pins, that is, the second data transmission pin 26 of the memory card, the control signal pin 23 of the memory card, the power supply pin 22 of the memory card, and the third data transmission pin 27 of the memory card, are located is corresponding to a region, on the card body of the nano SIM card, in which the clock signal pin 31, the reset signal pin 32, and the power supply pin 33 of the nano SIM card are located. It can be learned that the power supply pin 22 of the memory card and the third data transmission pin 27 of the memory card are obtained by splitting the region of the power supply pin 33 of the nano SIM card into two pins, the power supply pin 22 of the memory card is adjacent to the control signal pin 23 of the memory card. Shapes and sizes of the power supply pin 22 of the memory card and the third data transmission pin 27 of the memory card are not limited. In addition, shapes and sizes of the second data transmission pin 26 of the memory card and the control signal pin 23 of the memory card are not limited.

A region, on the card body of the memory card, in which four pins, that is, the clock signal pin 21 of the memory card, the first data transmission pin 25 of the memory card, the ground signal pin 24 of the memory card, and the fourth data transmission pin 28 of the memory card, are located is corresponding to a region, on the card body of the nano SIM card, in which the data transmission pin 34, the programming voltage/input signal pin 35, and the ground signal pin 36 of the nano SIM card are located. It can be learned that the ground signal pin 24 of the memory card and the fourth data transmission pin 28 of the memory card are obtained by splitting the region of the ground signal pin 36 of the nano SIM card into two pins. In this embodiment, the ground signal pin 24 of the memory card is adjacent to the first data transmission pin 25 of the memory card. Shapes and sizes of the ground signal pin 24 of the memory card and the fourth data transmission pin 28 of the memory card are not limited. In addition, shapes and sizes of the clock signal pin 21 of the memory card and the first data transmission pin 25 of the memory card are not limited.

Further, an area of the power supply pin 22 of the memory card is greater than that of the third data transmission pin 27 of the memory card, and an area of the ground signal pin 24 of the memory card is greater than that of the fourth data transmission pin 28 of the memory card. Therefore, the third data transmission pin 27 of the memory card and the fourth data transmission pin 28 of the memory card that are newly added are placed on an outer side of the card as far as possible. In addition, a location, on the card body of the memory card, of a center point of the power supply pin 22 of the memory card is corresponding to a location, on the card body of the nano SIM card, of the power supply pin 33 of the nano SIM card as much as possible; and a location, on the card body of the memory card, of a center point of the ground signal pin 24 of the memory card is corresponding to a location, on the card body of the nano SIM card, of the ground signal pin 36 of the nano SIM card as much as possible. Therefore, a tolerance margin of the nano SD card can be increased.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 12:
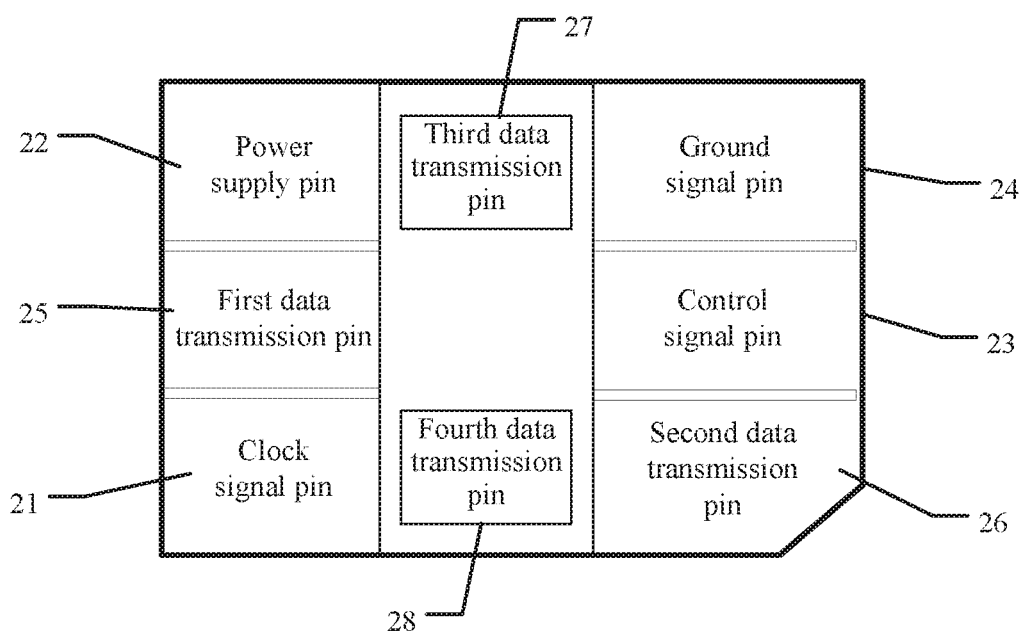
FIG. 12 is a schematic structural diagram of even yet another memory card according to an embodiment of this application.

FIG. 12 is a schematic structural diagram of even yet another memory card according to an embodiment of this application. Based on the memory card provided in the embodiment shown in FIG. 1, as shown in FIG. 12, the memory card includes four data transmission pins. The four data transmission pins are a first data transmission pin 25, a second data transmission pin 26, a third data transmission pin 27, and a fourth data transmission pin 28.

A region, on the card body of the memory card, in which the clock signal pin 21 of the memory card is located is corresponding to a region, on the card body of the nano SIM card, in which the clock signal pin 31 of the nano SIM card is located.

A region, on the card body of the memory card, in which the first data transmission pin 25 of the memory card is located is corresponding to a region, on the card body of the nano SIM card, in which the reset signal pin 32 of the nano SIM card is located.

A region, on the card body of the memory card, in which the power supply pin 22 of the memory card is located is corresponding to a region, on the card body of the nano SIM card, in which the power supply pin 33 of the nano SIM card is located.

A region, on the card body of the memory card, in which the second data transmission pin 26 of the memory card is located is corresponding to a region, on the card body of the nano SIM card, in which the data transmission pin 34 of the nano SIM card is located.

A region, on the card body of the memory card, in which the control signal pin 23 of the memory card is located is corresponding to a region, on the card body of the nano SIM card, in which the programming voltage/input signal pin 35 of the nano SIM card is located.

A region, on the card body of the memory card, in which the ground signal pin 24 of the memory card is located is corresponding to a region, on the card body of the nano SIM card, in which the ground signal pin 36 of the nano SIM card is located.

The fourth data transmission pin 28 of the memory card is located between the clock signal pin 21 of the memory card and the second data transmission pin 26 of the memory card. The fourth data transmission pin 28 is isolated from the clock signal pin 21 of the memory card and the second data transmission pin 26 of the memory card. A center point of the fourth data transmission pin 28 is located in a connection line between a center point of the clock signal pin 21 of the memory card and a center point of the second data transmission pin 26.

The third data transmission pin 27 of the memory card is located between the power supply pin 22 of the memory card and the ground signal pin 24 of the memory card. The third data transmission pin 27 is isolated from the power supply pin 22 of the memory card and the ground signal pin 24 of the memory card. A center point of the third data transmission pin 27 is located in a connection line between a center point of the power supply pin 22 of the memory card and a center point of the ground signal pin 24 of the memory card.

In this embodiment, specifically, it can be learned from the foregoing pin layout that a region, on the card body of the memory card, in which three pins, that is, the clock signal pin 21 of the memory card, the first data transmission pin 25 of the memory card, and the power supply pin 22 of the memory card, are located is corresponding to a region, on the card body of the nano SIM card, in which the clock signal pin 31, the reset signal pin 32, and the power supply pin 33 of the nano SIM card are located.

A region, on the card body of the memory card, in which three pins, that is, the second data transmission pin 26 of the memory card, the control signal pin 23 of the memory card, and the ground signal pin 24 of the memory card, are located is corresponding to a region, on the card body of the nano SIM card, in which the data transmission pin 34, the programming voltage/input signal pin 35, and the ground signal pin 36 of the nano SIM card are located.

The fourth data transmission pin 28 of the memory card is disposed between the clock signal pin 21 of the memory card and the second data transmission pin 26 of the memory card. Optionally, a center point of the fourth data transmission pin 28 of the memory card is located in a connection line between a center point of the clock signal pin 21 of the memory card and a center point of the second data transmission pin 26 of the memory card. The third data transmission pin 27 of the memory card is disposed between the power supply pin 22 of the memory card and the ground signal pin 24 of the memory card. Optionally, a center point of the third data transmission pin 27 of the memory card is located in a connection line between a center point of the power supply pin 22 of the memory card and a center point of the ground signal pin 24 of the memory card.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 13:
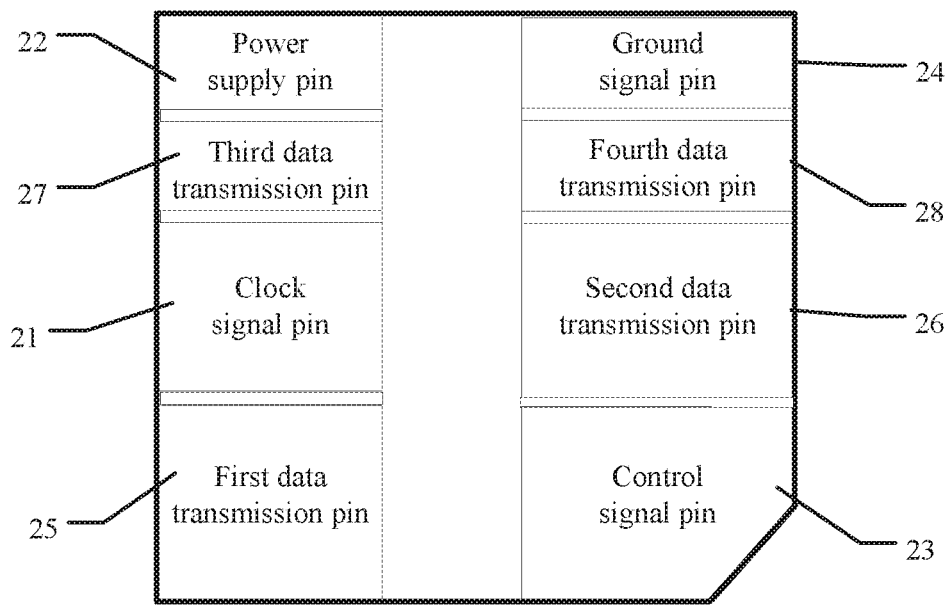
FIG. 13 is a schematic structural diagram of even yet another memory card according to an embodiment of this application.

FIG. 13 is a schematic structural diagram of even yet another memory card according to an embodiment of this application. Based on the memory card provided in the embodiment shown in FIG. 1, as shown in FIG. 13, the memory card includes four data transmission pins. The four data transmission pins are a first data transmission pin 25, a second data transmission pin 26, a third data transmission pin 27, and a fourth data transmission pin 28.

A region, on the card body of the memory card, in which the first data transmission pin 25 of the memory card is located is corresponding to a region, on the card body of the nano SIM card, in which the clock signal pin 31 of the nano SIM card is located.

A region, on the card body of the memory card, in which the clock signal pin 21 of the memory card is located is corresponding to a region, on the card body of the nano SIM card, in which the reset signal pin 32 of the nano SIM card is located.

The third data transmission pin 27 of the memory card is adjacent to and isolated from the power supply pin 22 of the memory card. A region, on the card body of the memory card, in which the third data transmission pin 27 and the power supply pin 22 of the memory card are located is corresponding to a region, on the card body of the nano SIM card, in which the power supply pin 33 of the nano SIM card is located. The third data transmission pin 27 is adjacent to the clock signal pin 21 of the memory card.

A region, on the card body of the memory card, in which the control signal pin 23 of the memory card is located is corresponding to a region, on the card body of the nano SIM card, in which the data transmission pin 34 of the nano SIM card is located.

A region, on the card body of the memory card, in which the second data transmission pin 26 of the memory card is located is corresponding to a region, on the card body of the nano SIM card, in which the programming voltage/input signal pin 35 of the nano SIM card is located.

The fourth data transmission pin 28 of the memory card is adjacent to and isolated from the ground signal pin 24 of the memory card. A region, on the card body of the memory card, in which the fourth data transmission pin 28 and the ground signal pin 24 of the memory card are located is corresponding to a region, on the card body of the nano SIM card, in which the ground signal pin 36 of the nano SIM card is located. The fourth data transmission pin 28 is adjacent to the second data transmission pin 26 of the memory card.

In this embodiment, specifically, it can be learned from the foregoing pin layout that a region, on the card body of the memory card, in which four pins, that is, the first data transmission pin 25 of the memory card, the clock signal pin 21 of the memory card, the third data transmission pin 27 of the memory card, and the power supply pin 22 of the memory card, are located is corresponding to a region, on the card body of the nano SIM card, in which the clock signal pin 31, the reset signal pin 32, and the power supply pin 33 of the nano SIM card are located. It can be learned that the third data transmission pin 27 of the memory card and the power supply pin 22 of the memory card are obtained by splitting the region of the power supply pin 33 of the nano SIM card into two pins. Shapes and sizes of the third data transmission pin 27 of the memory card and the power supply pin 22 of the memory card are not limited. In addition, shapes and sizes of the first data transmission pin 25 of the memory card and the clock signal pin 21 of the memory card are not limited.

A region, on the card body of the memory card, in which four pins, that is, the control signal pin 23 of the memory card, the second data transmission pin 26 of the memory card, the fourth data transmission pin 28 of the memory card, and the ground signal pin 24 of the memory card, are located is corresponding to a region, on the card body of the nano SIM card, in which the data transmission pin 34, the programming voltage/input signal pin 35, and the ground signal pin 36 of the nano SIM card are located. It can be learned that the fourth data transmission pin 28 of the memory card and the ground signal pin 24 of the memory card are obtained by splitting the region of the ground signal pin 36 of the nano SIM card into two pins. Shapes and sizes of the fourth data transmission pin 28 of the memory card and the ground signal pin 24 of the memory card are not limited. In addition, shapes and sizes of the control signal pin 23 of the memory card and the second data transmission pin 26 of the memory card are not limited.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 14:
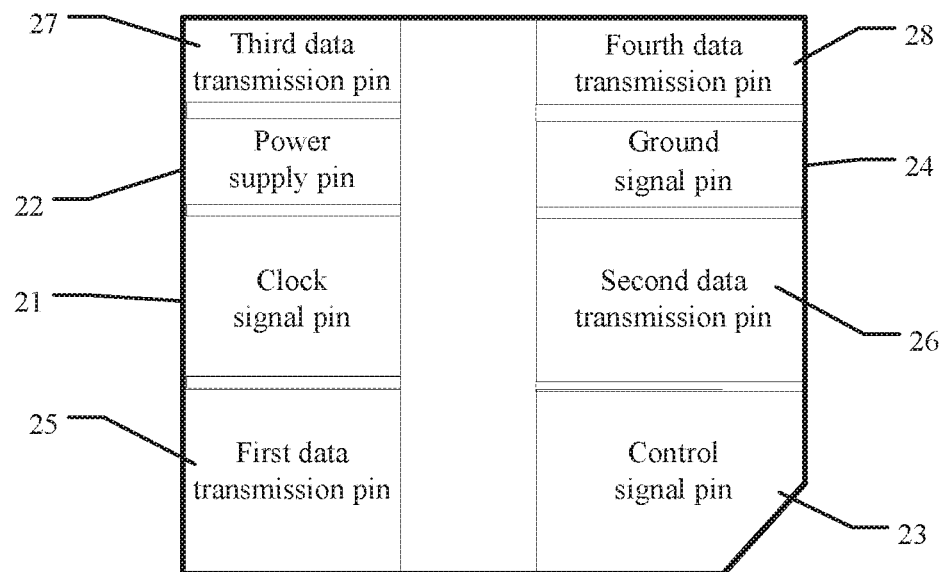
FIG. 14 is a schematic structural diagram of even yet another memory card according to an embodiment of this application.

FIG. 14 is a schematic structural diagram of even yet another memory card according to an embodiment of this application. Based on the memory card provided in the embodiment shown in FIG. 1, as shown in FIG. 14, the memory card includes four data transmission pins. The four data transmission pins are a first data transmission pin 25, a second data transmission pin 26, a third data transmission pin 27, and a fourth data transmission pin 28.

A region, on the card body of the memory card, in which the first data transmission pin 25 of the memory card is located is corresponding to a region, on the card body of the nano SIM card, in which the clock signal pin 31 of the nano SIM card is located.

A region, on the card body of the memory card, in which the clock signal pin 21 of the memory card is located is corresponding to a region, on the card body of the nano SIM card, in which the reset signal pin 32 of the nano SIM card is located.

The third data transmission pin 27 of the memory card is adjacent to and isolated from the power supply pin 22 of the memory card. A region, on the card body of the memory card, in which the third data transmission pin 27 and the power supply pin 22 of the memory card are located is corresponding to a region, on the card body of the nano SIM card, in which the power supply pin 33 of the nano SIM card is located. The power supply pin 22 of the memory card is adjacent to the clock signal pin 21 of the memory card. An area of the power supply pin 22 of the memory card is greater than that of the third data transmission pin 27 of the memory card.

A region, on the card body of the memory card, in which the control signal pin 23 of the memory card is located is corresponding to a region, on the card body of the nano SIM card, in which the data transmission pin 34 of the nano SIM card is located.

A region, on the card body of the memory card, in which the second data transmission pin 26 of the memory card is located is corresponding to a region, on the card body of the nano SIM card, in which the programming voltage/input signal pin 35 of the nano SIM card is located.

The fourth data transmission pin 28 of the memory card is adjacent to and isolated from the ground signal pin 24 of the memory card. A region, on the card body of the memory card, in which the fourth data transmission pin 28 and the ground signal pin 24 of the memory card are located is corresponding to a region, on the card body of the nano SIM card, in which the ground signal pin 36 of the nano SIM card is located. The ground signal pin 24 of the memory card is adjacent to the second data transmission pin 26 of the memory card. An area of the ground signal pin 24 of the memory card is greater than that of the fourth data transmission pin 28 of the memory card.

In this embodiment, specifically, it can be learned from the foregoing pin layout that a region, on the card body of the memory card, in which four pins, that is, the first data transmission pin 25 of the memory card, the clock signal pin 21 of the memory card, the power supply pin 22 of the memory card, and the third data transmission pin 27 of the memory card, are located is corresponding to a region, on the card body of the nano SIM card, in which the clock signal pin 31, the reset signal pin 32, and the power supply pin 33 of the nano SIM card are located. It can be learned that the power supply pin 22 of the memory card and the third data transmission pin 27 of the memory card are obtained by splitting the region of the power supply pin 33 of the nano SIM card into two pins. The power supply pin 22 of the memory card is adjacent to the clock signal pin 21 of the memory card. Shapes and sizes of the power supply pin 22 of the memory card and the third data transmission pin 27 of the memory card are not limited. In addition, shapes and sizes of the first data transmission pin 25 of the memory card and the clock signal pin 21 of the memory card are not limited.

A region, on the card body of the memory card, in which four pins, that is, the control signal pin 23 of the memory card, the second data transmission pin 26 of the memory card, the ground signal pin 24 of the memory card, and the fourth data transmission pin 28 of the memory card, are located is corresponding to a region, on the card body of the nano SIM card, in which the data transmission pin 34, the programming voltage/input signal pin 35, and the ground signal pin 36 of the nano SIM card are located. It can be learned that the ground signal pin 24 of the memory card and the fourth data transmission pin 28 of the memory card are obtained by splitting the region of the ground signal pin 36 of the nano SIM card into two pins. In this embodiment, the ground signal pin 24 of the memory card is adjacent to the second data transmission pin 26 of the memory card. Shapes and sizes of the ground signal pin 24 of the memory card and the fourth data transmission pin 28 of the memory card are not limited. In addition, shapes and sizes of the control signal pin 23 of the memory card and the second data transmission pin 26 of the memory card are not limited.

Further, an area of the power supply pin 22 of the memory card is greater than that of the third data transmission pin 27 of the memory card, and an area of the ground signal pin 24 of the memory card is greater than that of the fourth data transmission pin 28 of the memory card. Therefore, the third data transmission pin 27 of the memory card and the fourth data transmission pin 28 of the memory card that are newly added are placed on an outer side of the card as far as possible. In addition, a location, on the card body of the memory card, of a center point of the power supply pin 22 of the memory card is corresponding to a location, on the card body of the nano SIM card, of the power supply pin 33 of the nano SIM card as much as possible; and a location, on the card body of the memory card, of a center point of the ground signal pin 24 of the memory card is corresponding to a location, on the card body of the nano SIM card, of the ground signal pin 36 of the nano SIM card as much as possible. Therefore, a tolerance margin of the nano SD card can be increased.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 15:
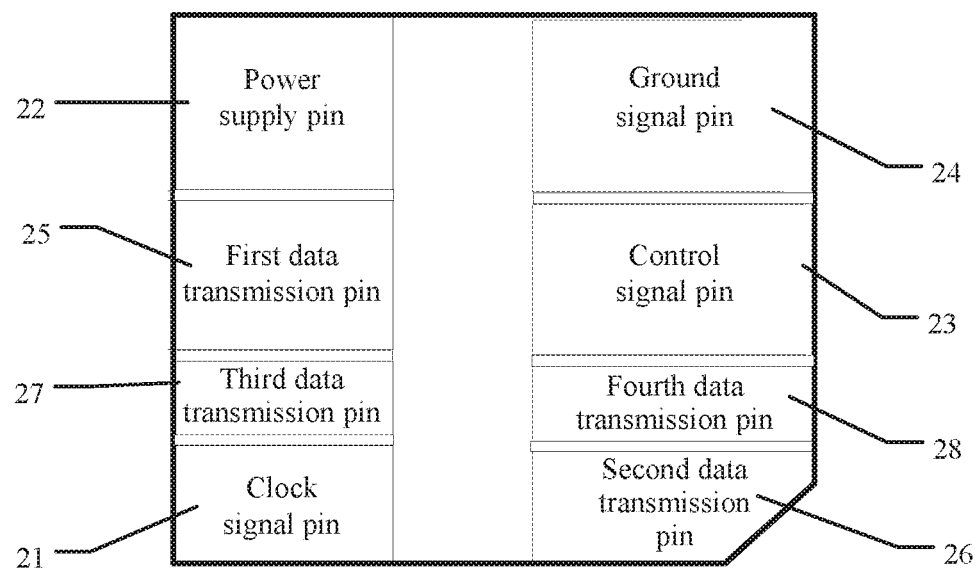
FIG. 15 is a schematic structural diagram of even yet another memory card according to an embodiment of this application.

FIG. 15 is a schematic structural diagram of even yet another memory card according to an embodiment of this application. Based on the memory card provided in the embodiment shown in FIG. 1, as shown in FIG. 15, the memory card includes four data transmission pins. The four data transmission pins are a first data transmission pin 25, a second data transmission pin 26, a third data transmission pin 27, and a fourth data transmission pin 28.

The third data transmission pin 27 of the memory card is adjacent to and isolated from the clock signal pin 21 of the memory card. A region, on the card body of the memory card, in which the third data transmission pin 27 and the clock signal pin 21 of the memory card are located is corresponding to a region, on the card body of the nano SIM card, in which the clock signal pin 31 of the nano SIM card is located.

A region, on the card body of the memory card, in which the first data transmission pin 25 of the memory card is located is corresponding to a region, on the card body of the nano SIM card, in which the reset signal pin 32 of the nano SIM card is located. The third data transmission pin 27 of the memory card is adjacent to the first data transmission pin 25.

A region, on the card body of the memory card, in which the power supply pin 22 of the memory card is located is corresponding to a region, on the card body of the nano SIM card, in which the power supply pin 33 of the nano SIM card is located.

The fourth data transmission pin 28 of the memory card is adjacent to and isolated from the second data transmission pin 26 of the memory card. A region, on the card body of the memory card, in which the fourth data transmission pin 28 and the second data transmission pin 26 are located is corresponding to a region, on the card body of the nano SIM card, in which the data transmission pin 34 of the nano SIM card is located.

A region, on the card body of the memory card, in which the control signal pin 23 of the memory card is located is corresponding to a region, on the card body of the nano SIM card, in which the programming voltage/input signal pin 35 of the nano SIM card is located. The fourth data transmission pin 28 of the memory card is adjacent to the control signal pin 23 of the memory card.

A region, on the card body of the memory card, in which the ground signal pin 24 of the memory card is located is corresponding to a region, on the card body of the nano SIM card, in which the ground signal pin 36 of the nano SIM card is located.

In this embodiment, specifically, it can be learned from the foregoing pin layout that a region, on the card body of the memory card, in which four pins, that is, the clock signal pin 21 of the memory card, the third data transmission pin 27 of the memory card, the first data transmission pin 25 of the memory card, and the power supply pin 22 of the memory card, are located is corresponding to a region, on the card body of the nano SIM card, in which the clock signal pin 31, the reset signal pin 32, and the power supply pin 33 of the nano SIM card are located. It can be learned that the third data transmission pin 27 of the memory card and the clock signal pin 21 of the memory card are obtained by splitting the region of the clock signal pin 31 of the nano SIM card into two pins. Shapes and sizes of the third data transmission pin 27 of the memory card and the clock signal pin 21 of the memory card are not limited. In addition, shapes and sizes of the first data transmission pin 25 of the memory card and the power supply pin 22 of the memory card are not limited.

A region, on the card body of the memory card, in which four pins, that is, the second data transmission pin 26 of the memory card, the fourth data transmission pin 28 of the memory card, the control signal pin 23 of the memory card, and the ground signal pin 24 of the memory card, are located is corresponding to a region, on the card body of the nano SIM card, in which the data transmission pin 34, the programming voltage/input signal pin 35, and the ground signal pin 36 of the nano SIM card are located. It can be learned that the fourth data transmission pin 28 of the memory card and the second data transmission pin 26 of the memory card are obtained by splitting the region of the data transmission pin 34 of the nano SIM card into two pins. Shapes and sizes of the fourth data transmission pin 28 of the memory card and the second data transmission pin 26 of the memory card are not limited. In addition, shapes and sizes of the control signal pin 23 of the memory card and the ground signal pin 24 of the memory card are not limited.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 16:
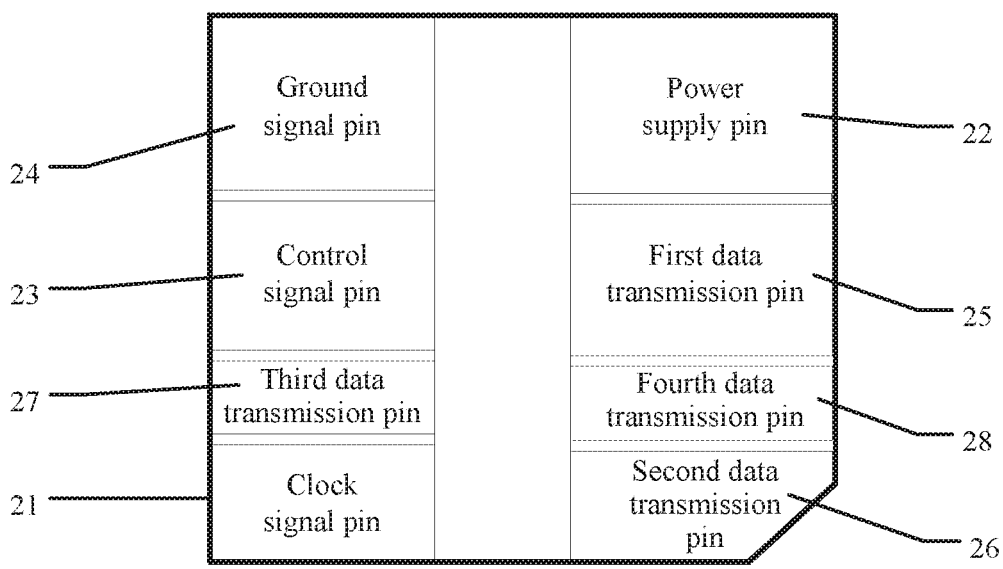
FIG. 16 is a schematic structural diagram of even yet another memory card according to an embodiment of this application.

FIG. 16 is a schematic structural diagram of even yet another memory card according to an embodiment of this application. Based on the memory card provided in the embodiment shown in FIG. 1, as shown in FIG. 16, the memory card includes four data transmission pins. The four data transmission pins are a first data transmission pin 25, a second data transmission pin 26, a third data transmission pin 27, and a fourth data transmission pin 28.

The third data transmission pin 27 of the memory card is adjacent to and isolated from the clock signal pin 21 of the memory card. A region, on the card body of the memory card, in which the third data transmission pin 27 and the clock signal pin 21 of the memory card are located is corresponding to a region, on the card body of the nano SIM card, in which the clock signal pin 31 of the nano SIM card is located.

A region, on the card body of the memory card, in which the control signal pin 23 of the memory card is located is corresponding to a region, on the card body of the nano SIM card, in which the reset signal pin 32 of the nano SIM card is located. The third data transmission pin 27 of the memory card is adjacent to the control signal pin 23 of the memory card.

A region, on the card body of the memory card, in which the ground signal pin 24 of the memory card is located is corresponding to a region, on the card body of the nano SIM card, in which the power supply pin 33 of the nano SIM card is located.

The fourth data transmission pin 28 of the memory card is adjacent to and isolated from the second data transmission pin 26 of the memory card. A region, on the card body of the memory card, in which the fourth data transmission pin 28 and the second data transmission pin 26 are located is corresponding to a region, on the card body of the nano SIM card, in which the data transmission pin 34 of the nano SIM card is located.

A region, on the card body of the memory card, in which the first data transmission pin 25 of the memory card is located is corresponding to a region, on the card body of the nano SIM card, in which the programming voltage/input signal pin 35 of the nano SIM card is located. The fourth data transmission pin 28 of the memory card is adjacent to the first data transmission pin 25.

A region, on the card body of the memory card, in which the power supply pin 22 of the memory card is located is corresponding to a region, on the card body of the nano SIM card, in which the ground signal pin 36 of the nano SIM card is located.

In this embodiment, specifically, it can be learned from the foregoing pin layout that a region, on the card body of the memory card, in which four pins, that is, the clock signal pin 21 of the memory card, the third data transmission pin 27 of the memory card, the control signal pin 23 of the memory card, and the ground signal pin 24 of the memory card, are located is corresponding to a region, on the card body of the nano SIM card, in which the clock signal pin 31, the reset signal pin 32, and the power supply pin 33 of the nano SIM card are located. It can be learned that the third data transmission pin 27 of the memory card and the clock signal pin 21 of the memory card are obtained by splitting the region of the clock signal pin 31 of the nano SIM card into two pins. Shapes and sizes of the third data transmission pin 27 of the memory card and the clock signal pin 21 of the memory card are not limited. In addition, shapes and sizes of the control signal pin 23 of the memory card and the ground signal pin 24 of the memory card are not limited.

A region, on the card body of the memory card, in which four pins, that is, the second data transmission pin 26 of the memory card, the fourth data transmission pin 28 of the memory card, the first data transmission pin 25 of the memory card, and the power supply pin 22 of the memory card, are located is corresponding to a region, on the card body of the nano SIM card, in which the data transmission pin 34, the programming voltage/input signal pin 35, and the ground signal pin 36 of the nano SIM card are located. It can be learned that the fourth data transmission pin 28 of the memory card and the second data transmission pin 26 of the memory card are obtained by splitting the region of the data transmission pin 34 of the nano SIM card into two pins. Shapes and sizes of the fourth data transmission pin 28 of the memory card and the second data transmission pin 26 of the memory card are not limited. In addition, shapes and sizes of the first data transmission pin 25 of the memory card and the power supply pin 22 of the memory card are not limited.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 17:
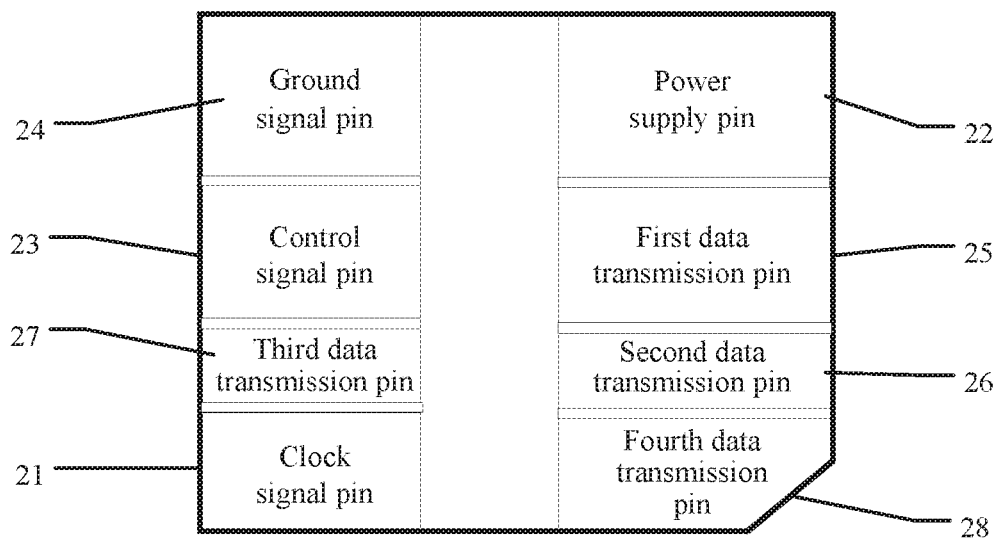
FIG. 17 is a schematic structural diagram of even yet another memory card according to an embodiment of this application.

FIG. 17 is a schematic structural diagram of even yet another memory card according to an embodiment of this application. Based on the memory card provided in the embodiment shown in FIG. 1, as shown in FIG. 17, the memory card includes four data transmission pins. The four data transmission pins are a first data transmission pin 25, a second data transmission pin 26, a third data transmission pin 27, and a fourth data transmission pin 28.

The third data transmission pin 27 of the memory card is adjacent to and isolated from the clock signal pin 21 of the memory card. A region, on the card body of the memory card, in which the third data transmission pin 27 and the clock signal pin 21 of the memory card are located is corresponding to a region, on the card body of the nano SIM card, in which the clock signal pin 31 of the nano SIM card is located.

A region, on the card body of the memory card, in which the control signal pin 23 of the memory card is located is corresponding to a region, on the card body of the nano SIM card, in which the reset signal pin 32 of the nano SIM card is located. The third data transmission pin 27 of the memory card is adjacent to the control signal pin 23 of the memory card.

A region, on the card body of the memory card, in which the ground signal pin 24 of the memory card is located is corresponding to a region, on the card body of the nano SIM card, in which the power supply pin 33 of the nano SIM card is located.

The fourth data transmission pin 28 of the memory card is adjacent to and isolated from the second data transmission pin 26 of the memory card. A region, on the card body of the memory card, in which the fourth data transmission pin 28 and the second data transmission pin 26 are located is corresponding to a region, on the card body of the nano SIM card, in which the data transmission pin 34 of the nano SIM card is located.

A region, on the card body of the memory card, in which the first data transmission pin 25 of the memory card is located is corresponding to a region, on the card body of the nano SIM card, in which the programming voltage/input signal pin 35 of the nano SIM card is located. The second data transmission pin 26 of the memory card is adjacent to the first data transmission pin 25.

A region, on the card body of the memory card, in which the power supply pin 22 of the memory card is located is corresponding to a region, on the card body of the nano SIM card, in which the ground signal pin 36 of the nano SIM card is located.

In this embodiment, specifically, it can be learned from the foregoing pin layout that a region, on the card body of the memory card, in which four pins, that is, the clock signal pin 21 of the memory card, the third data transmission pin 27 of the memory card, the control signal pin 23 of the memory card, and the ground signal pin 24 of the memory card, are located is corresponding to a region, on the card body of the nano SIM card, in which the clock signal pin 31, the reset signal pin 32, and the power supply pin 33 of the nano SIM card are located. It can be learned that the third data transmission pin 27 of the memory card and the clock signal pin 21 of the memory card are obtained by splitting the region of the clock signal pin 31 of the nano SIM card into two pins. Shapes and sizes of the third data transmission pin 27 of the memory card and the clock signal pin 21 of the memory card are not limited. In addition, shapes and sizes of the control signal pin 23 of the memory card and the ground signal pin 24 of the memory card are not limited.

A region, on the card body of the memory card, in which four pins, that is, the fourth data transmission pin 28 of the memory card, the second data transmission pin 26 of the memory card, the first data transmission pin 25 of the memory card, and the power supply pin 22 of the memory card, are located is corresponding to a region, on the card body of the nano SIM card, in which the data transmission pin 34, the programming voltage/input signal pin 35, and the ground signal pin 36 of the nano SIM card are located. It can be learned that the fourth data transmission pin 28 of the memory card and the second data transmission pin 26 of the memory card are obtained by splitting the region of the data transmission pin 34 of the nano SIM card into two pins. Shapes and sizes of the fourth data transmission pin 28 of the memory card and the second data transmission pin 26 of the memory card are not limited. In addition, shapes and sizes of the first data transmission pin 25 of the memory card and the power supply pin 22 of the memory card are not limited.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 18:
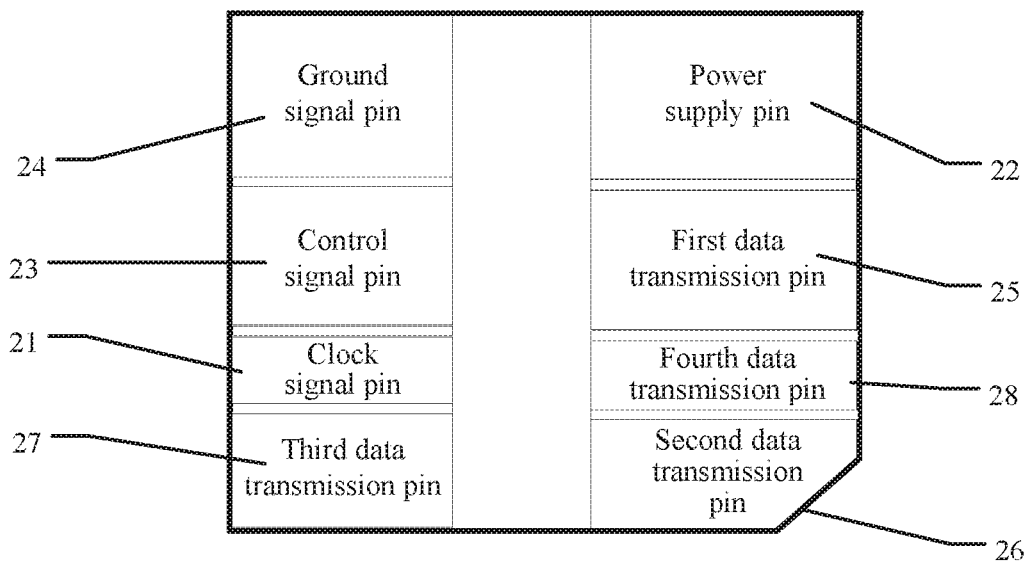
FIG. 18 is a schematic structural diagram of even yet another memory card according to an embodiment of this application.

FIG. 18 is a schematic structural diagram of even yet another memory card according to an embodiment of this application. Based on the memory card provided in the embodiment shown in FIG. 1, as shown in FIG. 18, the memory card includes four data transmission pins. The four data transmission pins are a first data transmission pin 25, a second data transmission pin 26, a third data transmission pin 27, and a fourth data transmission pin 28.

The third data transmission pin 27 of the memory card is adjacent to and isolated from the clock signal pin 21 of the memory card. A region, on the card body of the memory card, in which the third data transmission pin 27 and the clock signal pin 21 of the memory card are located is corresponding to a region, on the card body of the nano SIM card, in which the clock signal pin 31 of the nano SIM card is located.

A region, on the card body of the memory card, in which the control signal pin 23 of the memory card is located is corresponding to a region, on the card body of the nano SIM card, in which the reset signal pin 32 of the nano SIM card is located. The clock signal pin 21 of the memory card is adjacent to the control signal pin 23 of the memory card.

A region, on the card body of the memory card, in which the ground signal pin 24 of the memory card is located is corresponding to a region, on the card body of the nano SIM card, in which the power supply pin 33 of the nano SIM card is located.

The fourth data transmission pin 28 of the memory card is adjacent to and isolated from the second data transmission pin 26 of the memory card. A region, on the card body of the memory card, in which the fourth data transmission pin 28 and the second data transmission pin 26 are located is corresponding to a region, on the card body of the nano SIM card, in which the data transmission pin 34 of the nano SIM card is located.

A region, on the card body of the memory card, in which the first data transmission pin 25 of the memory card is located is corresponding to a region, on the card body of the nano SIM card, in which the programming voltage/input signal pin 35 of the nano SIM card is located. The fourth data transmission pin 28 of the memory card is adjacent to the first data transmission pin 25.

A region, on the card body of the memory card, in which the power supply pin 22 of the memory card is located is corresponding to a region, on the card body of the nano SIM card, in which the ground signal pin 36 of the nano SIM card is located.

In this embodiment, specifically, it can be learned from the foregoing pin layout that a region, on the card body of the memory card, in which four pins, that is, the third data transmission pin 27 of the memory card, the clock signal pin 21 of the memory card, the control signal pin 23 of the memory card, and the ground signal pin 24 of the memory card, are located is corresponding to a region, on the card body of the nano SIM card, in which the clock signal pin 31, the reset signal pin 32, and the power supply pin 33 of the nano SIM card are located. It can be learned that the third data transmission pin 27 of the memory card and the clock signal pin 21 of the memory card are obtained by splitting the region of the clock signal pin 31 of the nano SIM card into two pins. Shapes and sizes of the third data transmission pin 27 of the memory card and the clock signal pin 21 of the memory card are not limited. In addition, shapes and sizes of the control signal pin 23 of the memory card and the ground signal pin 24 of the memory card are not limited.

A region, on the card body of the memory card, in which four pins, that is, the second data transmission pin 26 of the memory card, the fourth data transmission pin 28 of the memory card, the first data transmission pin 25 of the memory card, and the power supply pin 22 of the memory card, are located is corresponding to a region, on the card body of the nano SIM card, in which the data transmission pin 34, the programming voltage/input signal pin 35, and the ground signal pin 36 of the nano SIM card are located. It can be learned that the fourth data transmission pin 28 of the memory card and the second data transmission pin 26 of the memory card are obtained by splitting the region of the data transmission pin 34 of the nano SIM card into two pins. Shapes and sizes of the fourth data transmission pin 28 of the memory card and the second data transmission pin 26 of the memory card are not limited. In addition, shapes and sizes of the first data transmission pin 25 of the memory card and the power supply pin 22 of the memory card are not limited.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 19:
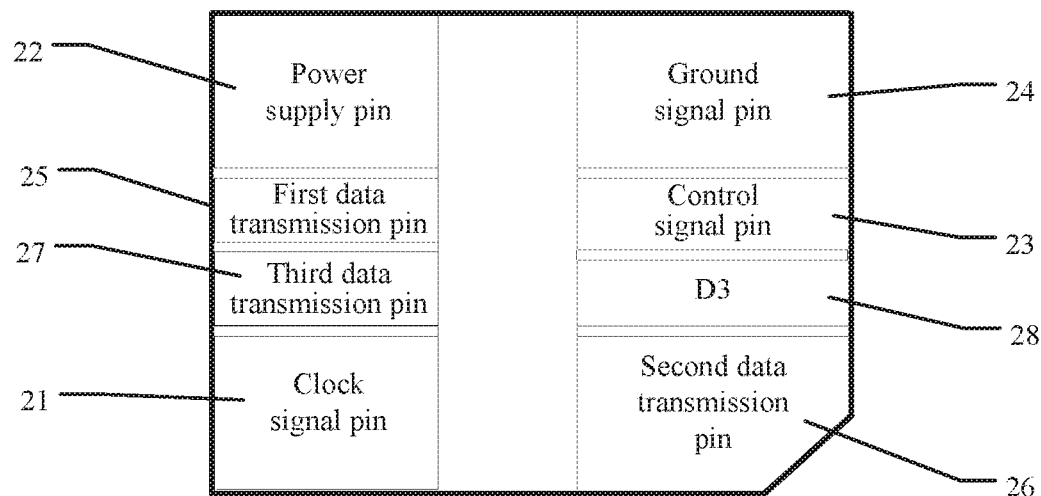
FIG. 19 is a schematic structural diagram of even yet another memory card according to an embodiment of this application.

FIG. 19 is a schematic structural diagram of even yet another memory card according to an embodiment of this application. Based on the memory card provided in the embodiment shown in FIG. 1, as shown in FIG. 19, the memory card includes four data transmission pins. The four data transmission pins are a first data transmission pin 25, a second data transmission pin 26, a third data transmission pin 27, and a fourth data transmission pin 28.

A region, on the card body of the memory card, in which the clock signal pin 21 of the memory card is located is corresponding to a region, on the card body of the nano SIM card, in which the clock signal pin 31 of the nano SIM card is located.

The first data transmission pin 25 of the memory card is adjacent to and isolated from the third data transmission pin 27 of the memory card. A region, on the card body of the memory card, in which the first data transmission pin 25 and the third data transmission pin 27 are located is corresponding to a region, on the card body of the nano SIM card, in which the reset signal pin 32 of the nano SIM card is located. The third data transmission pin 27 of the memory card is adjacent to the clock signal pin 21 of the memory card.

A region, on the card body of the memory card, in which the power supply pin 22 of the memory card is located is corresponding to a region, on the card body of the nano SIM card, in which the power supply pin 33 of the nano SIM card is located.

A region, on the card body of the memory card, in which the second data transmission pin 26 of the memory card is located is corresponding to a region, on the card body of the nano SIM card, in which the data transmission pin 34 of the nano SIM card is located.

The control signal pin 23 of the memory card is adjacent to and isolated from the fourth data transmission pin 28 of the memory card. A region, on the card body of the memory card, in which the control signal pin 23 of the memory card and the fourth data transmission pin 28 are located is corresponding to a region, on the card body of the nano SIM card, in which the programming voltage/input signal pin 35 of the nano SIM card is located. The fourth data transmission pin 28 of the memory card is adjacent to the second data transmission pin 26 of the memory card.

A region, on the card body of the memory card, in which the ground signal pin 24 of the memory card is located is corresponding to a region, on the card body of the nano SIM card, in which the ground signal pin 36 of the nano SIM card is located.

In this embodiment, specifically, it can be learned from the foregoing pin layout that a region, on the card body of the memory card, in which four pins, that is, the clock signal pin 21 of the memory card, the third data transmission pin 27 of the memory card, the first data transmission pin 25 of the memory card, and the power supply pin 22 of the memory card, are located is corresponding to a region, on the card body of the nano SIM card, in which the clock signal pin 31, the reset signal pin 32, and the power supply pin 33 of the nano SIM card are located. It can be learned that the first data transmission pin 25 of the memory card and the third data transmission pin 27 of the memory card are obtained by splitting the region of the reset signal pin 32 of the nano SIM card into two pins. Shapes and sizes of the first data transmission pin 25 of the memory card and the third data transmission pin 27 of the memory card are not limited. In addition, shapes and sizes of the clock signal pin 21 of the memory card and the power supply pin 22 of the memory card are not limited.

A region, on the card body of the memory card, in which four pins, that is, the second data transmission pin 26 of the memory card, the fourth data transmission pin 28 of the memory card, the control signal pin 23 of the memory card, and the ground signal pin 24 of the memory card, are located is corresponding to a region, on the card body of the nano SIM card, in which the data transmission pin 34, the programming voltage/input signal pin 35, and the ground signal pin 36 of the nano SIM card are located. It can be learned that the control signal pin 23 of the memory card and the fourth data transmission pin 28 of the memory card are obtained by splitting the region of the programming voltage/input signal pin 35 of the nano SIM card into two pins. Shapes and sizes of the control signal pin 23 of the memory card and the fourth data transmission pin 28 of the memory card are not limited. In addition, shapes and sizes of the second data transmission pin 26 of the memory card and the ground signal pin 24 of the memory card are not limited.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 20:
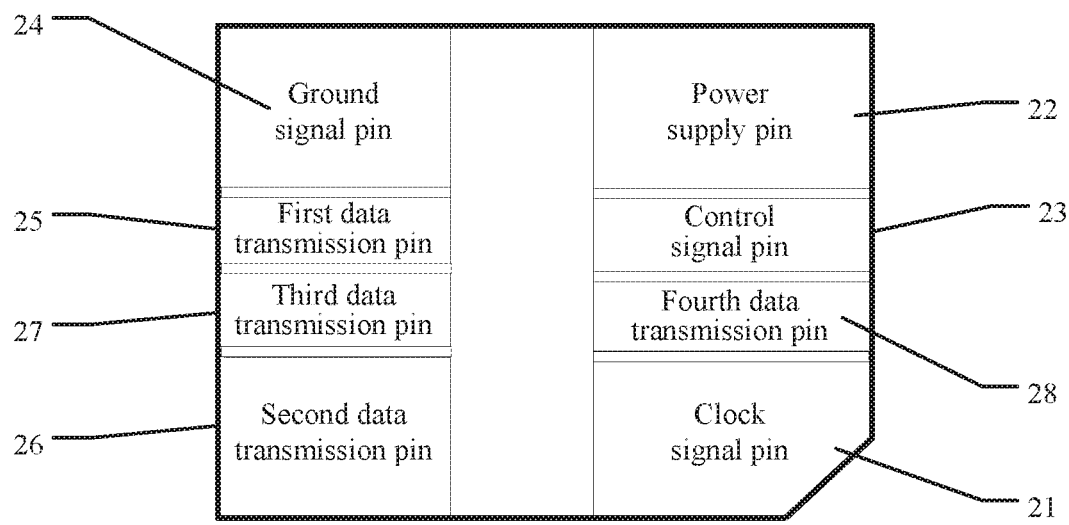
FIG. 20 is a schematic structural diagram of even yet another memory card according to an embodiment of this application.

FIG. 20 is a schematic structural diagram of even yet another memory card according to an embodiment of this application. Based on the memory card provided in the embodiment shown in FIG. 1, as shown in FIG. 20, the memory card includes four data transmission pins. The four data transmission pins are a first data transmission pin 25, a second data transmission pin 26, a third data transmission pin 27, and a fourth data transmission pin 28.

A region, on the card body of the memory card, in which the second data transmission pin 26 of the memory card is located is corresponding to a region, on the card body of the nano SIM card, in which the clock signal pin 31 of the nano SIM card is located.

The first data transmission pin 25 of the memory card is adjacent to and isolated from the third data transmission pin 27 of the memory card. A region, on the card body of the memory card, in which the first data transmission pin 25 and the third data transmission pin 27 are located is corresponding to a region, on the card body of the nano SIM card, in which the reset signal pin 32 of the nano SIM card is located. The third data transmission pin 27 of the memory card is adjacent to the second data transmission pin 26 of the memory card.

A region, on the card body of the memory card, in which the ground signal pin 24 of the memory card is located is corresponding to a region, on the card body of the nano SIM card, in which the power supply pin 33 of the nano SIM card is located.

A region, on the card body of the memory card, in which the clock signal pin 21 of the memory card is located is corresponding to a region, on the card body of the nano SIM card, in which the data transmission pin 34 of the nano SIM card is located.

The control signal pin 23 of the memory card is adjacent to and isolated from the fourth data transmission pin 28 of the memory card. A region, on the card body of the memory card, in which the control signal pin 23 of the memory card and the fourth data transmission pin 28 are located is corresponding to a region, on the card body of the nano SIM card, in which the programming voltage/input signal pin 35 of the nano SIM card is located. The fourth data transmission pin 28 of the memory card is adjacent to the clock signal pin 21 of the memory card.

A region, on the card body of the memory card, in which the power supply pin 22 of the memory card is located is corresponding to a region, on the card body of the nano SIM card, in which the ground signal pin 36 of the nano SIM card is located.

In this embodiment, specifically, it can be learned from the foregoing pin layout that a region, on the card body of the memory card, in which four pins, that is, the second data transmission pin 26 of the memory card, the third data transmission pin 27 of the memory card, the first data transmission pin 25 of the memory card, and the ground signal pin 24 of the memory card, are located is corresponding to a region, on the card body of the nano SIM card, in which the clock signal pin 31, the reset signal pin 32, and the power supply pin 33 of the nano SIM card are located. It can be learned that the first data transmission pin 25 of the memory card and the third data transmission pin 27 of the memory card are obtained by splitting the region of the reset signal pin 32 of the nano SIM card into two pins. Shapes and sizes of the first data transmission pin 25 of the memory card and the third data transmission pin 27 of the memory card are not limited. In addition, shapes and sizes of the second data transmission pin 26 of the memory card and the ground signal pin 24 of the memory card are not limited.

A region, on the card body of the memory card, in which four pins, that is, the clock signal pin 21 of the memory card, the fourth data transmission pin 28 of the memory card, the control signal pin 23 of the memory card, and the power supply pin 22 of the memory card, are located is corresponding to a region, on the card body of the nano SIM card, in which the data transmission pin 34, the programming voltage/input signal pin 35, and the ground signal pin 36 of the nano SIM card are located. It can be learned that the control signal pin 23 of the memory card and the fourth data transmission pin 28 of the memory card are obtained by splitting the region of the programming voltage/input signal pin 35 of the nano SIM card into two pins. Shapes and sizes of the control signal pin 23 of the memory card and the fourth data transmission pin 28 of the memory card are not limited. In addition, shapes and sizes of the clock signal pin 21 of the memory card and the power supply pin 22 of the memory card are not limited.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 21:
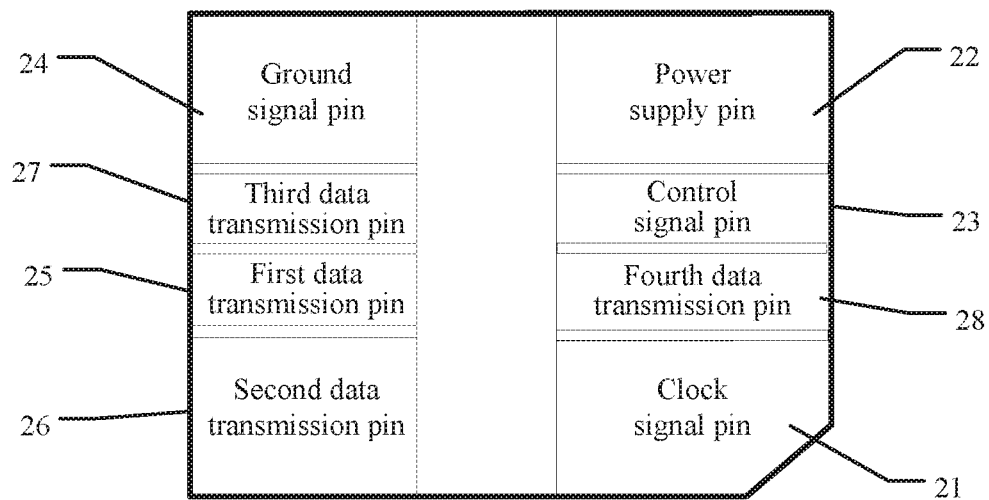
FIG. 21 is a schematic structural diagram of even yet another memory card according to an embodiment of this application.

FIG. 21 is a schematic structural diagram of even yet another memory card according to an embodiment of this application. Based on the memory card provided in the embodiment shown in FIG. 1, as shown in FIG. 21, the memory card includes four data transmission pins. The four data transmission pins are a first data transmission pin 25, a second data transmission pin 26, a third data transmission pin 27, and a fourth data transmission pin 28.

A region, on the card body of the memory card, in which the second data transmission pin 26 of the memory card is located is corresponding to a region, on the card body of the nano SIM card, in which the clock signal pin 31 of the nano SIM card is located.

The first data transmission pin 25 of the memory card is adjacent to and isolated from the third data transmission pin 27 of the memory card. A region, on the card body of the memory card, in which the first data transmission pin 25 and the third data transmission pin 27 are located is corresponding to a region, on the card body of the nano SIM card, in which the reset signal pin 32 of the nano SIM card is located. The first data transmission pin 25 is adjacent to the second data transmission pin 26 of the memory card.

A region, on the card body of the memory card, in which the ground signal pin 24 of the memory card is located is corresponding to a region, on the card body of the nano SIM card, in which the power supply pin 33 of the nano SIM card is located. The third data transmission pin 27 of the memory card is adjacent to the ground signal pin 24 of the memory card.

A region, on the card body of the memory card, in which the clock signal pin 21 of the memory card is located is corresponding to a region, on the card body of the nano SIM card, in which the data transmission pin 34 of the nano SIM card is located.

The control signal pin 23 of the memory card is adjacent to and isolated from the fourth data transmission pin 28 of the memory card. A region, on the card body of the memory card, in which the control signal pin 23 of the memory card and the fourth data transmission pin 28 are located is corresponding to a region, on the card body of the nano SIM card, in which the programming voltage/input signal pin 35 of the nano SIM card is located. The fourth data transmission pin 28 of the memory card is adjacent to the clock signal pin 21 of the memory card.

A region, on the card body of the memory card, in which the power supply pin 22 of the memory card is located is corresponding to a region, on the card body of the nano SIM card, in which the ground signal pin 36 of the nano SIM card is located. The control signal pin 23 of the memory card is connected to the power supply pin 22 of the memory card.

In this embodiment, specifically, it can be learned from the foregoing pin layout that a region, on the card body of the memory card, in which four pins, that is, the second data transmission pin 26 of the memory card, the first data transmission pin 25 of the memory card, the third data transmission pin 27 of the memory card, and the ground signal pin 24 of the memory card, are located is corresponding to a region, on the card body of the nano SIM card, in which the clock signal pin 31, the reset signal pin 32, and the power supply pin 33 of the nano SIM card are located. It can be learned that the first data transmission pin 25 of the memory card and the third data transmission pin 27 of the memory card are obtained by splitting the region of the reset signal pin 32 of the nano SIM card into two pins. Shapes and sizes of the first data transmission pin 25 of the memory card and the third data transmission pin 27 of the memory card are not limited. In addition, shapes and sizes of the second data transmission pin 26 of the memory card and the ground signal pin 24 of the memory card are not limited.

A region, on the card body of the memory card, in which four pins, that is, the clock signal pin 21 of the memory card, the fourth data transmission pin 28 of the memory card, the control signal pin 23 of the memory card, and the power supply pin 22 of the memory card, are located is corresponding to a region, on the card body of the nano SIM card, in which the data transmission pin 34, the programming voltage/input signal pin 35, and the ground signal pin 36 of the nano SIM card are located. It can be learned that the control signal pin 23 of the memory card and the fourth data transmission pin 28 of the memory card are obtained by splitting the region of the programming voltage/input signal pin 35 of the nano SIM card into two pins. Shapes and sizes of the control signal pin 23 of the memory card and the fourth data transmission pin 28 of the memory card are not limited. In addition, shapes and sizes of the clock signal pin 21 of the memory card and the power supply pin 22 of the memory card are not limited.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 22:
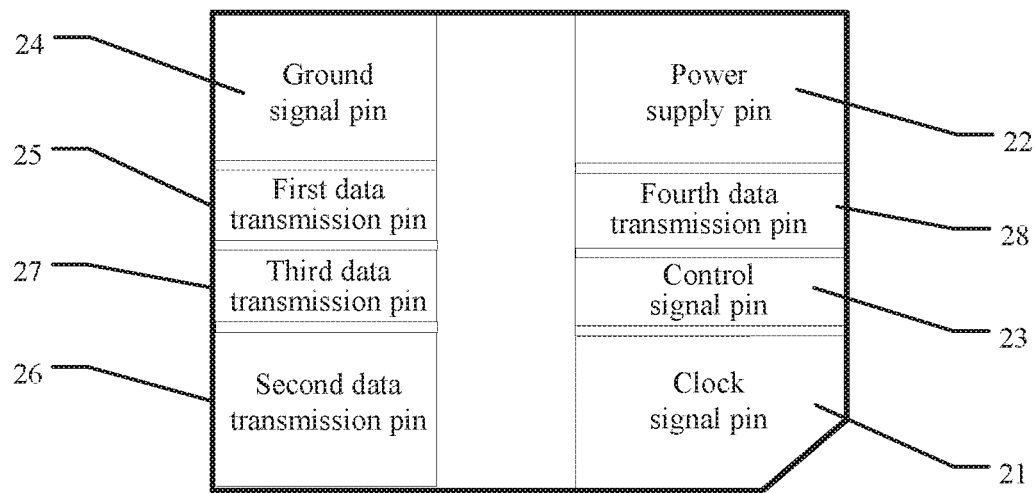
FIG. 22 is a schematic structural diagram of even yet another memory card according to an embodiment of this application.

FIG. 22 is a schematic structural diagram of even yet another memory card according to an embodiment of this application. Based on the memory card provided in the embodiment shown in FIG. 1, as shown in FIG. 22, the memory card includes four data transmission pins. The four data transmission pins are a first data transmission pin 25, a second data transmission pin 26, a third data transmission pin 27, and a fourth data transmission pin 28.

A region, on the card body of the memory card, in which the second data transmission pin 26 of the memory card is located is corresponding to a region, on the card body of the nano SIM card, in which the clock signal pin 31 of the nano SIM card is located.

The first data transmission pin 25 of the memory card is adjacent to and isolated from the third data transmission pin 27 of the memory card. A region, on the card body of the memory card, in which the first data transmission pin 25 and the third data transmission pin 27 are located is corresponding to a region, on the card body of the nano SIM card, in which the reset signal pin 32 of the nano SIM card is located.

The third data transmission pin 27 of the memory card is adjacent to the second data transmission pin 26 of the memory card.

A region, on the card body of the memory card, in which the ground signal pin 24 of the memory card is located is corresponding to a region, on the card body of the nano SIM card, in which the power supply pin 33 of the nano SIM card is located. The first data transmission pin 25 of the memory card is adjacent to the ground signal pin 24 of the memory card.

A region, on the card body of the memory card, in which the clock signal pin 21 of the memory card is located is corresponding to a region, on the card body of the nano SIM card, in which the data transmission pin 34 of the nano SIM card is located.

The control signal pin 23 of the memory card is adjacent to and isolated from the fourth data transmission pin 28 of the memory card. A region, on the card body of the memory card, in which the control signal pin 23 of the memory card and the fourth data transmission pin 28 are located is corresponding to a region, on the card body of the nano SIM card, in which the programming voltage/input signal pin 35 of the nano SIM card is located. The control signal pin 23 of the memory card is adjacent to the clock signal pin 21 of the memory card.

A region, on the card body of the memory card, in which the power supply pin 22 of the memory card is located is corresponding to a region, on the card body of the nano SIM card, in which the ground signal pin 36 of the nano SIM card is located. The fourth data transmission pin 28 of the memory card is adjacent to the power supply pin 22 of the memory card.

In this embodiment, specifically, it can be learned from the foregoing pin layout that a region, on the card body of the memory card, in which four pins, that is, the second data transmission pin 26 of the memory card, the third data transmission pin 27 of the memory card, the first data transmission pin 25 of the memory card, and the ground signal pin 24 of the memory card, are located is corresponding to a region, on the card body of the nano SIM card, in which the clock signal pin 31, the reset signal pin 32, and the power supply pin 33 of the nano SIM card are located. It can be learned that the first data transmission pin 25 of the memory card and the third data transmission pin 27 of the memory card are obtained by splitting the region of the reset signal pin 32 of the nano SIM card into two pins. Shapes and sizes of the first data transmission pin 25 of the memory card and the third data transmission pin 27 of the memory card are not limited. In addition, shapes and sizes of the second data transmission pin 26 of the memory card and the ground signal pin 24 of the memory card are not limited.

A region, on the card body of the memory card, in which four pins, that is, the clock signal pin 21 of the memory card, the control signal pin 23 of the memory card, the fourth data transmission pin 28 of the memory card, and the power supply pin 22 of the memory card, are located is corresponding to a region, on the card body of the nano SIM card, in which the data transmission pin 34, the programming voltage/input signal pin 35, and the ground signal pin 36 of the nano SIM card are located. It can be learned that the control signal pin 23 of the memory card and the fourth data transmission pin 28 of the memory card are obtained by splitting the region of the programming voltage/input signal pin 35 of the nano SIM card into two pins. Shapes and sizes of the control signal pin 23 of the memory card and the fourth data transmission pin 28 of the memory card are not limited. In addition, shapes and sizes of the clock signal pin 21 of the memory card and the power supply pin 22 of the memory card are not limited.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 23:
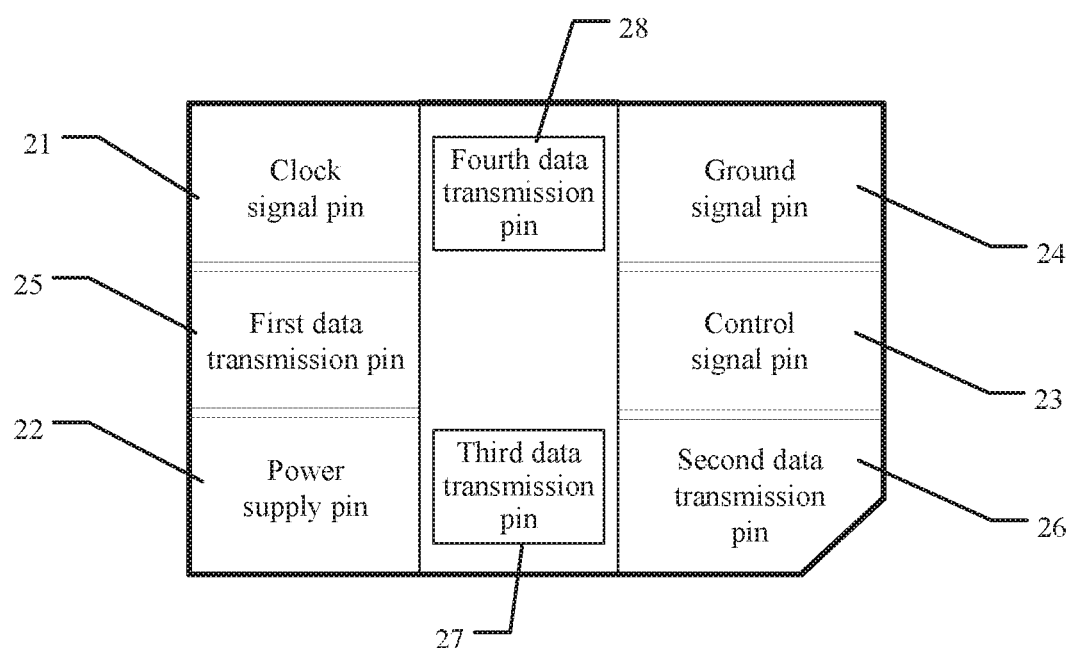
FIG. 23 is a schematic structural diagram of even yet another memory card according to an embodiment of this application.

FIG. 23 is a schematic structural diagram of even yet another memory card according to an embodiment of this application. Based on the memory card provided in the embodiment shown in FIG. 1, as shown in FIG. 23, the memory card includes four data transmission pins. The four data transmission pins are a first data transmission pin 25, a second data transmission pin 26, a third data transmission pin 27, and a fourth data transmission pin 28.

A region, on the card body of the memory card, in which the power supply pin 22 of the memory card is located is corresponding to a region, on the card body of the nano SIM card, in which the clock signal pin 31 of the nano SIM card is located.

A region, on the card body of the memory card, in which the first data transmission pin 25 of the memory card is located is corresponding to a region, on the card body of the nano SIM card, in which the reset signal pin 32 of the nano SIM card is located.

A region, on the card body of the memory card, in which the clock signal pin 21 of the memory card is located is corresponding to a region, on the card body of the nano SIM card, in which the power supply pin 33 of the nano SIM card is located.

A region, on the card body of the memory card, in which the second data transmission pin 26 of the memory card is located is corresponding to a region, on the card body of the nano SIM card, in which the data transmission pin 34 of the nano SIM card is located.

A region, on the card body of the memory card, in which the control signal pin 23 of the memory card is located is corresponding to a region, on the card body of the nano SIM card, in which the programming voltage/input signal pin 35 of the nano SIM card is located.

A region, on the card body of the memory card, in which the ground signal pin 24 of the memory card is located is corresponding to a region, on the card body of the nano SIM card, in which the ground signal pin 36 of the nano SIM card is located.

The third data transmission pin 27 of the memory card is located between the power supply pin 22 of the memory card and the second data transmission pin 26 of the memory card. The third data transmission pin 27 is isolated from the power supply pin 22 of the memory card and the second data transmission pin 26 of the memory card. A center point of the third data transmission pin 27 is located in a connection line between a center point of the power supply pin 22 of the memory card and a center point of the second data transmission pin 26.

The fourth data transmission pin 28 of the memory card is located between the clock signal pin 21 of the memory card and the ground signal pin 24 of the memory card. The fourth data transmission pin 28 is isolated from the clock signal pin 21 of the memory card and the ground signal pin 24 of the memory card. A center point of the fourth data transmission pin 28 is located in a connection line between a center point of the clock signal pin 21 of the memory card and a center point of the ground signal pin 24 of the memory card.

In this embodiment, specifically, it can be learned from the foregoing pin layout that a region, on the card body of the memory card, in which three pins, that is, the power supply pin 22 of the memory card, the first data transmission pin 25 of the memory card, and the clock signal pin 21 of the memory card are located is corresponding to a region, on the card body of the nano SIM card, in which the clock signal pin 31, the reset signal pin 32, and the power supply pin 33 of the nano SIM card are located.

A region, on the card body of the memory card, in which three pins, that is, the second data transmission pin 26 of the memory card, the control signal pin 23 of the memory card, and the ground signal pin 24 of the memory card, are located is corresponding to a region, on the card body of the nano SIM card, in which the data transmission pin 34, the programming voltage/input signal pin 35, and the ground signal pin 36 of the nano SIM card are located.

The third data transmission pin 27 of the memory card is disposed between the power supply pin 22 of the memory card and the second data transmission pin 26 of the memory card. Optionally, a center point of the third data transmission pin 27 of the memory card is located in a connection line between a center point of the power supply pin 22 of the memory card and a center point of the second data transmission pin 26 of the memory card. The fourth data transmission pin 28 of the memory card is disposed between the clock signal pin 21 of the memory card and the ground signal pin 24 of the memory card. Optionally, a center point of the fourth data transmission pin 28 of the memory card is located in a connection line between a center point of the clock signal pin 21 of the memory card and a center point of the ground signal pin 24 of the memory card.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 24:
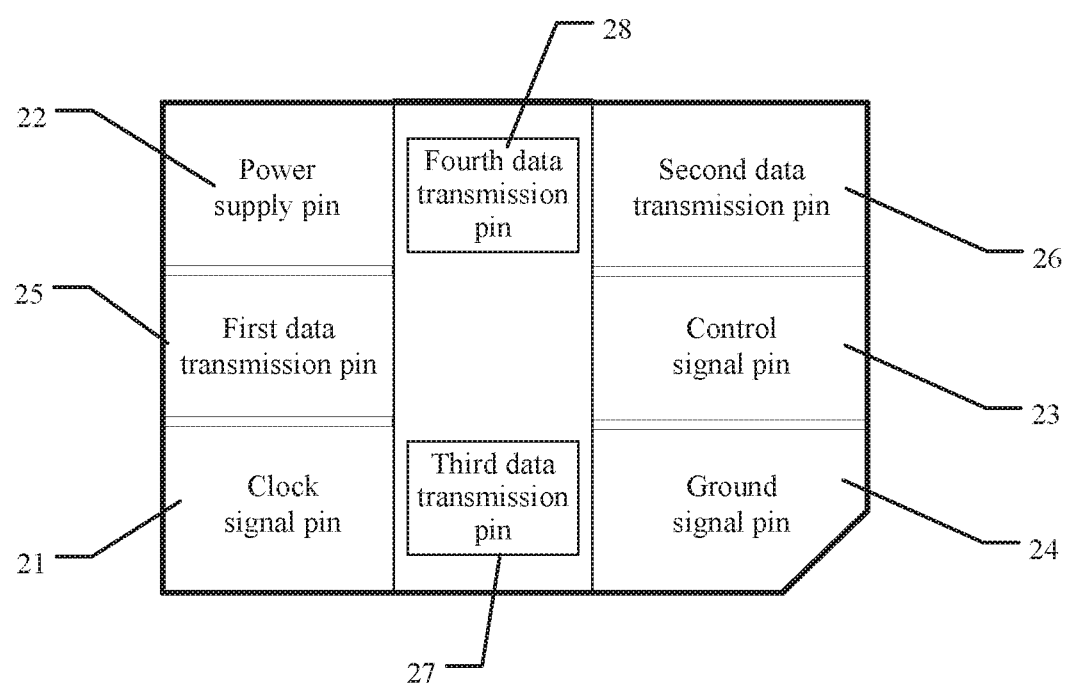
FIG. 24 is a schematic structural diagram of even yet another memory card according to an embodiment of this application.

FIG. 24 is a schematic structural diagram of even yet another memory card according to an embodiment of this application. Based on the memory card provided in the embodiment shown in FIG. 1, as shown in FIG. 24, the memory card includes four data transmission pins. The four data transmission pins are a first data transmission pin 25, a second data transmission pin 26, a third data transmission pin 27, and a fourth data transmission pin 28.

A region, on the card body of the memory card, in which the clock signal pin 21 of the memory card is located is corresponding to a region, on the card body of the nano SIM card, in which the clock signal pin 31 of the nano SIM card is located.

A region, on the card body of the memory card, in which the first data transmission pin 25 of the memory card is located is corresponding to a region, on the card body of the nano SIM card, in which the reset signal pin 32 of the nano SIM card is located.

A region, on the card body of the memory card, in which the power supply pin 22 of the memory card is located is corresponding to a region, on the card body of the nano SIM card, in which the power supply pin 33 of the nano SIM card is located.

A region, on the card body of the memory card, in which the ground signal pin 24 of the memory card is located is corresponding to a region, on the card body of the nano SIM card, in which the data transmission pin 34 of the nano SIM card is located.

A region, on the card body of the memory card, in which the control signal pin 23 of the memory card is located is corresponding to a region, on the card body of the nano SIM card, in which the programming voltage/input signal pin 35 of the nano SIM card is located.

A region, on the card body of the memory card, in which the second data transmission pin 26 of the memory card is located is corresponding to a region, on the card body of the nano SIM card, in which the ground signal pin 36 of the nano SIM card is located.

The third data transmission pin 27 of the memory card is located between the clock signal pin 21 of the memory card and the ground signal pin 24 of the memory card. The third data transmission pin 27 is isolated from the clock signal pin 21 of the memory card and the ground signal pin 24 of the memory card. A center point of the third data transmission pin 27 is located in a connection line between a center point of the clock signal pin 21 of the memory card and a center point of the ground signal pin 24 of the memory card.

The fourth data transmission pin 28 of the memory card is located between the power supply pin 22 of the memory card and the second data transmission pin 26 of the memory card. The fourth data transmission pin 28 is isolated from the power supply pin 22 of the memory card and the second data transmission pin 26 of the memory card. A center point of the fourth data transmission pin 28 is located in a connection line between a center point of the power supply pin 22 of the memory card and a center point of the second data transmission pin 26.

In this embodiment, specifically, it can be learned from the foregoing pin layout that a region, on the card body of the memory card, in which three pins, that is, the clock signal pin 21 of the memory card, the first data transmission pin 25 of the memory card, and the power supply pin 22 of the memory card, are located is corresponding to a region, on the card body of the nano SIM card, in which the clock signal pin 31, the reset signal pin 32, and the power supply pin 33 of the nano SIM card are located.

A region, on the card body of the memory card, in which three pins, that is, the ground signal pin 24 of the memory card, the control signal pin 23 of the memory card, and the second data transmission pin 26 of the memory card, are located is corresponding to a region, on the card body of the nano SIM card, in which the data transmission pin 34, the programming voltage/input signal pin 35, and the ground signal pin 36 of the nano SIM card are located.

The third data transmission pin 27 of the memory card is disposed between the clock signal pin 21 of the memory card and the ground signal pin 24 of the memory card. Optionally, a center point of the third data transmission pin 27 of the memory card is located in a connection line between a center point of the clock signal pin 21 of the memory card and a center point of the ground signal pin 24 of the memory card. The fourth data transmission pin 28 of the memory card is disposed between the power supply pin 22 of the memory card and the second data transmission pin 26 of the memory card. Optionally, a center point of the fourth data transmission pin 28 of the memory card is located in a connection line between a center point of the power supply pin 22 of the memory card and a center point of the second data transmission pin 26 of the memory card.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

Figure 25:
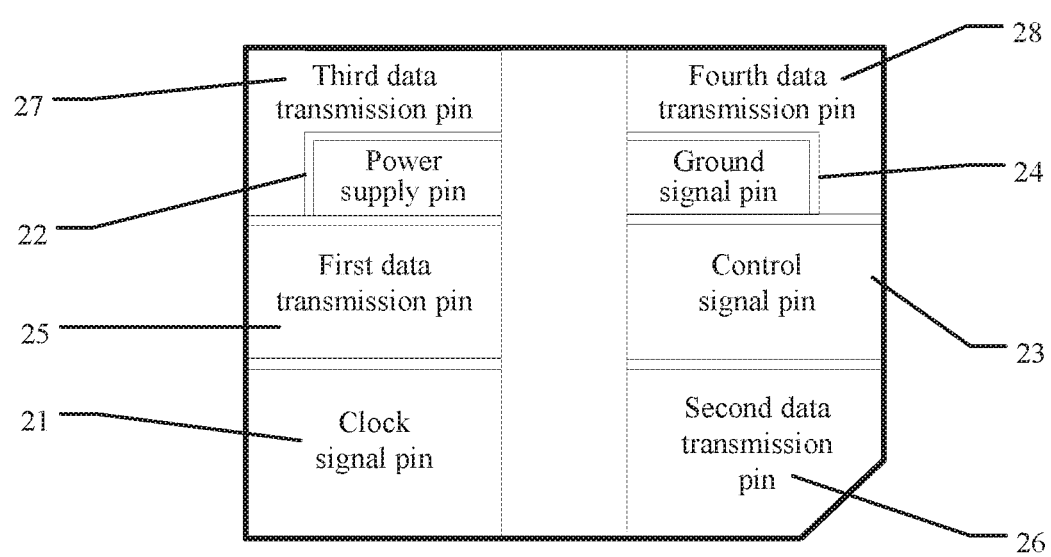
FIG. 25 is a schematic structural diagram of even yet another memory card according to an embodiment of this application.

FIG. 25 is a schematic structural diagram of even yet another memory card according to an embodiment of this application. Based on the memory card provided in the embodiment shown in FIG. 1, as shown in FIG. 25, the memory card includes four data transmission pins. The four data transmission pins are a first data transmission pin 25, a second data transmission pin 26, a third data transmission pin 27, and a fourth data transmission pin 28.

A region, on the card body of the memory card, in which the clock signal pin 21 of the memory card is located is corresponding to a region, on the card body of the nano SIM card, in which the clock signal pin 31 of the nano SIM card is located.

A region, on the card body of the memory card, in which the first data transmission pin 25 of the memory card is located is corresponding to a region, on the card body of the nano SIM card, in which the reset signal pin 32 of the nano SIM card is located.

A region, on the card body of the memory card, in which the third data transmission pin 27 and the power supply pin 22 of the memory card are located is corresponding to a region, on the card body of the nano SIM card, in which the power supply pin 33 of the nano SIM card is located. The power supply pin 22 of the memory card occupies a part of a region of the third data transmission pin 27 of the memory card. The power supply pin 22 of the memory card is isolated from the third data transmission pin 27 of the memory card. The power supply pin 22 of the memory card is adjacent to the first data transmission pin 25 of the memory card.

A region, on the card body of the memory card, in which the second data transmission pin 26 of the memory card is located is corresponding to a region, on the card body of the nano SIM card, in which the data transmission pin 34 of the nano SIM card is located.

A region, on the card body of the memory card, in which the control signal pin 23 of the memory card is located is corresponding to a region, on the card body of the nano SIM card, in which the programming voltage/input signal pin 35 of the nano SIM card is located.

A region, on the card body of the memory card, in which the fourth data transmission pin 28 and the ground signal pin 24 of the memory card are located is corresponding to a region, on the card body of the nano SIM card, in which the ground signal pin 36 of the nano SIM card is located. The ground signal pin 24 of the memory card occupies a part of a region of the fourth data transmission pin 28 of the memory card. The ground signal pin 24 of the memory card is isolated from the fourth data transmission pin 28 of the memory card. The ground signal pin 24 of the memory card is adjacent to the control signal pin 23 of the memory card.

In this embodiment, specifically, further, a region, on the card body of the memory card, in which four pins, that is, the clock signal pin 21 of the memory card, the first data transmission pin 25 of the memory card, the power supply pin 22 of the memory card, and the third data transmission pin 27 of the memory card, are located is corresponding to a region, on the card body of the nano SIM card, in which the clock signal pin 31, the reset signal pin 32, and the power supply pin 33 of the nano SIM card are located. It can be learned that the third data transmission pin 27 of the memory card and the power supply pin 22 of the memory card are obtained by splitting the region of the power supply pin 33 of the nano SIM card into two pins. In addition, the power supply pin 22 of the memory card occupies a part of a region of the third data transmission pin 27 of the memory card. It can be learned from FIG. 25 that the power supply pin 22 of the memory card occupies a corner of the third data transmission pin 27 of the memory card. Shapes and sizes of the third data transmission pin 27 of the memory card and the power supply pin 22 of the memory card are not limited. In addition, shapes and sizes of the clock signal pin 21 of the memory card and the first data transmission pin 25 of the memory card are not limited.

A region, on the card body of the memory card, in which four pins, that is, the second data transmission pin 26 of the memory card, the control signal pin 23 of the memory card, the ground signal pin 24 of the memory card, and the fourth data transmission pin 28 of the memory card, are located is corresponding to a region, on the card body of the nano SIM card, in which the data transmission pin 34, the programming voltage/input signal pin 35, and the ground signal pin 36 of the nano SIM card are located. It can be learned that the fourth data transmission pin 28 of the memory card and the ground signal pin 24 of the memory card are obtained by splitting the region of the ground signal pin 36 of the nano SIM card into two pins. In addition, the ground signal pin 24 of the memory card occupies a part of a region of the fourth data transmission pin 28 of the memory card. It can be learned from FIG. 25 that the ground signal pin 24 of the memory card occupies a corner of the fourth data transmission pin 28 of the memory card. Shapes and sizes of the fourth data transmission pin 28 of the memory card and the ground signal pin 24 of the memory card are not limited. In addition, shapes and sizes of the second data transmission pin 26 of the memory card and the control signal pin 23 of the memory card are not limited.

In addition, in this embodiment, there may be spacings between the pins (or contacts, or connection terminals) of the memory card, and therefore a wire of the memory card may be disposed on a surface of these spacings; or there may be no spacing, and therefore a wire of the memory card may be inside the card body of the memory card. In this embodiment, "corresponding" may also be referred to as a mapping relationship. Refer to the descriptions in the foregoing embodiments.

The nano SIM card in this embodiment is a micro SIM card, is also referred to as a fourth-form-factor integrated circuit board, and is also referred to as a NanoSIM card, a Nano SIM card, a nano Sim card, a NanoSim card, a Nano Sim card, a nano-SIM card, a nanoSIM card, a nano SIM card, a nano-Sim card, a nanoSim card, a nano Sim card, a nano-sim card, a nanosim card, or a nano sim card.

The memory card in this embodiment is a memory card in a basically same shape and a basically same size as the nano SIM card in this embodiment of the present invention.

A pin in the following embodiments may be a metal contact. To be specific, the pin may be a contact with a contact area and a conducting function. The pin in the embodiments of this application may be referred to as a connection terminal. A specific name of the pin is not specifically limited.

Figure 27:
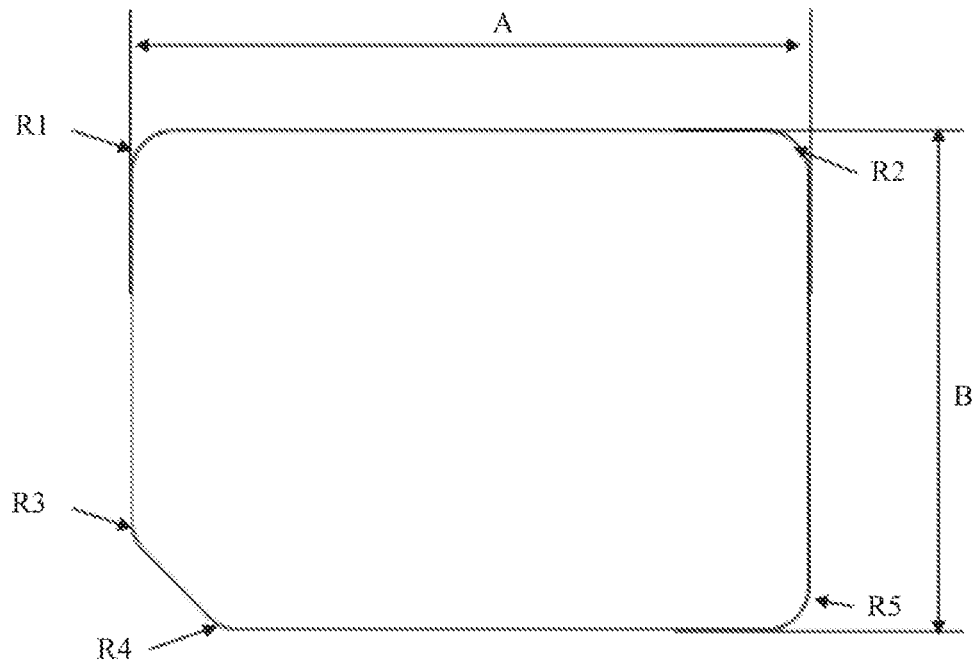
FIG. 27 is a schematic structural diagram 1 of even yet another memory card according to an embodiment of this application.
Figure 28:
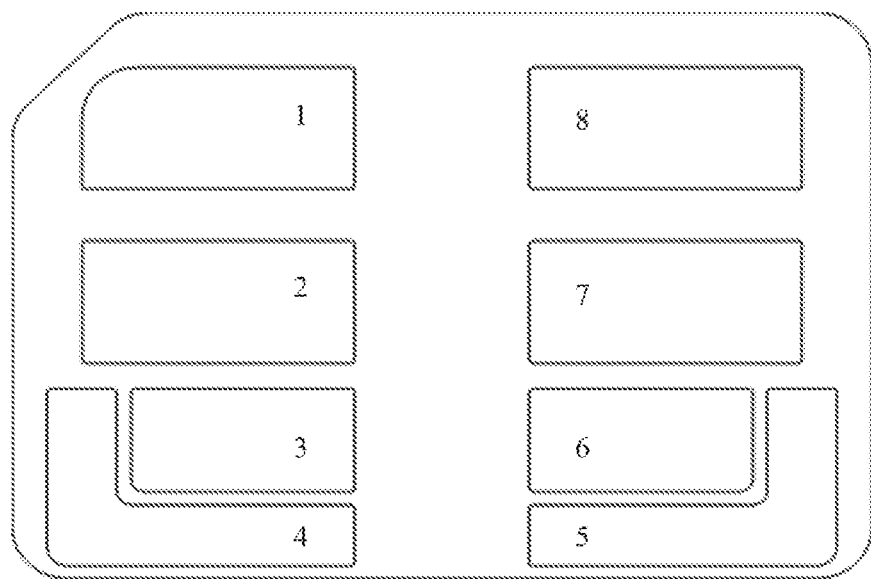
FIG. 28 is a schematic structural diagram 2 of even yet another memory card according to an embodiment of this application.

FIG. 27 is a schematic structural diagram 1 of even yet another memory card according to an embodiment of this application. FIG. 28 is a schematic structural diagram 2 of even yet another memory card according to an embodiment of this application. As shown in FIG. 27 and FIG. 28, FIG. 27 shows a structure of the memory card, and FIG. 28 shows that eight pins are disposed on the memory card. A pin denotation is provided for each pin. Pin denotations are 1, 2, 3, 4, 5, 6, 7, and 8. From an angle of view of FIG. 28, a pin 4 is disposed below a pin 3, and the pin 4 is in an "L" shape; and a pin 5 is disposed below a pin 6, and the pin 5 is in an "L" shape.

TABLE 2

Configuration manner of the pins on the memory card

| Pin denotation | Memory card mode | | Serial peripheral interface (serial peripheral interface, SPI) mode | |
|---|---|---|---|---|
| | Name | Description | Name | Description |
| 1 | DAT1 | Data line [bit 1] | RSV | Reserved item |
| 2 | CMD | Command/Response | DI | Data input |
| 3 | GND | Ground | GND | Ground |
| 4 | CD/DAT3 | Card detect/Data line [bit 3] | CS | Chip select |
| 5 | DAT2 | Data line [bit 2] | RSV | Reserved item |
| 6 | VDD | Power supply | VDD | Power supply |
| 7 | DAT0 | Data line [bit 0] | DO | Data output |
| 8 | CLK | Clock | CLK | Clock |

As shown in Table 2, the memory card may be in two working modes: the memory card mode and the SPI mode.

As shown in Table 2, when the memory card is in the memory card mode, the pins of the memory card are as follows: A pin with the pin denotation of 1 is DAT1, the pin is corresponding to the data line [bit 1] Data Line [Bit 1], the pin DAT1 is configured to transmit data, and DAT is a data pin (data pin). A pin with the pin denotation of 2 is CMD (command pin, command pin), the pin is a command/response (command/response) pin, and the pin CMD is configured to transmit a control command signal. A pin with the pin denotation of 3 is GND, the pin is a ground (ground) pin, and the pin GND is configured to transmit a reference ground signal. A pin with the pin denotation of 4 is CD/DAT3, the pin is corresponding to the card detect/data line [bit 3] (card detect/data line [Bit 3]), the pin CD is configured to transmit a card detect signal, and the pin DAT3 is configured to transmit data. A pin with the pin denotation of 5 is DAT2, the pin is corresponding to the data line [bit 2] (data line [Bit 2]), and the pin DAT2 is configured to transmit data. A pin with the pin denotation of 6 is VDD, the pin is a power supply signal pin, and the pin VDD is configured to transmit a power supply signal. A pin with the pin denotation of 7 is DAT0, the pin is corresponding to the data line [bit 0] data line [Bit 0], and the pin DAT0 is configured to transmit data. A pin with the pin denotation of 8 is CLK (clock input pin, clock input pin), the pin is corresponding to the clock (clock), and the pin CLK is configured to transmit a clock signal.

As shown in Table 2, when the memory card is in the SPI mode, the pins of the memory card are as follows: A pin with the pin denotation of 1 is RSV, and the pin is a reserved (reserved) item. A pin with the pin denotation of 2 is DI, the pin is corresponding to the data input (data input), and the pin DI is configured to transmit a data input signal. A pin with the pin denotation of 3 is GND, the pin is a ground (ground) pin, and the pin GND is configured to transmit a reference ground signal. A pin with the pin denotation of 4 is CS, the pin is corresponding to the chip select, and the pin CS is configured to transmit a chip select signal. A pin with the pin denotation of 5 is RSV, and the pin is a reserved (reserved) item. A pin with the pin denotation of 6 is VDD, the pin is a power supply signal pin, and the pin VDD is configured to transmit a power supply signal. A pin with the pin denotation of 7 is DO, the pin is corresponding to the data output (data output), and the pin DO is configured to transmit a data output signal. A pin with the pin denotation of 8 is CLK, the pin is corresponding to the clock (clock), and the pin CLK is configured to transmit a clock signal.

Figure 29:
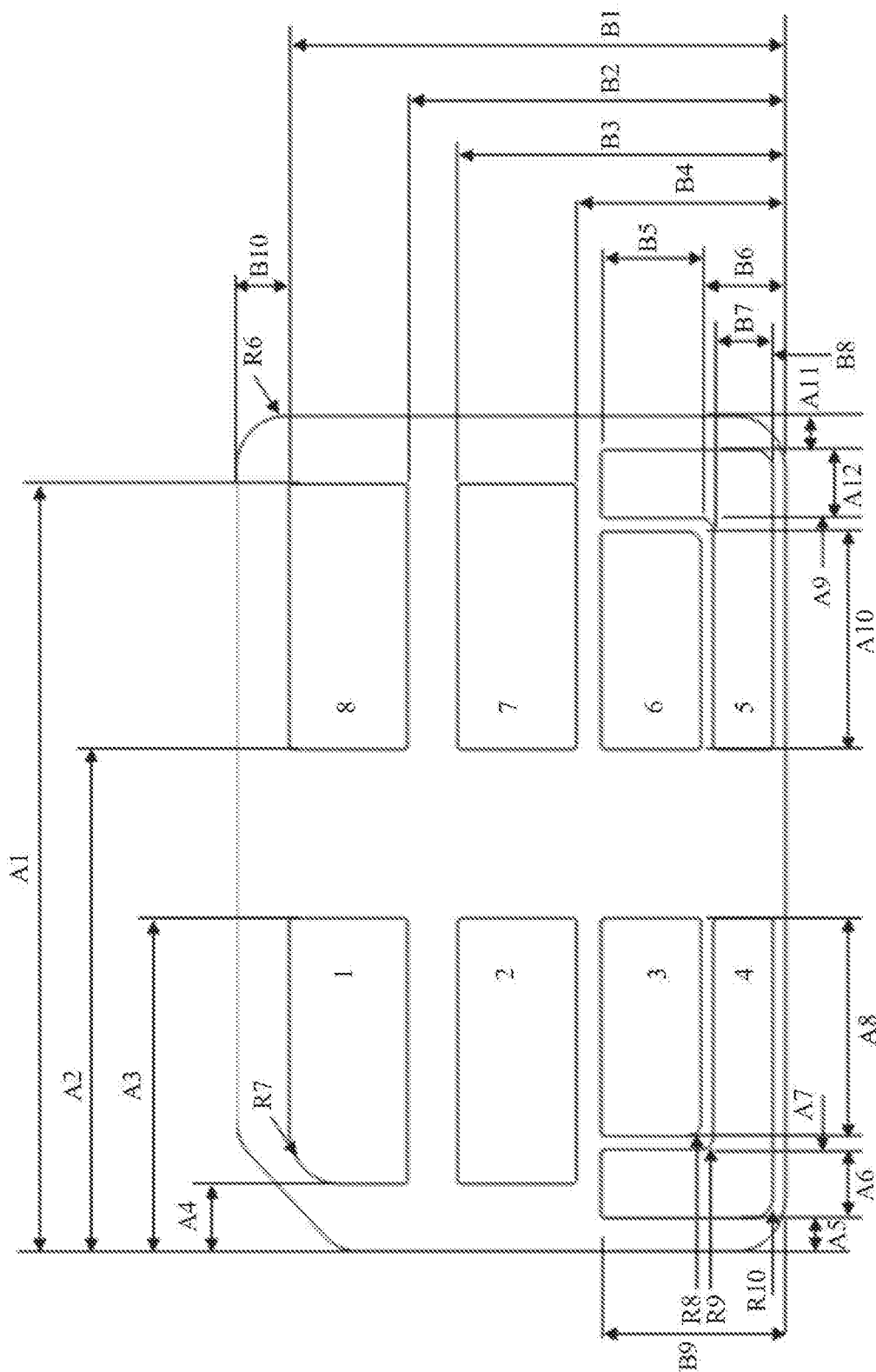
FIG. 29 is a schematic structural diagram 3 of even yet another memory card according to an embodiment of this application.
Figure 30:
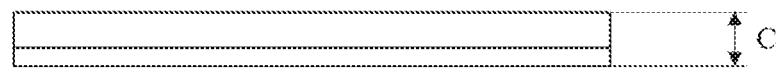
FIG. 30 is a schematic structural diagram 4 of even yet another memory card according to an embodiment of this application.

In addition, FIG. 29 is a schematic structural diagram 3 of even yet another memory card according to an embodiment of this application. As shown in FIG. 29, there are specific distances between the pins of the memory card. FIG. 30 is a schematic structural diagram 4 of even yet another memory card according to an embodiment of this application. FIG. 30 shows a side structure of the memory card, and the memory card has specific thickness.

As shown in FIG. 27, a round corner may be provided in at least one bevel of the memory card. For example, as shown in FIG. 27, a round corner R1 may be provided in an upper left corner of the memory card, a round corner R2 may be provided in an upper right corner of the memory card, round corners R3 and R4 may be separately provided in a lower left corner of the memory card, and a round corner R5 may be provided in a lower right corner of the memory card. The memory card has a width A and a height B. For values of the width A and the height B, refer to Table 3.

As shown in FIG. 29, based on an angle of view of FIG. 29, from right to left, the memory card has a first side edge and a second side edge; from right to left, the pin 8 of the memory card has a first edge and a second edge; and from right to left, the pin 1 of the memory card has a first edge and a second edge. A length of a distance from the first edge of the pin 8 to the second side edge of the memory card is A1. A length of a distance from the second edge of the pin 8 to the second side edge of the memory card is A2. A length of a distance from the first edge of the pin 1 to the second side edge of the memory card is A3. A length of a distance from the second edge of the pin 1 to the second side edge of the memory card is A4. In addition, from right to left, the pin 7 of the memory card has a first edge and a second edge; and from right to left, the pin 2 of the memory card has a first edge and a second edge.

As shown in FIG. 29, based on the angle of view of FIG. 29, from right to left, there are a first edge and a second edge on the top of the pin 5 in the "L" shape, and there is a third edge on the left of the pin 5; from right to left, the pin 6 of the memory card has a first edge and a second edge; from right to left, the pin 3 of the memory card has a first edge and a second edge; from right to left, there is a first edge on the right of the pin 4 in the "L" shape; and from right to left, there are a second edge and a third edge on the top of the pin 4. A length of a distance from the first side edge of the memory card to the first edge of the pin 5 is A11. A length of a distance from the first edge of the pin 5 to the second edge of the pin 5 is A12. A length of a distance from the second edge of the pin 5 to the first edge of the pin 6 is A9. A length of a distance from the first edge of the pin 6 to the third edge of the pin 5 is A10. A length of a distance from the first edge of the pin 4 to the second edge of the pin 3 is A8. A length of a distance from the second edge of the pin 3 to the second edge of the pin 4 is A7. A length of a distance from the second edge of the pin 4 to the third edge of the pin 4 is A6. A length of a distance from the third edge of the pin 4 to the second side edge of the memory card is A5.

As shown in FIG. 29, based on the angle of view of FIG. 29, from top to bottom, the memory card has a third side edge and a fourth side edge; from top to bottom, the pin 8 of the memory card has a third edge and a fourth edge; from top to bottom, the pin 7 of the memory card has a third edge and a fourth edge; from top to bottom, the pin 6 of the memory card has a third edge and a fourth edge; from top to bottom, there is a fourth edge on the top of the pin 5 in the "L" shape; and from top to bottom, there are a fifth edge and a sixth edge at the bottom of the pin 5. Likewise, from top to bottom, the pin 1 of the memory card has a third edge and a fourth edge; from top to bottom, the pin 2 of the memory card has a third edge and a fourth edge; from top to bottom, the pin 3 of the memory card has a third edge and a fourth edge; from top to bottom, there is a fourth edge on the top of the pin 4 in the "L" shape; and from top to bottom, there are a fifth edge and a sixth edge at the bottom of the pin 4. A length of a distance from the third side edge of the memory card to the first edge of the pin 8 is B10. A length of a distance from the third edge of the pin 8 to the fourth side edge of the memory card is B1. A length of a distance from the fourth edge of the pin 8 to the fourth side edge of the memory card is B2. A length of a distance from the third edge of the pin 7 to the fourth side edge of the memory card is B3. A length of a distance from the fourth edge of the pin 7 to the fourth side edge of the memory card is B4. A length of a distance from the third edge of the pin 6 to the fourth edge of the pin 6 is B5. A length of a distance from the fourth edge of the pin 6 to the fourth side edge of the memory card is B6. A length of a distance from the fifth edge of the pin 5 to the sixth edge of the pin 5 is B7. A length of a distance from the sixth edge of the pin 5 to the fourth side edge of the memory card is B8. A length of a distance from the third edge of the pin 3 to the fourth side edge of the memory card is B9.

Based on the angle of view of FIG. 29, there is a round corner R6 in an upper right corner of the memory card, there is a round corner R7 in an upper left corner of the pin 1, there is a round corner R8 in a lower left corner of the pin 3, there is a round corner R9 at a bend of the pin 4 in the "L" shape, and there is a round corner R10 in a lower left corner of the pin 4.

As shown in FIG. 30, thickness of the memory card is C.

For the foregoing lengths and thickness, refer to Table 3. Numbers shown in Table 3 are in a unit of millimeter (mm).

TABLE 3

Distances between the pins on the memory card

| Symbol (SYMBOL) | Common dimension (COMMON DIMENSION) | | |
|---|---|---|---|
| | Minimum (MIN) | Normal value (NOM) | Maximum (MAX) |
| A | 12.20 | 12.30 | 12.40 |
| A1 | 11.20 | 11.30 | 11.40 |
| A2 | 7.30 | 7.40 | 7.50 |
| A3 | 4.80 | 4.90 | 5.00 |
| A4 | 0.90 | 1.00 | 1.10 |
| A5 | 0.45 | 0.50 | 0.55 |
| A6 | 0.95 | 1.00 | 1.05 |
| A7 | 0.15 | 0.20 | 0.25 |
| A8 | 3.10 | 3.20 | 3.30 |
| A9 | 0.15 | 0.20 | 0.25 |
| A10 | 3.10 | 3.20 | 3.30 |
| A11 | 0.45 | 0.50 | 0.55 |
| A12 | 0.95 | 1.00 | 1.05 |
| B | 8.70 | 8.80 | 8.90 |
| B1 | 7.85 | 7.95 | 8.05 |
| B2 | 5.95 | 6.05 | 6.15 |
| B3 | 5.15 | 5.25 | 5.35 |

TABLE 3-continued

Distances between the pins on the memory card

| Symbol (SYMBOL) | Common dimension (COMMON DIMENSION) | | |
|---|---|---|---|
| | Minimum (MIN) | Normal value (NOM) | Maximum (MAX) |
| B4 | 3.25 | 3.35 | 3.45 |
| B5 | 1.55 | 1.60 | 1.65 |
| B6 | 1.25 | 1.35 | 1.45 |
| B7 | 0.90 | 0.95 | 1.00 |
| B8 | | | 0.2 |
| B9 | 2.85 | 2.95 | 3.05 |
| B10 | 0.75 | 0.85 | 0.95 |
| C | 0.60 | 0.70 | 0.84 |
| D1 | 0.15 | | |
| D2 | 0.15 | | |
| D3 | 0.15 | | |
| D4 | 0.15 | | |

Figure 31:
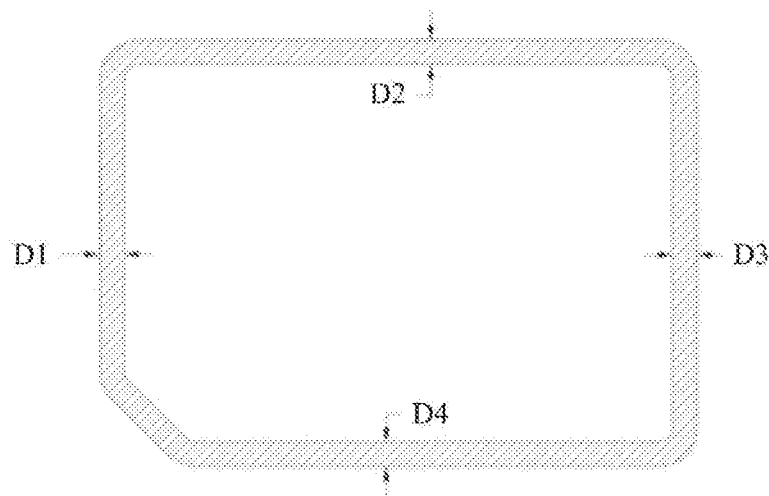
FIG. 31 is a schematic structural diagram 5 of even yet another memory card according to an embodiment of this application.

Optionally FIG. 31 is a schematic structural diagram 5 of even yet another memory card according to an embodiment of this application. As shown in FIG. 31, to improve card reliability, a keep out area (Keep Out Area) extending inward is provided along an edge of the memory card. The keep out area is a region in which layout of transmission lines is prohibited. The transmission lines may include a signal line, a power line, a control line, and the like. For example, as shown in FIG. 31, the memory card has four edges, and keep out areas are provided at the four edges. The four keep out areas are denoted by the symbol D1, the symbol D2, the symbol D3, and the symbol D4. D1, D2, D3, and D4 may also identify distances at which the four keep out areas extend inward along the edges of the memory card.

A minimum size of a width of each of the keep out area D1, the keep out area D2, the keep out area D3, and the keep out area D4 of the memory card may be 0.15 millimeters (mm).

A length of the memory card in this embodiment of the present invention may be approximately 12.3 millimeters, and a deviation of a length size may be approximately 0.1 millimeters. In other words, the length of the memory card in this embodiment of the present invention may range from 12.2 millimeters to 12.4 millimeters.

A width of the memory card in this embodiment of the present invention may be approximately 8.8 millimeters, and a deviation of a width size may be approximately 0.1 millimeters. In other words, the width of the memory card in this embodiment of the present invention may range from 8.7 millimeters to 8.9 millimeters.

Thickness of the memory card in this embodiment of the present invention may be approximately 0.7 millimeters, a positive deviation of a thickness size may be 0.14 millimeters, and a negative deviation of the thickness size may be approximately 0.1 millimeters. In other words, the thickness of the memory card may range from 0.6 millimeters to 0.84 millimeters.

Figure 32:
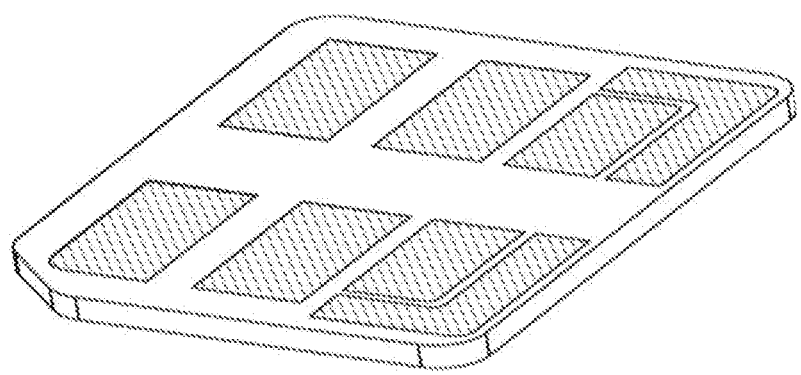
FIG. 32 is a schematic structural diagram 6 of even yet another memory card according to an embodiment of this application.

FIG. 32 is a schematic structural diagram 6 of even yet another memory card according to an embodiment of this application. As shown in FIG. 32, pins are disposed in shadow regions shown in FIG. 32. Conducting materials may be disposed in the shadow regions, so that the conducting materials constitute the pins of the memory card. Non-conducting materials are disposed in non-shadow regions shown in FIG. 31, to constitute non-conducting regions.

Figure 33:
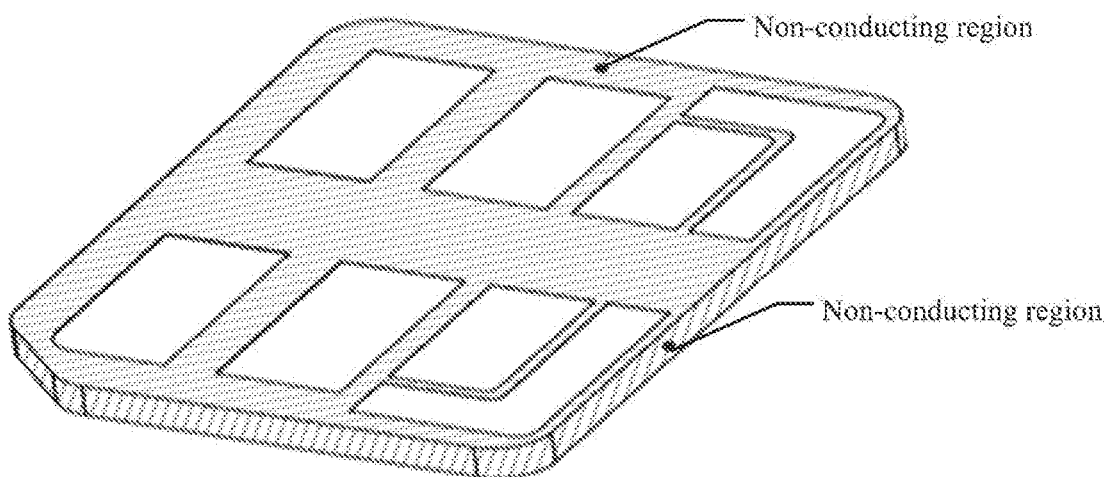
FIG. 33 is a schematic structural diagram 7 of even yet another memory card according to an embodiment of this application.

FIG. 33 is a schematic structural diagram 7 of even yet another memory card according to an embodiment of this application. As shown in FIG. 33, pins are disposed in non-shadow regions shown in FIG. 33. Conducting materials may be disposed in the non-shadow regions, so that the conducting materials constitute the pins of the memory card. Non-conducting materials are disposed in shadow regions shown in FIG. 33, to constitute non-conducting regions.

One or more types of conducting materials may be used to constitute each pin. For example, the conducting material may be gold or copper. In addition, a conducting material is not suspended, and a height of the memory card in a region in which the conducting material is located is less than or equal to that in a region in which a non-conducting material is located. The conducting material does not protrude from an edge of the memory card. In other words, the conducting material is not located at a side edge of the memory card. A width of the memory card in the region in which the conducting material is located is less than or equal to that in the region in which the non-conducting material is located. A length of the memory card in the region in which the conducting material is located is less than or equal to that in the region in which the non-conducting material is located.

Optionally, a via may be provided inside a keep out area of the memory card. The via is not provided at a location of a pin.

The memory card provided in this embodiment may be inserted into a nano SIM card holder of a terminal. The nano SIM card holder may also be referred to as a card connector or a memory card connector. A spring is disposed on the nano SIM card holder. As described above, the spring is corresponding to a pin on the memory card.

When the memory card is inserted into the nano SIM card holder, or the memory card is removed from the nano SIM card holder, the pin is scratched by the spring. For example, when the memory card shown in FIG. 28 is horizontally inserted into the nano SIM card holder, four pins on one side of the memory card first enter the nano SIM card holder, and therefore the four pins are continuously scratched twice by outermost springs in the nano SIM card holder. For example, pins 1, 2, 3, and 4 first enter the nano SIM card holder, and the pins 1, 2, 3, and 4 are continuously scratched twice by the outermost springs in the nano SIM card holder. For example, when the memory card shown in FIG. 28 is vertically inserted into the nano SIM card holder, two pins that first enter the nano SIM card holder are continuously scratched by outermost springs in the nano SIM card holder. For example, pins 1 and 8 first enter the nano SIM card holder, the pins 1 and 8 are continuously scratched four times by the outermost springs in the nano SIM card holder, pins 2 and 7 are continuously scratched three times by the outermost springs in the nano SIM card holder, and pins 3 and 6 are continuously scratched twice by the outermost springs in the nano SIM card holder. Therefore, durability of the memory card needs to be ensured, to ensure a relatively long service life of the memory card.

In addition, it needs to be ensured that the memory card is not subject to over-temperature. The memory card has a plurality of working modes, for example, a high speed mode and an ultra high speed (ultra high speed-I. UHS-I) mode. In the high speed mode, a working voltage of the memory card is 3.3 volts (V). In the UHS-I mode, the working voltage of the memory card is 1.8 volts (V). In the foregoing different working modes, power consumption of the memory card varies, and therefore heat generated by the memory card varies. To ensure normal working of the memory card, regardless of a working mode of the memory card, it needs to be ensured that the power consumption of the memory card is within 0.72 watts (W).

First, it needs to be detected whether the memory card is inserted into the nano SIM card holder or is removed from the nano SIM card holder. This application provides two detection manners of detecting whether the memory card is inserted or removed.

Figure 34:
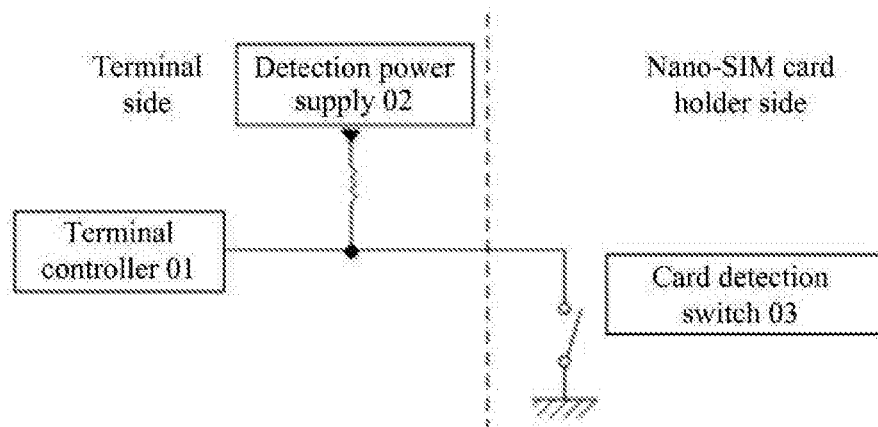
FIG. 34 is a detection circuit diagram of detecting insertion and removal of a memory card according to an embodiment of this application.

A first detection manner is described as follows: A card detection switch (card detection switch) is disposed in the nano SIM card holder of the terminal. In this case, the card detection switch is of a normally opened type, as shown in Table 4. When the memory card is removed, the card detection switch is open; or when the memory card is inserted, the card detection switch is closed. Specifically, FIG. 34 is a detection circuit diagram of detecting insertion and removal of a memory card according to an embodiment of this application. As shown in FIG. 34, a host controller (host controller) 01, a detection power supply (VDD) 02, and the card detection switch 03 are provided. The host controller 01 and the detection power supply 02 are disposed in the terminal, and the card detection switch 03 is disposed in the nano SIM card holder of the terminal. One end of the card detection switch 03 is connected to the host controller 01, and the other end of the card detection switch 03 is grounded. An output end of the detection power supply 02 is connected between the host controller 01 and the card detection switch 03. When the memory card is inserted, the card detection switch 03 is closed, the host controller 01 detects a low level signal, and the host controller 01 enables a power supply that provides electric energy for the memory card; or when the memory card is removed, the card detection switch 03 is open, the host controller 01 detects a high level signal, and the host controller 01 disables a power supply that provides electric energy for the memory card.

A second detection manner is described as follows: Likewise, a card detection switch is disposed in the nano SIM card holder of the terminal. In this case, the card detection switch is of a normally closed type, as shown in Table 4. When the memory card is removed, the card detection switch is closed; or when the memory card is inserted, the card detection switch is open. Specifically, as shown in FIG. 34, when the memory card is inserted, the card detection switch 03 is open, the host controller 01 detects a high level signal, and the host controller 01 enables a power supply that provides electric energy for the memory card; or when the memory card is removed, the card detection switch 03 is closed, the host controller 01 detects a low level signal, and the host controller 01 disables a power supply that provides electric energy for the memory card.

Therefore, it can be detected whether the memory card is inserted or removed. When it is detected that the memory card is removed, the power supply that provides electric energy for the memory card is disabled, thereby saving electric energy and achieving low power consumption.

TABLE 4

| Status of the card detection switch | | |
|---|---|---|
| Card detection switch type (Card Detection Switch Types) | Memory card removed (nano SD is Removed) | Memory card inserted (nano SD is Inserted) |
| Normally open (Normally open) | Open (OFF (open)) | Closed (ON (closed)) |
| Normally closed (Normally closed) | Closed (ON (closed)) | Open (OFF (open)) |

The aforementioned "inserting the memory card" means that when all pins on the memory card are in contact with corresponding springs, it is determined that the memory card is inserted. The aforementioned "removing the memory card" means that when any one or more of the pins on the memory card are no longer in contact with a corresponding spring, it is determined that the memory card is removed.

Functions of the memory card provided in this application are compatible with those of a memory card in the prior art. However, because, the memory card provided in this application can be inserted into the nano SIM card holder of the terminal, a size of the memory card provided in this application is smaller than that of the memory card in the prior art.

The memory card provided in this application is a micro memory card, and may also be referred to as a nanoSD memory card, a nano SD memory card, a nano SD memory card, a nano SD memory card, a nano-SD memory card, or a nanoSD memory card.

A shape of the memory card provided in this application is basically the same as that of a nano SIM card. In addition, the size of the memory card provided in this application is basically the same as that of the nano SIM card.

This application further provides a terminal including the foregoing memory card. Usually, the memory card is used by applications used together with various products (for example, the terminal) to store digital data. Regularly, the memory card may be removed from the terminal, so that digital data stored in the memory card is portable. The memory card according to this application may have a relatively small shape factor, and may be configured to store digital data for the terminal. For example, the terminal is a camera, a handheld or notebook computer, a network application apparatus, a set top box, a handheld or another compact audio player/recorder, or a medical monitor.

Figure 26:
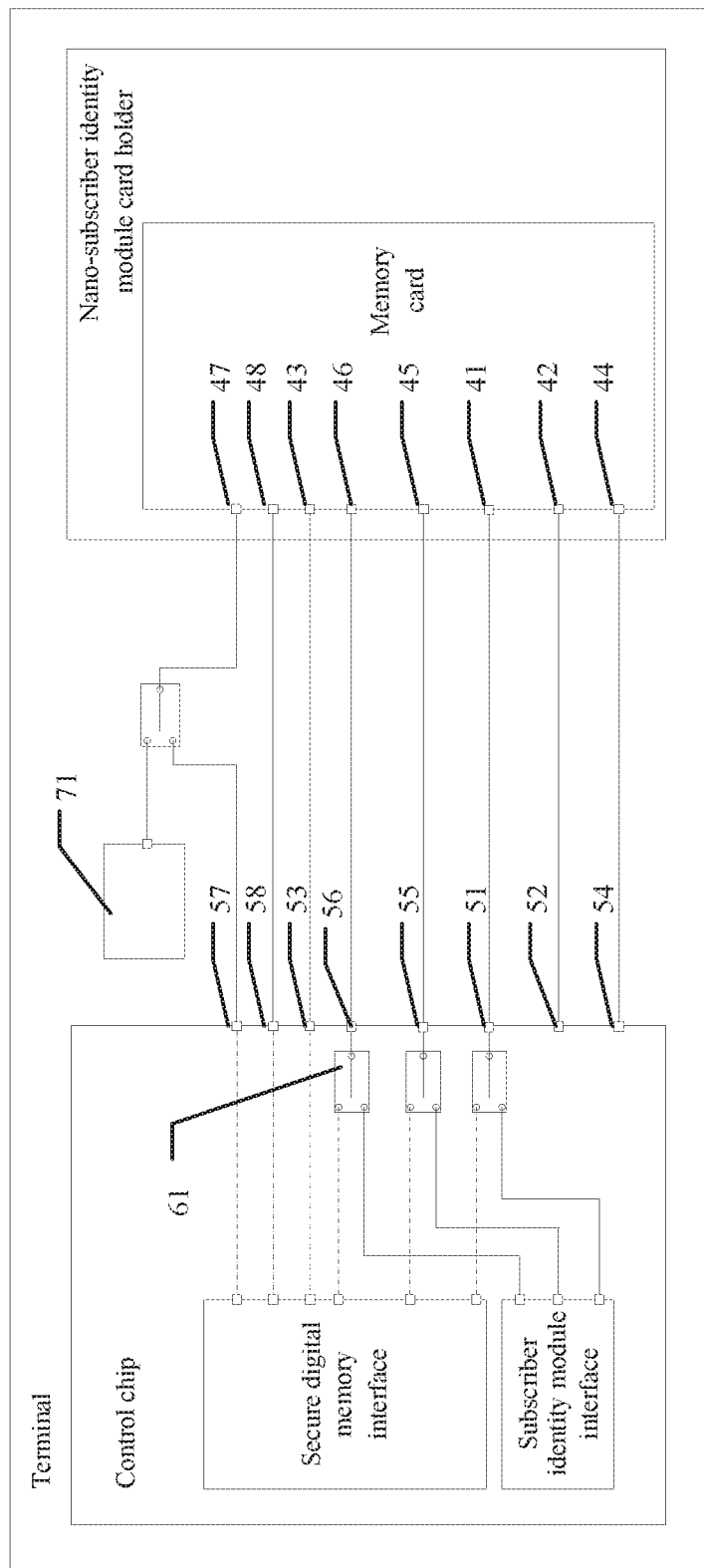
FIG. 26 is a circuit diagram of a terminal according to an embodiment of this application.

FIG. 26 is a circuit diagram of a terminal according to an embodiment of this application. As shown in FIG. 26, the memory card may be inserted into the nano SIM card holder of the terminal. A first connection point 41 corresponding to the clock signal pin 21 of the memory card, a second connection point 42 corresponding to the power supply pin 22 of the memory card, a second connection point 43 corresponding to the control signal pin 23 of the memory card, a second connection point 44 corresponding to the ground signal pin 24 of the memory card, a second connection point 45 corresponding to the first data transmission pin 25 of the memory card, a second connection point 46 corresponding to the second data transmission pin 26 of the memory card, a second connection point 47 corresponding to the third data transmission pin 27 of the memory card, and a second connection point 48 corresponding to the fourth data transmission pin 28 of the memory card are disposed in the nano SIM card holder. After the memory card is inserted into the nano SIM card holder, the pins of the memory card are in contact with corresponding connection points. A first pin 51 connected to the first connection point 41, a second pin 52 connected to the second connection point 42, a third pin 53 connected to the second connection point 43, a fourth pin 54 connected to the second connection point 44, a fifth pin 55 connected to the second connection point 45, a sixth pin 56 connected to the second connection point 46, a seventh pin 57 connected to the second connection point 47, and an eighth pin 58 connected to the second connection point 48 are disposed on a control chip of the terminal. The second pin 52 may be a power supply pin of the control chip, and the fourth pin 54 may be a ground signal pin of the control chip.

In addition, an SD interface and a SIM interface are provided in the terminal. Six pins are disposed at the SD interface: a first SD pin, a second SD pin, a third SD pin, a fourth SD pin, a fifth SD pin, and a sixth SD pin. Three pins are disposed at the SIM interface: a first SIM pin, a second SIM pin, and a third SIM pin.

Three switches 61 are provided in the control chip. One end of each of the three switches 61 is connected to each of any three of the first pin 51, the third pin 53, the fifth pin 55, the sixth pin 56, the seventh pin 57, and the eighth pin 58 in a one-to-one correspondence. Other pins, in the first pin 51, the third pin 53, the fifth pin 55, the sixth pin 56, the seventh pin 57, and the eighth pin 58, that are not connected to the switches 61 are connected to three pins at the SD interface in a one-to-one correspondence.

Each of remaining three pins at the SD interface that are not connected to the pins of the control chip is in a one-to-one correspondence with the other end of each of the three switches 61. Each of the three pins at the SIM interface is in a one-to-one correspondence with the other end of each of the three switches 61.

The control chip controls, based on detection on the memory card, one-to-one connection between the other end of each of the three switches 61 and each of the remaining three pins at the SD interface that are not connected to the pins of the control chip. Further, the memory card currently implements a storage function. Alternatively, the control chip controls, based on detection on the memory card, one-to-one connection between the other end of each of the three switches 61 and each of the three pins at the SIM interface. Further, the memory card changes to a SIM card to implement a communication function.

Optionally, a near field communication (near field communication, NFC) structure 71 is provided. An output end of the NFC structure 71 is corresponding to one end of another switch. In addition, the seventh pin 57 is corresponding to the one end of the another switch. The other end of the another switch is connected to the second connection point 47. Therefore, the output end of the NFC structure 71 is connected to the one end of the another switch, or the seventh pin 57 is connected to the one end of the another switch.

The foregoing embodiments specially describe the memory card and the terminal. The foregoing descriptions are intended to illustrate example embodiments of the memory card but do not constitute a limitation on this application. The technologies disclosed in this application may be further used to apply the memory card to a computing apparatus, and the computing apparatus controls or operates the memory card. In addition to the terminal, examples of applications that can be implemented on the memory card include a wireless communications apparatus, a global positioning system (global positioning system, GPS) apparatus, a cellular apparatus, a network interface, a modem, a magnetic disk storage system, and the like.

A plurality of features and advantages of this application can be learned from the written descriptions. Therefore, the claims are intended to cover all these features and advantages of this application. In addition, because a person skilled in the part can easily perform a plurality of adjustments and changes, this application is not limited to the described precise structures and operations. Therefore, all suitable adjustments and changes that can be used fall within the scope of this application.

What is claimed is:

1. A system, comprising:
an electronic device and a memory card;
the electronic device comprising a card holder, wherein the card holder is configured to dispose the memory card, and wherein the card holder comprises eight springs;
the memory card comprising:
a memory card interface, a first edge, a second edge, a third edge, and a fourth edge, the memory card interface comprising eight metal contacts, the eight metal contacts couple to the eight springs correspondingly when the memory card is disposed in the card holder; wherein the eight metal contacts are distributed in two rows, and wherein the eight metal contacts comprise:
a first metal contact configured to transmit a power supply signal;
a second metal contact configured to transmit a first data signal;
a third metal contact configured to transmit a control signal;
a fourth metal contact configured to transmit a clock signal;
a fifth metal contact coupled to ground;
a sixth metal contact configured to transmit a second data signal;
a seventh metal contact configured to transmit a third data signal; and
an eighth metal contact configured to transmit a fourth data signal,
wherein one corner of the memory card is a chamfer,
wherein the chamfer is located between the second edge and the fourth edge,
wherein the first edge is parallel to the second edge,
wherein the third edge is parallel to the fourth edge,
wherein a distance between the third edge and the fourth edge is greater than a distance between the first edge and the second edge,
wherein the sixth metal contact, the third metal contact, the fifth metal contact, and the eighth metal contact are distributed in a first row and are sequentially distributed along the fourth edge,
wherein the sixth metal contact is adjacent to the chamfer,
wherein the fourth metal contact, the second metal contact, the first metal contact, and the seventh metal contact are distributed in a second row and are sequentially distributed along the third edge,
wherein the fourth metal contact and the sixth metal contact are adjacent to the second edge,
wherein the seventh metal contact and the eighth metal contact are adjacent to the first edge,
a region, on a card body of the memory card, in which the first metal contact of the memory card and the seventh metal contact of the memory card are located is corresponding to a region, on a card body of a nano subscriber identity module (SIM) card, in which a power supply contact of the nano SIM card is located; and
a region, on the card body of the memory card, in which the fifth metal contact of the memory card and the eighth metal contact of the memory card are located is corresponding to a region, on the card body of the nano SIM card, in which a ground contact of the nano SIM card is located.

2. The system of claim 1, wherein a region, on the card body of the memory card, in which the second metal contact of the memory card located is corresponding to a region, on the card body of the nano SIM card, in which a reset contact of the nano SIM card is located;
a region, on the card body of the memory card, in which the third metal contact of the memory card located is corresponding to a region, on the card body of the nano SIM card, in which a programming voltage/input signal contact of the nano SIM card is located;
a region, on the card body of the memory card, in which the fourth metal contact of the memory card located is corresponding to a region, on the card body of the nano SIM card, in which a clock contact of the nano SIM card is located;
a region, on the card body of the memory card, in which the sixth metal contact of the memory card located is corresponding to a region, on the card body of the nano SIM card, in which a data contact of the nano SIM card is located.

3. The system of claim 1, wherein a length of the memory card is 12.30 millimeters (mm), and wherein a width of the memory card is 8.80 mm.

4. The system of claim 1, wherein a first dimension of a first card body of the memory card is the same as a second dimension of a second card body of the nano SIM card.

5. The system of claim 1, wherein the sixth metal contact is adjacent to the second edge along a first length direction of the fourth edge, wherein the eighth metal contact is adjacent to the first edge along a second length direction of the fourth edge, wherein the third metal contact and the fifth metal contact are distributed between the sixth metal contact and the eighth metal contact, wherein the fourth metal contact is adjacent to the second edge along a third length direction of the third edge, wherein the seventh metal contact is adjacent to the first edge along a fourth length direction of the third edge, and wherein the first metal contact and the second metal contact are distributed between the fourth metal contact and the seventh metal contact.

6. The system of claim 1, wherein a first distance is between the seventh metal contact and the first edge, wherein a second distance is between the fourth metal contact and the second edge, wherein the first distance is less than the second distance, wherein a third distance is between the eighth metal contact and the first edge, wherein a fourth distance is between the sixth metal contact and the second edge, and wherein the third distance is less than the fourth distance.

7. The system of claim 1, wherein a first shape of the seventh metal contact is a first L-shape, and wherein a second shape of the eighth metal contact is a second L-shape.

8. The system of claim 1, wherein an interface protocol of the memory card comprises secure digital memory (SD), universal serial bus (USB), peripheral component interconnect express (PCIE), universal flash storage (UFS), multimedia card (MMC), or embedded multimedia card (EMMC).

9. The system of claim 1, wherein the memory card further comprises:
a card body;
a storage device disposed inside the card body; and
a controller disposed inside the card body and electrically coupled to the storage device and the memory card interface.

10. The system of claim 1, wherein the card holder is further configured to dispose the nano SIM card, wherein:
when the memory card is disposed in the card holder, the first metal contact is configured to couple to the first spring, the fifth metal contact is configured to couple to the second spring, the seventh metal contact is configured to couple to the third spring, and the eighth metal contact is configured to couple to the fourth spring, and
when the nano SIM card is disposed in the card holder, both the first spring and the third spring are configured to couple to a power supply contact of the nano SIM card, and both the second spring and the fourth spring are configured to couple to a ground contact of the nano SIM card.

11. The system of claim 1, wherein the eight metal contacts are isolated from each other.

12. A memory card comprising:
a memory card interface, a first edge, a second edge, a third edge, a fourth edge;
the memory card interface comprising eight metal contacts, wherein the eight metal contacts are distributed in two rows, and wherein the eight metal contacts comprise:
a first metal contact configured to transmit a power supply signal;
a second metal contact configured to transmit a first data signal;
a third metal contact configured to transmit a control signal;
a fourth metal contact configured to transmit a clock signal;
a fifth metal contact coupled to ground;
a sixth metal contact configured to transmit a second data signal;
a seventh metal contact configured to transmit a third data signal; and
an eighth metal contact configured to transmit a fourth data signal,
wherein one corner of the memory card is a chamfer,
wherein the chamfer is located between the second edge and the fourth edge,
wherein the first edge is parallel to the second edge,
wherein the third edge is parallel to the fourth edge,
wherein a distance between the third edge and the fourth edge is greater than a distance between the first edge and the second edge,
wherein the sixth metal contact, the third metal contact, the fifth metal contact, and the eighth metal contact are distributed in a first row and are sequentially distributed along the fourth edge,
wherein the sixth metal contact is adjacent to the chamfer,
wherein the fourth metal contact, the second metal contact, the first metal contact, and the seventh metal contact are distributed in a second row and are sequentially distributed along the third edge,
wherein the fourth metal contact and the sixth metal contact are adjacent to the second edge,
wherein the seventh metal contact and the eighth metal contact are adjacent to the first edge;
a region, on a card body of the memory card, in which the first metal contact of the memory card and the seventh metal contact of the memory card are located is corresponding to a region, on a card body of a nano subscriber identity module (SIM) card, in which a power supply contact of the nano SIM card is located; and
a region, on the card body of the memory card, in which the fifth metal contact of the memory card and the eighth metal contact of the memory card are located is corresponding to a region, on the card body of the nano SIM card, in which a ground contact of the nano SIM card is located.

13. The memory card of claim 12, wherein a first dimension of a first card body of the memory card is the same as a second dimension of a second card body of the nano SIM card.

14. The memory card of claim 12, wherein a length of the memory card is 12.30 millimeters (mm), and wherein a width of the memory card is 8.80 mm.

15. The memory card of claim 12, wherein the third metal contact and the fifth metal contact are distributed between the sixth metal contact and the eighth metal contact, and wherein the first metal contact and the second metal contact are distributed between the fourth metal contact and the seventh metal contact.

16. The memory card of claim 12, wherein a first distance is a distance between the seventh metal contact and the first edge, wherein a second distance is a distance between the fourth metal contact and the second edge, wherein the first distance is less than the second distance, wherein a third distance is a distance between the eighth metal contact and the first edge, wherein a fourth distance is a distance between the sixth metal contact and the second edge, and wherein the third distance is less than the fourth distance.

17. The memory card of claim 12, wherein a first shape of the seventh metal contact is a first L-shape, and wherein a second shape of the eighth metal contact is a second L-shape.

18. The memory card of claim 12, further comprising:
a card body;
a storage device disposed inside the card body; and
a controller disposed inside the memory card and electrically coupled to the storage device and the memory card interface.

19. The memory card of claim 12, wherein an interface protocol of the memory card comprises secure digital memory (SD), universal serial bus (USB), peripheral component interconnect express (PCIE), universal flash storage (UFS), multimedia card (MMC), or embedded multimedia card (EMMC).

20. The memory card of claim 12, wherein the eight metal contacts are isolated from each other.

* * * * *